(12) United States Patent
Takaoka et al.

(10) Patent No.: US 8,273,438 B2
(45) Date of Patent: Sep. 25, 2012

(54) INFORMATION RECORDING MEDIUM, PROCESS FOR PRODUCING THE INFORMATION RECORDING MEDIUM, SPUTTERING TARGET AND FILM FORMING APPARATUS

(75) Inventors: Tomoyasu Takaoka, Osaka (JP); Takashi Nishihara, Osaka (JP); Rie Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 436 days.

(21) Appl. No.: 12/525,211

(22) PCT Filed: Feb. 1, 2008

(86) PCT No.: PCT/JP2008/051677
§ 371 (c)(1),
(2), (4) Date: Dec. 17, 2009

(87) PCT Pub. No.: WO2008/096680
PCT Pub. Date: Aug. 14, 2008

(65) Prior Publication Data
US 2011/0135910 A1 Jun. 9, 2011

(30) Foreign Application Priority Data
Feb. 9, 2007 (JP) .............................. P 2007-029995

(51) Int. Cl.
*B32B 3/02* (2006.01)
(52) U.S. Cl. .................. 428/64.1; 428/64.4; 430/270.13
(58) Field of Classification Search ................. 428/64.4; 430/270.13
See application file for complete search history.

(56) References Cited

U.S. PATENT DOCUMENTS

| | | | |
|---|---|---|---|
| 5,169,745 A * | 12/1992 | Yashiro et al. ........... | 430/270.13 |
| 5,238,722 A | 8/1993 | Yashiro et al. | |
| 5,242,730 A * | 9/1993 | Yashiro et al. ............... | 428/64.9 |
| 5,278,011 A | 1/1994 | Yamada et al. | |
| 6,221,557 B1 | 4/2001 | Harigaya et al. | |
| 6,268,107 B1 | 7/2001 | Yamada et al. | |
| 6,456,584 B1 | 9/2002 | Nagata et al. | |
| 7,407,696 B2 * | 8/2008 | Kanatzidis ................... | 428/64.1 |
| 2004/0191683 A1 | 9/2004 | Nishihara et al. | |
| 2005/0105438 A1 | 5/2005 | Hibino et al. | |
| 2006/0072442 A1 | 4/2006 | Kanatzidis | |
| 2007/0196617 A1 | 8/2007 | Palanisamy et al. | |

FOREIGN PATENT DOCUMENTS

| | | |
|---|---|---|
| EP | 0 793 223 A1 | 9/1997 |
| EP | 1 463 043 A1 | 9/2004 |
| JP | 63-225935 | 9/1988 |
| JP | 3-240589 | 10/1991 |
| JP | 4-193586 | 7/1992 |
| JP | 7-172060 | 7/1995 |
| JP | 8-267925 | 10/1996 |
| JP | 2000-36130 | 2/2000 |
| JP | 2007-223299 | 9/2007 |

OTHER PUBLICATIONS

Extended European Search Report issued Nov. 8, 2010 in counterpart European Application No. 08 71 0709.
International Search Report issued May 13, 2008 in the International (PCT) Application No. PCT/JP2008/051677.
International Preliminary Report on Patentability (with English translation) issued Jun. 5, 2009 in corresponding International Application No. PCT/JP2008/051677.

* cited by examiner

*Primary Examiner* — Elizabeth Mulvaney
(74) *Attorney, Agent, or Firm* — Wenderoth, Lind & Ponack, L.L.P.

(57) ABSTRACT

In an information recording medium that has an information layer which includes a recording layer capable of undergoing phase transition, the recording layer is formed from a material that contains Sb and S, and has composition represented by the formula (1): $Sb_xS_{100-x}$ (atomic %) where suffix x represents the proportion in atomic % that satisfies a relationship of $50 \leq x \leq 98$.

24 Claims, 15 Drawing Sheets

INFORMATION RECORDING MEDIUM, PROCESS FOR PRODUCING THE INFORMATION RECORDING MEDIUM, SPUTTERING TARGET AND FILM FORMING APPARATUS

TECHNICAL FIELD

The present invention relates to an information recording medium used in recording and reproducing information by being irradiated with a laser beam or applying electrical energy, a sputtering target and a film formation apparatus that are used in the manufacture of the information recording medium.

BACKGROUND ART

The information recording media of the prior art include a phase-change type information recording medium wherein a recording layer is formed from a phase-change material. Among the phase-change type information recording media, a medium that optically records, erases, overwrites and reproduces information by using laser beam is called an optical phase-change information recording medium (which may hereinafter be referred to simply as optical recording medium). Information is recorded on the optical recording medium by irradiating a phase transition material with a laser beam so that heat generated thereby causes the phase-change material to change between, for example, crystal phase and amorphous phase. The recorded information is reproduced by detecting the difference in reflectivity between the crystal phase and the amorphous phase.

The optical recording media also include a rewritable optical recording medium that allows erasure and overwriting of information, in which the initial state of the recording layer is generally crystal phase. To record information on this medium, it is irradiated with a laser beam of high power so as to melt the recording layer and is then cooled down quickly, thereby turning the portion of the recording layer that has been irradiated with the laser into amorphous phase. In contrast, to erase information from this medium, it is irradiated with a laser beam having an output power lower than that for recording, so as to raise the temperature of the recording layer and then gradually cool it, thereby turning the portion of the recording layer irradiated with the laser into crystal phase. It is made possible to record new information while erasing the information that is already recorded, that is, to overwrite the information, by irradiating the recording layer with a laser beam that has been power-modulated between a high power level and a low power level.

In order to erase or overwrite information faster, it is necessary to cause the transition from amorphous phase to crystal phase to take place in a shorter period of time. In other words, achieving higher erasure performance with a rewritable optical recording medium requires it to the recording layer to be formed from a phase-change material that has a higher crystallization rate.

Such a rewritable optical recording medium is constituted from, in addition to the recording layer, dielectric layers, a reflective layer, an interface layer, etc, formed on a substrate. The dielectric layer may be provided for the purpose of preventing the recording layer from evaporating and the substrate from thermally deforming during repetitive recording operations, and for making it possible for the recording layer to efficiently absorb light and undergo optical change through optical interference effect. The dielectric layers are provided on both sides of the recording layer. The reflective layer is provided for the purpose of efficiently utilizing the applied laser beam, and increasing the cooling rate so as to enable the recording layer to readily undergo transition to amorphous phase. The reflective layer is usually disposed behind the recording layer when viewed from the side of the laser source such that the reflective layer and the recording layer sandwich the dielectric layer. The interface layer is disposed, as required, between the recording layer and the dielectric layer, for the purpose of preventing atoms and molecules from diffusing between the recording layer and the dielectric layer.

Known phase-change materials include $GeTe$—$Sb_2Te_3$, $GeTe$—$Bi_2Te_3$ and $GeTe$—$SnTe$. In particular, $GeTe$—$Bi_2Te_3$ has a high crystallization rate and therefore can be used to form the recording layer of a rewritable optical recording medium and achieve excellent erasability (refer to Patent Document 1).

For the purpose of increasing the recording capacity of the rewritable optical recording medium, a method of providing two information layers in a single optical recording medium has been proposed (refer to Patent Document 2). Information can be recorded in the two information layers by means of laser beam incident on one side of the medium to each of the two information layers. Reproduction is also carried out similarly. Accordingly, the optical recording medium that has two information layers may have a recording capacity almost twice that of an optical recording medium that has a single information layer.

In the rewritable optical recording medium having two information layers, the information is recorded and reproduced on and from the information layer that is located further from the laser source (hereinafter referred to as a first information layer) by means of a laser beam that has passed an information layer that is located nearer to the laser source (hereinafter referred to as a second information layer). Therefore the second information layer preferably has a transmittance that is as high as possible. The phase-change materials generally have a high extinction coefficient, and therefore the recording layer of the second information layer is preferably thinner in order to increase the transmittance of the recording layer.

Also in order to obtain an optical recording medium that has more information layers, for example three or four information layers, so as to increase the recording capacity, it is required to further increase the transmittance of the information layer located on the laser source side (a third information layer or a fourth information layer), and therefore a thickness of the recording layer must be further decreased.

Patent Document 1: Japanese Unexamined Patent Publication (Kokai) No. 63-225935
Patent Document 2: Japanese Unexamined Patent Publication (Kokai) No 2000-36130

DISCLOSURE OF INVENTION

Problems to be Solved by Invention

The $GeTe$—$Bi_2Te_3$ recording layer of the prior art, however, has such a problem that decreasing the thickness for the purpose of increasing the transmittance leads to lower crystallization rate that results in significantly lower erasability. When proportion of the $Bi_2Te_3$ component is increased in the $GeTe$—$Bi_2Te_3$ recording layer, crystallization rate becomes higher and erasability improves, although the amorphous phase becomes unstable and signal reliability deteriorates.

The present invention aims at solving the problems described above. The object of the present invention is to provide an information recording medium that has better recording layer of high crystallization rate and stable amorphous phase, a method for producing the same, and a sputtering target and a film formation apparatus that are used in forming the recording layer.

Means to Solve the Problems

In order to achieve the object described above, the present invention provides an information recording medium that includes an information layer including a recording layer capable of undergoing phase change, wherein the recording layer contains a material that contains Sb and S and is represented by a formula (1) shown below:

$$Sb_xS_{100-x}(\text{atomic \%}) \tag{1}$$

wherein suffix x represents a proportion in atomic % and satisfies a relationship of $50 \leq x \leq 98$.

The present invention also provides a method for producing the information recording medium of the present invention including a step of forming the information layer that includes a step of forming the recording layer that is capable of undergoing phase change and contains Sb and S by sputtering, wherein a sputtering target that contains Sb and S is used in the step of forming the recording layer and a film formed by using the sputtering target contains a material represented by a formula (1) shown below:

$$Sb_xS_{100-x}(\text{atomic \%}) \tag{1}$$

wherein suffix x represents the proportion in atomic % and satisfies a relationship of $50 \leq x \leq 98$.

The present invention also provides a sputtering target that is preferably used in forming the recording layer of the information recording medium of the present invention, which contains Sb and S and contains a material represented by a formula (11) shown below:

$$Sb_xS_{100-x}(\text{atomic \%}) \tag{11}$$

where suffix X represents the proportion in atomic % that satisfies a relationship of $50 \leq x \leq 98$.

The present invention also provides a film formation apparatus having a power source, a vacuum vessel that has an evacuation port and a gas supply port, a vacuum pump connected to the vacuum vessel via the evacuation port, an anode and a cathode that are disposed in the vacuum vessel and a sputtering target that is connected to the anode, wherein the sputtering target mentioned here is the sputtering target of the present invention.

Effect of Invention

The information recording medium of the present invention has a high erase ratio, excellent recording and reproducing characteristics and high reliability of signals. The method for producing the information recording medium of the present invention makes it possible to facilitate the production of the information recording medium of the present invention. Further, the sputtering target and the film formation apparatus of the present invention make it possible to facilitate the production of the information recording medium of the present invention.

DESCRIPTION OF THE REFERENCE NUMERALS

Figure 1:
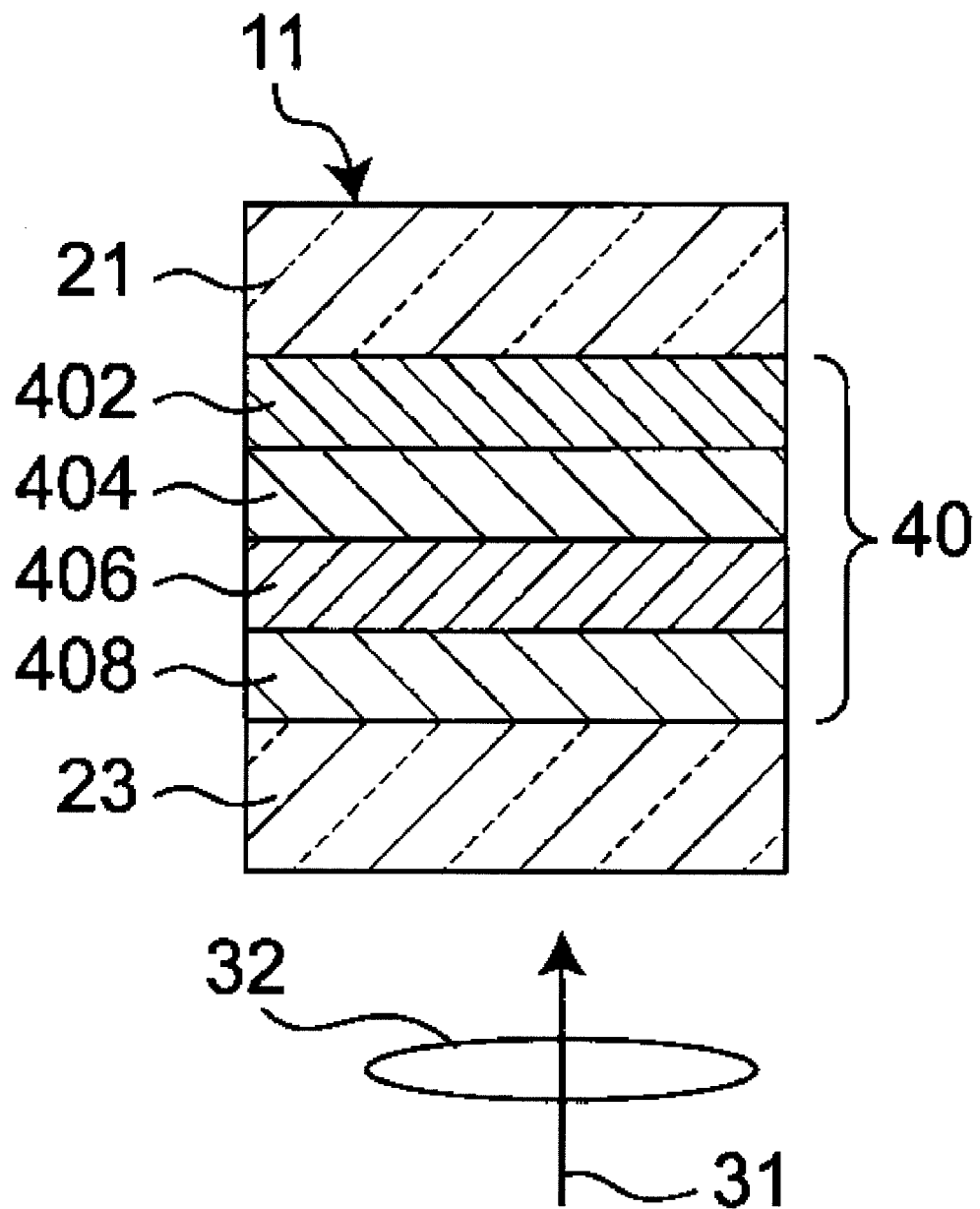
FIG. 1 is a sectional view showing an example of constitution of an information recording medium of the present invention.

11, 12, 13, 14, 15, 16, 17, 18, 506 Information recording medium
21, 24, 25, 62, 671 Substrate
22, 28, 29 Separation layer
23 Transparent layer
26 Dummy substrate
27 Adhesive layer
31, 502 Laser beam
32, 504 Objective lens
40 Information layer
41 First information layer
42 Second information layer
43 Third information layer
44 Forth information layer
48 (N−1)st information layer
49 Nth information layer 402, 412, 422, 432, 442, 492 Reflective layer
403 reflective-layer side interface layer
64, 404, 414, 424, 434, 444, 494 First dielectric layer
405 First interface layer
406, 416, 426, 436, 446, 496 Recording layer
407 Second interface layer
67, 408, 418, 428, 438, 448, 498 Second dielectric layer
421, 431, 441, 491 Transmittance adjustment layer
501 Laser diode
503 Half mirror
505 Motor
507 Photodetector
61, 81 Electrical information recording medium
63 Lower electrode
65 First recording layer
66 Second recording layer
68 Upper electrode
69 Voltage applying section
70 Resistance measuring instrument
71, 72 Switch
73 Pulsed power source
74 Electrical information recording/reproduction apparatus
75 Word line
76 Bit line
77 Memory cell
78 Addressing circuit
79 Memory device
80 External circuit
901, 902, 903, 904, 905, 908, 909 Recording waveform
906, 907 Erasing waveform
667 Vacuum vessel
668 Evacuation port
669 Gas supply port
670 Anode
672 Sputtering target
673 Cathode
674 Power source

BEST MODE FOR CARRYING OUT THE INVENTION

Embodiments of the present invention will now be described with reference to the accompanying drawings. It should be understood that the embodiments are provided as mere examples that do not restrict the present invention. In the embodiments described below, identical components may be denoted with identical reference numerals, and duplicate description may be omitted.

First Embodiment

An example of the information recording medium of the present invention (which may hereafter be referred to as "recording medium" or simply as "medium") will be described as a first embodiment. The information recording medium 11 of the first embodiment is shown in partial sectional view in FIG. 1. The information recording medium 11 is an optical recording medium, on and from which information is recorded and reproduced by irradiating the medium with a laser beam 31 that is focused by an object lens 32.

The information recording medium 11 has such a constitution as an information layer 40 and a transparent layer 23 are provided in this order on a substrate 21. The transparent layer 23 is thinner than the substrate 21. In the embodiment illustrated, the laser beam is incident on the side of the transparent layer 23.

The shorter the wavelength λ of the laser beam 31, the smaller the spot formed by focusing the beam with the objective lens 32 becomes. When the wavelength λ is too short, however, the laser beam 31 is optically absorbed more significantly by the transparent layer 23, etc. Accordingly, the wavelength λ of the laser beam is preferably in a range from 350 nm to 450 nm.

Figure 2:
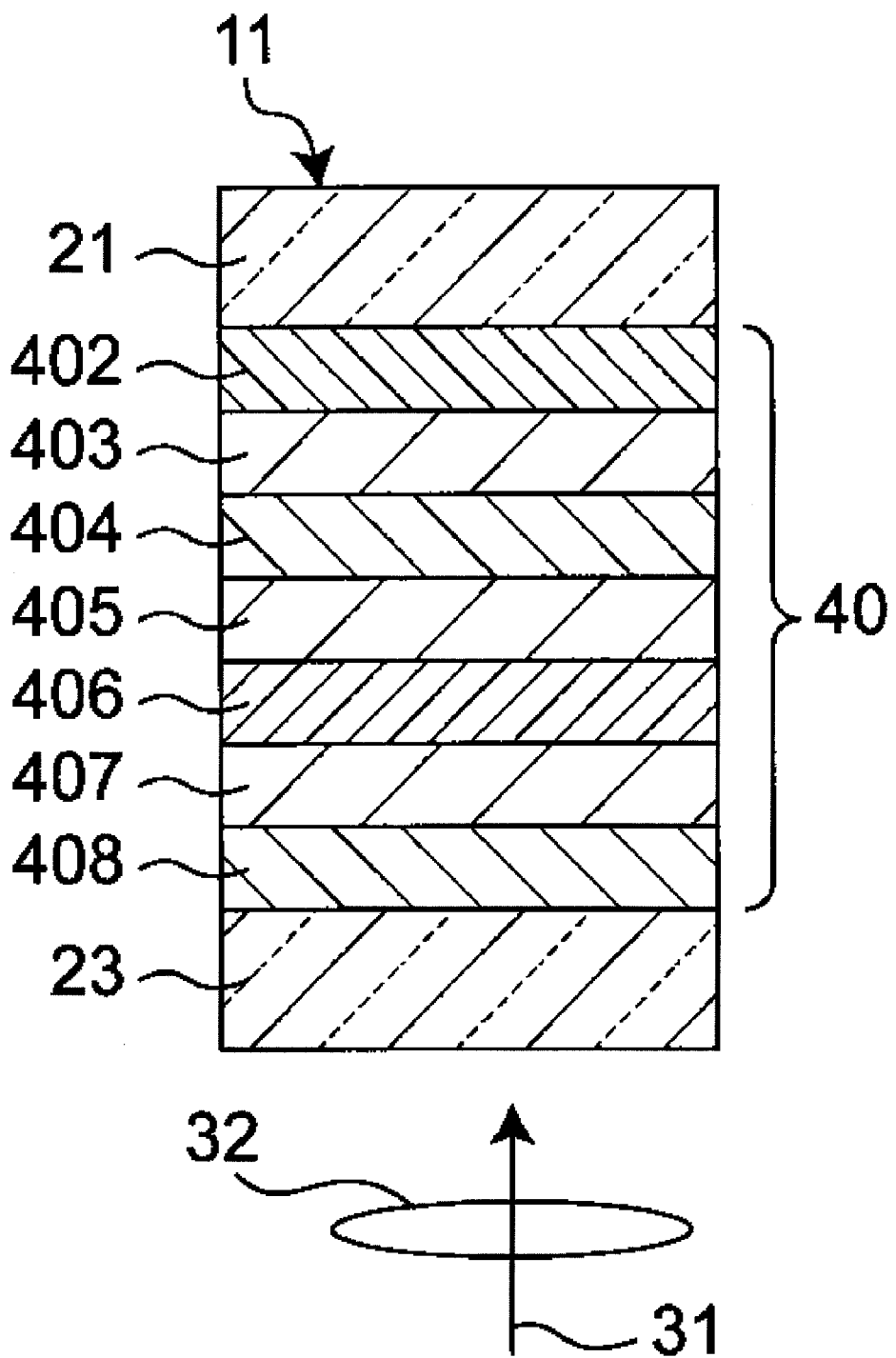
FIG. 2 is a sectional view showing an example of constitution of the information recording medium of the present invention.

As shown in FIG. 1, the information layer 40 has a reflective layer 402, a first dielectric layer 404, a recording layer 406 and a second dielectric layer 408 provided in this order from the side located near the substrate 21. As required, additional layers may be provided; a reflective-layer side interface layer 403 disposed between the reflective layer 402 and the first dielectric layer 404, a first interface layer 405 disposed between the first dielectric layer 404 and the recording layer 406, and a second interface layer 407 disposed between the second dielectric layer 408 and the recording layer 406, as shown in FIG. 2.

Information is recorded on the information recording medium 11 by irradiating the recording layer 406 of the information layer 40 with the laser beam 31 that is applied from the side of the transparent layer 23 and focused by the objective lens 32. Reproduction of the information recorded on the information recording medium 11 is also carried out by irradiating the medium with the laser beam.

The substrate 21 has a disk shape and is used to hold the information layer 40 and the transparent layer 23, and serves as a supporting base for forming these layers. The substrate 21 may have, on the surface thereof that contacts the information layer 40, guide grooves formed therein for guiding the laser beam 31. Surface of the substrate 21 that does not contact the information layer 40 is preferably smooth. The substrate 21 may be formed from a polycarbonate resin, a polymethyl methacrylate resin, a polyolefin resin, a norbornene resin, glass or a combination of these materials. The substrate 21 is preferably formed from polycarbonate, in particular, for the reason of good transfer property, ease of mass production and low cost of this resin.

The layers that constitute the information layer 40 will now be described.

The material of the recording layer 406 is a material that undergoes phase change between crystal phase and amorphous phase when irradiated with the laser beam 31. The present invention uses a material that contains Sb and S to form the recording layer 406. When the recording layer 406 is formed solely from Sb, the amorphous phase becomes unstable and reliability of signals deteriorates. Adding S to Sb stabilizes the amorphous phase. Adding S to Sb also increases the transmittance of the recording layer 406.

Specifically, a crystallization temperature Tx (the temperature at which the phase change material undergoes phase change to a crystal phase when the phase change material 406 that is in amorphous phase at the normal temperature is heated gradually at a rate of 50° C./min) of the recording layer 406 that has a thickness of 7 nm is 100° C. when the recording layer 406 is formed solely from Sb, while $T_x$ is 200° C. when the recording layer 406 is formed from $Sb_{80}S_{20}$ (the suffix represents the proportion of the element in atomic %), showing more stable amorphous phase than in the case of the recording layer formed solely from Sb.

When the proportion of Sb is less than 50 atomic % in the combination of Sb and S, crystallization rate becomes too low that makes it impossible to achieve erasability that is practically useful for a rewritable optical recording medium. For this reason, it is preferable that the recording layer 406 is formed from a material that contains Sb and S in proportions represented by the formula (1) shown below:

$$Sb_xS_{100-x}(\text{atomic \%}) \quad (1)$$

wherein suffix x represents the proportion in atomic % that satisfies a relationship of $50 \leq x \leq 98$. When x is greater than 98, the effect of adding S to Sb cannot be obtained.

It is more preferable that x satisfies a relationship of $60 \leq x \leq 80$. This formula shows the proportion of the elements relative to the total of Sb atoms and S atoms (100 atomic %). The recording layer 406 may include elements other than Sb and S.

The recording layer is preferably constituted substantially from Sb atoms and S atoms. The word "substantially" here reflects the fact that trace of other elements (such as elements contained in the ambient gas during the sputtering process) is inevitably contained. More specifically, when the proportion of elements other than Sb and S to the total of the elements that constitute the recording layer is less than 10 atomic %, the recording layer may be regarded as constituted substantially from Sb and S. The proportion of elements other than Sb and S is preferably less than 1 atomic %.

The recording layer 406 may be formed from a material that contains at least one element (M) selected from among a group of Ge, Sn, Bi, In and Mn, in addition to Sb and S. This is because it is made possible to control the crystallization rate and the stability of amorphous phase by adding the element represented by M to the material that contains Sb and S described previously. For example, crystallization rate of the material is increased by adding Sn or Bi to the material constituted from Sb and S. Amorphous phase of the material can be stabilized by adding In, Ge or Mn to the material constituted from Sb and S.

Preferable quantity of M to be added varies depending on the type of element it represents. The five elements listed above are preferably divided into a group M1 consisting of Ge, In and Sn, and a group M2 consisting of Bi and Mn. When the recording layer 406 contains M1, the recording layer 406 is preferably formed from a material represented by the formula (2) shown below:

$$(Sb_zS_{1-z})_{100-y}M1_y(\text{atomic \%}) \quad (2)$$

wherein suffix z represents the proportion of each atom to the sum of the number of Sb atoms and the number of S atoms which sum is set to 1 and satisfies a relationship of $0.5 \leq z \leq 0.98$, while suffix y represents the proportion in atomic %, and satisfies a relationship of $0 < y \leq 30$.

In formula (2) above, M1 represents at least one element selected from among Ge, In and Sn. The material may include two elements (for example, Ge and Sn, or In and Sn) or three elements as M1. It is more preferable that z and y satisfy relationships of $0.5 \leq z \leq 0.98$ and $2 \leq y \leq 20$, respectively and furthermore preferably satisfy relationships of $0.6 \leq z \leq 0.8$ and $5 \leq y \leq 20$, respectively.

When the recording layer 406 contains the material represented by the formula (2) above, the recording layer is more preferably constituted substantially from Sb atoms, S atoms and M1 atoms. The word "substantially" here reflects the fact that trace of other elements (such as elements contained in the ambient gas during the sputtering process) is inevitably contained. More specifically, when the proportion of elements other than Sb, S and M1 to the total of the elements that constitute the recording layer is less than 10 atomic %, the recording layer may be regarded as constituted substantially from Sb, S and M1. The proportion of elements other than Sb, S and M1 is preferably less than 1 atomic %.

In the case where the recording layer 406 contains M2, the recording layer 406 is preferably formed from a material represented by the formula (3) shown below:

$$(Sb_aS_{1-a})_{100-b}M2_b(\text{atomic \%}) \quad (3)$$

wherein suffix a represents the proportion of each atom to the sum of the number of Sb atoms and the number of S atoms which sum is set to 1 and satisfies a relationship of $0.5 \leq a \leq 0.98$, while suffix b represents the proportion in atomic %, and satisfies a relationship of $0 < b \leq 20$. In the above formula, M2 represents at least one element selected from among Bi and Mn. The material may include both Bi and Mn as M2. It is more preferable that b satisfies a relationship of $2 \leq b \leq 10$.

In the case where the recording layer 406 contains the material represented by the formula (3) above, the recording layer is preferably constituted substantially from Sb atoms, S atoms and M2 atoms. The word "substantially" here reflects the fact that trace of other elements (such as elements contained in the ambient gas during the sputtering process) is inevitably contained. More specifically, when the proportion of elements other than Sb, S and M2 to the total of the elements that constitute the recording layer is less than 10 atomic %, the recording layer may be regarded as constituted substantially from Sb, S and M2. The proportion of elements other than Sb, S and M2 is preferably less than 1 atomic %.

The recording layer 406 may also include both M1 and M2, and a material represented by the formula (4) shown below:

$$(Sb_cS_{1-c})_{100-d-e}M1_dM2_e(\text{atomic \%}) \quad (4)$$

where suffix c represents the proportion of each atom to the sum of the number of Sb atoms and the number of S atoms which sum is set to 1 and satisfies a relationship of $0.5 \leq c \leq 0.98$, while suffixes d and e represent the proportion in atomic %, and satisfy relationships of $0 < d < 30$, $0 < e \leq 20$ and $0 < d+e \leq 30$.

When the recording layer 406 contains the material represented by the formula (4) above, the recording layer is preferably constituted substantially from Sb atoms, S atoms, M1 atoms and M2 atoms. The word "substantially" here reflects the fact that trace of other elements (such as elements contained in the ambient gas of the sputtering step) is inevitably contained. More specifically, when the proportion of elements other than Sb, S, M1 and M2 to the entire elements that constitute the recording layer is less than 10 atomic %, the recording layer may be regarded as constituted substantially from Sb, S, M1 and M2. The proportion of elements other than Sb, S, M1 and M2 is preferably less than 1 atomic %.

It is preferable that the recording layer 406 can easily turn from amorphous phase into crystal phase when irradiated with laser beam, and does not turn into crystal phase when it is not irradiated with laser beam. When the recording layer 406 is too thin, sufficient levels of reflectance and sufficient change in reflectance may not be obtained. When the recording layer 406 is too thick, thermal capacity increases resulting in lower recording sensitivity. For this reason, the thickness of the recording layer 406 is preferably in a range of from 5 nm to 15 nm, more preferably from 8 nm to 12 nm.

The reflective layer 402 has an optical function to increase the intensity of light absorbed by the recording layer 406 and a thermal function to dissipate the heat generated in the recording layer 406. A material that contains at least one element selected from among Ag, Au, Cu and Al may be used as the material for the reflective layer 402. For example, an alloy such as Ag—Cu, Ag—Ga—Cu, Ag—Pd—Cu, Ag—Nd—Au, AlNi, AlCr, Au—Cr or Ag—In may be used to form the reflective layer 402. An Ag alloy, in particular, has high heat conductivity and is therefore preferably used to form the reflective layer 402. The heat dissipation function is enhanced as the reflective layer 402 is made thicker. However, when the reflective layer 402 is too thick, heat is excessively dissipated, resulting in deterioration of the recording sensitivity of the recording layer 406. For this reason, the thickness of the reflective layer 402 is preferably in a range of from 30 nm to 200 nm, more preferably from 70 nm to 140 nm.

The first dielectric layer 404 is disposed between the recording layer 406 and the reflective layer 402, and has a thermal function to control the heat dissipation from the recording layer 406 to the reflective layer 402, and an optical function to control the reflectance and absorptance. The first dielectric layer 404 may be formed from a compound selected from oxide such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$ or $DyO_2$, sulfide such as ZnS or CdS and carbide such as SiC, or a mixture of two or more of these compounds, such as $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, ZnS—$SiO_2$, or $SnO_2$—SiC. ZnS—$SiO_2$ is particularly suited for the material of the first dielectric layer, because of high film formation rate, transparency, good mechanical characteristics and good humidity resistance.

When the first dielectric layer 404 is too thick, cooling effect of the reflective layer 402 is weakened and heat dissipation from the recording layer 406 decreases, thus impeding the recording layer from turning to amorphous phase. When the first dielectric layer 404 is too thin, on the other hand, cooling effect of the reflective layer 402 is enhanced and heat dissipation from the recording layer 406 increases, thus resulting in lower recording sensitivity. For this reason, the thickness of the first dielectric layer 404 is preferably in a range of from 2 nm to 40 nm, more preferably from 8 nm to 30 nm.

The reflective-layer side interface layer 403 serves to protect the reflective layer 402 from being corroded or destroyed by the material of the first dielectric layer 404. In the case where the reflective layer 402 contains Ag and the first dielectric layer 404 contains S (for example, ZnS—$SiO_2$), the reflective-layer side interface layer 403 prevents corrosion of the reflective layer 402 from being caused by the reaction of Ag and S.

The reflective-layer side interface layer 403 may be formed from a metal other than Ag, such as Al or Al alloy. The reflective-layer side interface layer 403 may also be formed from a dielectric material that does not include S. Such a material is a compound selected from among oxide such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$ or $DyO_2$ and carbide such as SiC, or a mixture of two or more of these compounds, such as $ZrO_2$—$SiO_2$, $ZrO_2$—Si—$O_2Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$ or $SnO_2$—SiC. Alternatively, the reflective-layer side interface layer 403 may also be formed from C or the like.

When the reflective-layer side interface layer 403 is too thick, thermal and optical functions of the first dielectric layer 404 may be hampered. When the reflective-layer side interface layer 403 is too thin, the reflective layer 402 may not be sufficiently protected from corrosion and destruction. For this reason, the thickness of the reflective-layer side interface layer 403 is preferably in a range of from 1 nm to 100 nm, more preferably from 5 nm to 40 nm.

The first interface layer 405 has a function to prevent material transfer from being caused between the first dielectric layer 404 and the recording layer 406 by repetitive recording operations. The first interface layer 405 is preferably formed from a material that has a melting point high enough to remain not melted during recording operation and has good adhesiveness to the recording layer 406. The first interface layer 405 may be formed from a compound selected from among oxide such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$ or $DyO_2$, sulfide such as ZnS or CdS and carbide such as SiC, or a mixture of two or more of these compounds, such as $ZrO_2$—$SiO_2$, $ZrO_2$—$SiO_2Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, ZnS—$SiO_2$ or $SnO_2$—SiC. The first interface layer 405 may also be formed from C. Among these, $Ga_2O_3$, ZnO and $In_2O_3$ are preferably used to form the first interface layer 405 because of good adhesiveness to the recording layer 406.

When the first interface layer 405 is too thin, it is disabled to perform the effect of interface layer. When it is too thick, thermal and optical functions of the first dielectric layer 404 may be hampered. For this reason, the thickness of the first interface layer 405 is preferably in a range of from 0.3 nm to 15 nm, more preferably from 1 nm to 8 nm.

The second dielectric layer 408 is disposed at a position nearer to the laser incident side than the recording layer 406. The second dielectric layer 408 has a function to prevent the recording layer 406 from being corroded and deforming, and an optical function to control the reflectance and absorptance. The candidates for the second dielectric layer 408 are the same materials as those listed as the candidates for the first dielectric layer 404. ZnS—$SiO_2$, in particular, is suited for the second dielectric layer, because of high film formation rate, transparency, good mechanical characteristics and good humidity resistance.

When the second dielectric layer 408 is too thick, the function to prevent the recording layer 406 from being corroded and deforming diminishes. The thickness of the second dielectric layer 408 can be precisely determined by calculation based on a matrix method, so as to maximize the difference in the intensity of reflected light between the cases where the recording layer 406 is in crystal phase and it is in amorphous phase. The thickness of the second dielectric layer 408 is preferably in a range of from 20 nm to 80 nm.

The second interface layer 407 has a function to prevent material transfer from being caused between the second dielectric layer 408 and the recording layer 406 by repetitive recording operations, similarly to the first interface layer 405. Accordingly, the second interface layer 407 is preferably formed from the material shown as the material for the first interface layer 405, so as to provide performance similar to that of the first interface layer 405.

The thickness of the second interface layer 407 is, similarly to the first interface layer 405, preferably in a range of from 0.3 nm to 15 nm, more preferably from 1 nm to 8 nm.

The information layer 40 is constituted by forming the reflective layer 402, the first dielectric layer 404, the recording layer 406 and the second dielectric layer 408 and, as required, the reflective-layer side interface layer 403, the first interface layer 405 and the second interface layer 407.

The transparent layer 23 is disposed on the side of the information layer 40 facing the laser beam 31, and protects the information layer 40. It is preferable that the transparent layer 23 shows low optical absorptance to the laser beam 31. The transparent layer 23 may be formed from a polycarbonate resin, a polymethyl methacrylate resin, a polyolefin resin, a norbornene resin, an ultraviolet curable resin (such as acrylic resin or epoxy resin), a delayed thermosetting resin, glass or a combination of these materials. A sheet of such a material may also be used as the transparent layer 23.

When the transparent layer 23 is too thin, it is disabled to perform the effect of protecting the information layer 40. When the transparent layer 23 is too thick, the distance between the surface of the information recording medium 11 whereon the laser beam 31 is incident and the information layer 40 becomes longer than the focal length of the objective lens 32, thus making it impossible to focus the laser beam 31 on the recording layer 406. In the case where the NA value is 0.85, the thickness of the transparent layer is preferably in a range of from 5 μm to 150 μm, and more preferably from 40 μm to 110 μm.

The information recording medium 11 can be manufactured by the following process.

First, the information layer 40 is formed on the substrate 21 (having a thickness of, for example, 1.1 mm). The information layer 40 comprises multiple films, each of which can be formed successively by sputtering. The substrate 21 may have high hygroscopic property depending on the material it is made from, and therefore the substrate 21 may be annealed as required to remove moisture before being subjected to sputtering.

Each of the layers can be formed by sputtering a sputtering target formed from the material of the layer, in an atmosphere of rare gas such as Ar gas, Kr gas or Xe gas, or in an atmosphere of mixed gas of a rare gas and a reactive gas (at least one type of gas selected from among oxygen and nitrogen). DC (direct current) sputtering or RF (radio frequency) sputtering method may be selected as required for the sputtering operation. DC sputtering is usually preferred because of the capability to grow a film at a high rate. However, a material having low electrical conductivity such as a dielectric material may not be sputtered by the DC sputtering method, in which case the RF sputtering method is employed. A dielectric material that has high electrical conductivity and a dielectric material of which electrical conductivity has been increased by a special treatment during the preparation of the sputtering target can be sputtered by either the DC sputtering method or the pulsed DC sputtering method.

The composition of a film formed by sputtering may not be exactly the same as that of the sputtering target. In the case of an oxide, for example, oxygen deficiency may be easily caused by sputtering. In this case, oxygen may be replenished by using oxygen gas as the reactive gas. The composition of the sputtering target is determined so that a film of the desired composition would be formed by sputtering. The composition of the sputtering target may be identical to the composition of the sputtering target.

Figure 16:
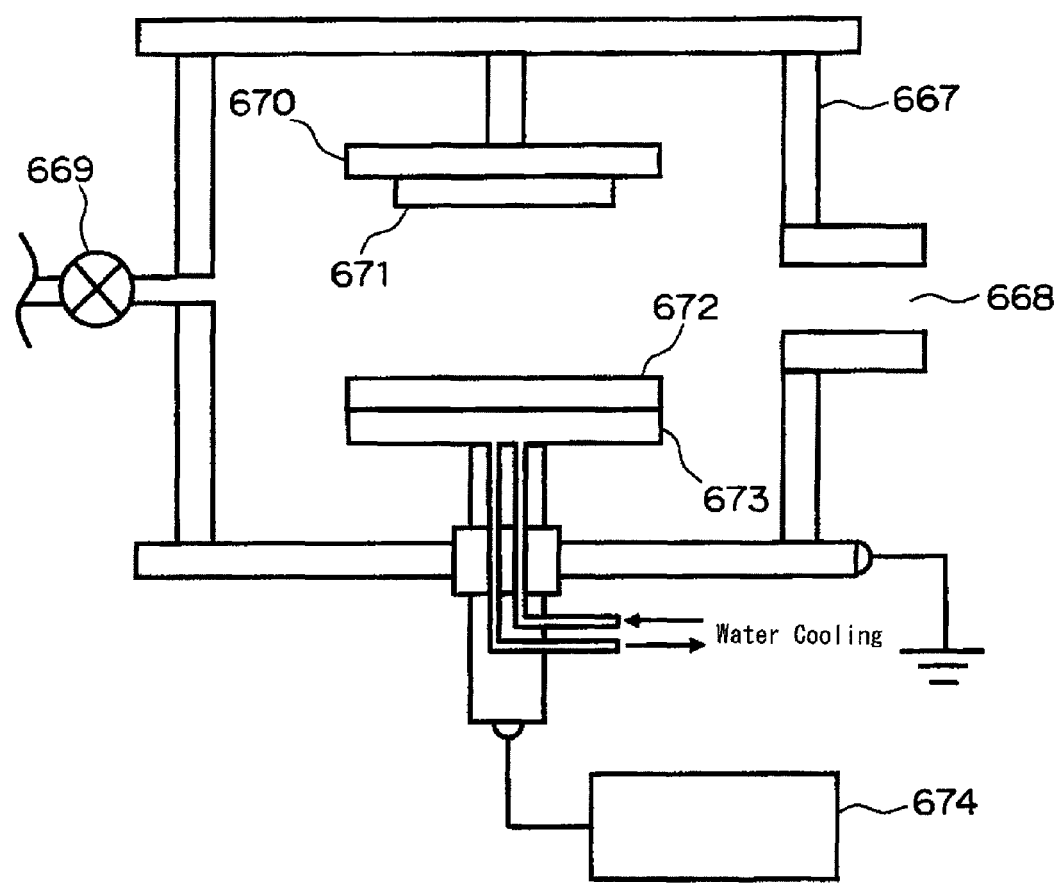
FIG. 16 is a schematic diagram showing a part of a film formation apparatus used to produce the information recording medium of the present invention.

An example of sputtering apparatus (film formation apparatus) used in the production of the information recording medium of the present invention will now be described. FIG. 16 schematically shows the step of forming a film by using the sputtering apparatus. As shown in FIG. 16, in the sputtering apparatus, a vacuum pump (not shown) is connected via an evacuation port 668 to a vacuum vessel 667, so that a state of a high degree of vacuum can be maintained in the vacuum vessel 667. Gas is supplied at a constant rate through a gas supply port 669. A substrate 671 (the substrate is a base upon which the intended film is to be deposited) is placed on an anode 670. The vacuum vessel 667 is grounded so as to keep the vacuum vessel 667 and the substrate 671 at the anode.

The sputtering target 672 is connected to the cathode 673, and is connected via a switch (not shown) to a power source 674. In the embodiment illustrated, the cathode 673 is water-cooled. When a predetermined voltage is applied across the anode 670 and the cathode 673, the sputtering target 672 releases particles so as to form a thin film on the substrate 671. This apparatus can be used to form the films that constitute the information layer, and can also be used to produce media of other forms to be described later.

In the embodiment illustrated, formation of the information layer 40 begins with the formation of the reflective layer 402 on the substrate 21. The reflective layer 402 can be formed by carrying out DC sputtering of a sputtering target made of a metal or alloy that constitutes the reflective layer 402 in rare gas atmosphere or mixed gas atmosphere of rare gas and reactive gas.

Then a reflective-layer side interface layer 403 is formed as required on the reflective layer 402. The reflective-layer side interface layer 403 is formed by carrying out sputtering of a sputtering target made of a material that constitutes the reflective-layer side interface layer 403 in rare gas atmosphere or mixed gas atmosphere of rare gas and reactive gas. In the case where the reflective-layer side interface layer 403 is to be formed from a material having high electrical conductivity such as metal, a DC sputtering method is employed. In the case where it is to be formed from a material having low electrical conductivity (such as oxide), an RF sputtering method may be employed.

Then the first dielectric layer 404 is formed on the reflective-layer side interface layer 403 or on the reflective layer 402. The first dielectric layer 404 is formed by carrying out RF sputtering of a sputtering target made of a material that constitutes the first dielectric layer 404 in rare gas atmosphere or mixed gas atmosphere of rare gas and reactive gas. The first dielectric layer 404 may also be formed by DC sputtering method if it is appropriate.

Then the first interface layer 405 is formed as required on the first dielectric layer 404. The first interface layer 405 is formed by carrying out RF sputtering of a sputtering target made of a material that constitutes the first interface layer 405 in rare gas atmosphere or mixed gas atmosphere of rare gas and reactive gas. The first interface layer 405 may also be formed by DC sputtering method if it is appropriate.

Then the recording layer 406 is formed on the first interface layer 405 or on the first dielectric layer 404. The recording layer 406 may be formed by sputtering a sputtering target that contains Sb and S in a rare gas atmosphere. Specifically, the recording layer 406 can be formed by DC sputtering of a sputtering target that has been prepared by adjusting the composition so that the recording layer 406 would include the material represented by the formula (1) above. For example, the sputtering target contains Sb and S, and the material represented by the formula (11) shown below:

$$Sb_xS_{100-x}(\text{atomic \%}) \qquad (11)$$

wherein suffix X represents the proportion in atomic % and satisfies a relationship of $50 \leq X \leq 98$.

The recording layer 406 may also be formed by using a sputtering target prepared by adding at least one element selected from among Sn, Bi, In, Ge and Mn to the sputtering target described above. Specifically, the recording layer 406 can be formed by DC sputtering of a sputtering target that has been prepared by controlling the composition so that the recording layer 406 would include a material of the composition represented by the formula (2), (3) or (4) above. The sputtering target contains, for example, the material represented by the formulas (12) to (14) shown below.

$$(Sb_zS_{1-z})_{100-Y}M1_Y(\text{atomic \%}) \qquad (12)$$

wherein M1 represents at least one element selected from among Ge, In and Sn, suffix Z represents the proportion of each atom to the sum of the number of Sb atoms and the number of S atoms which sum is set to 1, and satisfies a relationship of $0.5 \leq Z \leq 0.98$, while suffix Y represents the proportion in atomic %, and satisfies a relationship of $0 < Y \leq 30$.

$$(Sb_A S_{1-A})_{100-B} M2_B (\text{atomic \%}) \qquad (13)$$

wherein M2 represents at least one element selected from among Bi and Mn, suffix A represents the proportion of each atom to the sum of the number of Sb atoms and the number of S atoms which sum is set to 1, and satisfies a relationship of $0.5 \leq A \leq 0.98$, while suffix B represents the proportion in atomic %, and satisfies a relationship of $0 < B \leq 20$.

$$(Sb_c S_{1-c})_{100-D-E} M1_E M2_E (\text{atomic \%}) \qquad (14)$$

wherein M1 represents at least one element selected from among Ge, In and Sn, M2 represents at least one element selected from among Bi and Mn, suffix C represents the proportion of each atom to the sum of the number of Sb atoms and the number of S atoms which sum is set to 1, and satisfies a relationship of $0.5 \leq C \leq 0.98$, while suffixes D and E represent the proportion in atomic %, and satisfy relationships of $0 < D < 30$, $0 < E \leq 20$ and $0 < D+E \leq 30$.

Alternatively, the recording layer 406 may also be formed by simultaneously sputtering two or more sputtering targets selected from among sputtering targets of compositions represented by Sb, S, M (M represents at least one element selected from among Sn, Bi, In, Ge and Mn), Sb—S, Sb-M, S-M and Sb—S-M. In this case, since composition of the recording layer to be formed is determined by the number of sputtering targets used and the output power of the power source, sputtering operation is carried out while selecting these factors appropriately so as to form a film of the desired composition. Use of two or more sputtering targets is useful when it is difficult to prepare a sputtering target of a mixed material.

Then the second interface layer 407 is formed as required on the recording layer 406. The second interface layer 407 is formed by carrying out RF sputtering of a sputtering target made of a material that constitutes the second interface layer 407 in rare gas atmosphere or mixed gas atmosphere of rare gas and reactive gas. The second interface layer 407 may also be formed by DC sputtering method if it is appropriate.

Then the second dielectric layer 408 is formed on the second interface layer 407 or on the recording layer 406. The second dielectric layer 408 is formed by carrying out RF sputtering of a sputtering target made of a material that constitutes the second dielectric layer 408 in rare gas atmosphere or mixed gas atmosphere of rare gas and reactive gas. The second dielectric layer 407 may also be formed by DC sputtering method if it is appropriate.

The information layer 40 is formed on the substrate 21 as described above, and the transparent layer 23 is formed on the information layer 40. The transparent layer 23 can be formed by applying the second information layer 41 by a spin coating method with an ultraviolet curable resin (such as acrylic resin or epoxy resin) or a delayed thermosetting resin and curing the resin. The transparent layer 23 may also be formed in a disk-shaped plate or sheet made of a polycarbonate resin, a polymethyl methacrylate resin, a polyolefin resin, a norbornene resin, glass or the like. In this case, the transparent layer 23 can also be formed by coating the information layer 40 with an ultraviolet curable resin or a delayed thermosetting resin, placing a plate or sheet on the resin that has been applied and curing the resin. As an alternative method, a plate or sheet having an adhesive resin applied evenly thereon may be put into contact with the second dielectric layer 408.

The recording layer 406 of the information recording medium 11 is usually in amorphous phase as deposited. Therefore, an initialization process may be carried out as required, in which the recording layer 406 is irradiated with laser beam so as to crystallize.

The information recording medium 11 is produced as described above. In this embodiment, the sputtering method is employed for forming each of the films that constitute the information layer. The film forming method is not limited to this, and vacuum vapor deposition process, ion plating process or MBE (molecular beam epitaxy) process, etc. may also be employed.

Second Embodiment

Figure 3:
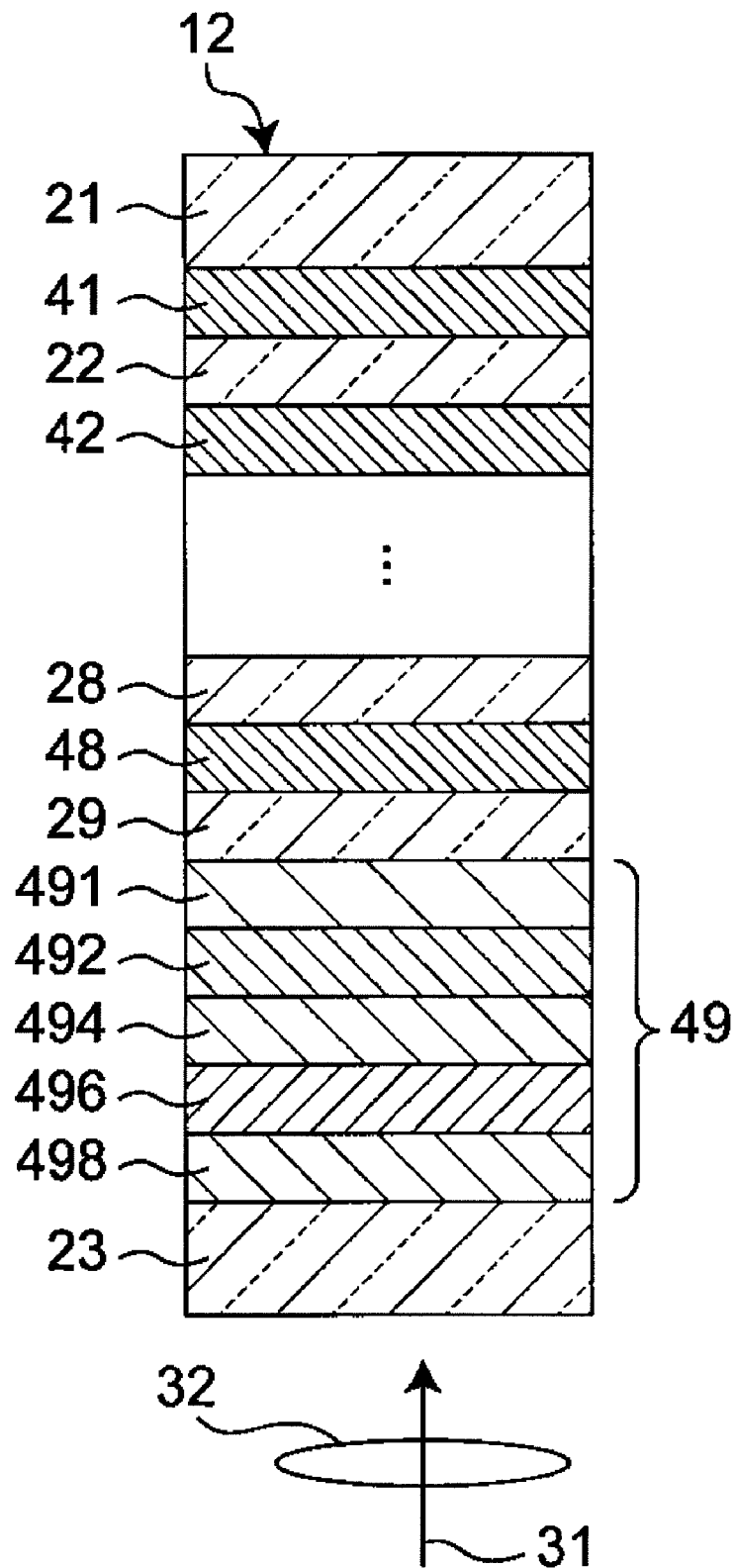
FIG. 3 is a sectional view showing an example of constitution of the information recording medium of the present invention.

Another example of the information recording medium of the present invention will be described as a second embodiment. FIG. 3 is a partial sectional view of an information recording medium 12 of the second embodiment. The information recording medium 12 is a multi-layer optical recording medium, on and from which information is recorded and reproduced by irradiating the medium with the laser beam 31 that is focused by the object lens 32.

In the information recording medium 12, N information layers (N is an integer, $N \geq 2$); a first information layer 41, a second information layer 42, . . . , an (N−1)st information layer 48 and an Nth information layer 49, and the transparent layer 23 are provided in this order on the substrate 21 (hereinafter an information layer disposed at the Kth position ($1 \leq K \leq N$) when the layers are counted from the side opposite to the laser incident side will be called the Kth information layer). Adjacent information layers are separated by separation layers 22, . . . , 28, 29 that are disposed therebetween.

In the information recording medium 12, laser beam that reaches one information layer that is located nearer to the substrate 21 than the Nth information layer 49 and reflection thereof transmit through the information layers located nearer to the laser beam 31 incident side than the information layer and thereby attenuate. Therefore, the first information layer 41, the second information layer 42, . . . , and the (N−1)th information layer 48 are required to have high recording sensitivity and high reflectance, while the second information layer 42, . . . , the (N−1)th information layer 48 and the Nth information layer 49 are required to have high transmittance.

Materials, shapes and functions of the substrate 21 and the transparent layer 23 are as described in relation to the first embodiment, and detailed description thereof will be omitted here.

The separation layers 22, . . . , 28, 29 are provided for the purpose of distinguishing the focusing positions of the first information layer 41, the second information layer 42, . . . , and the Nth information layer 49 of the information recording medium 12. The separation layers 22, . . . , 28, 29 preferably have thicknesses not less than the focal depth that is determined by the numerical aperture NA of the objective lens 32 and the wavelength of the laser beam 31. It is necessary to dispose all of the information layers separated by the separation layers 22, . . . , 28, 29 within a space where the laser beam can be focused by the objective lens 32. To meet this requirement, it is necessary to keep the thickness of the separation layers 22, . . . , 28, 29 within a certain level. In the case where $\lambda$ is 405 nm and NA value is 0.85, the thicknesses of the separation layers 22, . . . , 28, 29 are preferably in a range of from 5 μm to 50 μm.

The separation layers 22, . . . , 28, 29 preferably have low optical absorptance to the laser beam 31. The separation layers 22, . . . , 28, 29 may have, on the side thereof facing the incident laser beam 31, guide grooves that guide the laser beam 31. The separation layers 22, . . . , 28, 29 may be formed from a polycarbonate resin, a polymethyl methacrylate resin, a polyolefin resin, a norbornene resin, an ultraviolet curable resin, a delayed thermosetting resin, glass or a combination of these materials.

In the case where the present invention provides a medium of multi-layer structure as shown in FIG. 3, it suffices that at least one Kth information layer (K is an integer, $1 \leq K \leq N$) among the N information layers includes a recording layer that is capable of undergoing phase change. For example, only the Nth information layer 49 may be a rewritable information layer having the recording layer that contains the material containing Sb and S and represented by any one of the formulas (1) to (4) described in relation to the recording layer 406 of the first embodiment (such a recording layer may be referred to as the "recording layer that contains Sb and S" in this specification including the description that follows). In this case, the N−1 information layers from the first information layer 41 to the (N−1)st information layer 48 may be either information layers for reproduction only, or write-once information layers that allow writing only once.

Alternatively, at least one information layer among N−1 information layers from the Nth information layer to the second information layer may be a rewritable information layer that has the recording layer that contains Sb and S. Since the material represented by one of the formulas (1) to (4) that contains Sb and S has high transmittance, it is suited for constituting the recording layers of the information layers other than the first information layer (namely the information layer through which laser beam passes before being used in recording information on or reproducing information from other information layer). Alternatively, all information layers may have recording layers that contain Sb and S. In the case where the recording medium has only one recording layer that contains Sb and S, the recording layer that contains Sb and S is preferably contained in the Nth information layer, because the Nth information layer is required to have the highest transmittance.

The constitution of the Nth information layer 49 will now be described.

As shown in FIG. 3, the Nth information layer 49 has a transmittance adjustment layer 491, a reflective layer 492, a first dielectric layer 494, a recording layer 496 and a second dielectric layer 498 provided in this order from the side near the substrate 21. As required, additional layers may be provided; a reflective-layer side interface layer between the reflective layer 492 and the first dielectric layer 494, a first interface layer between the first dielectric layer 494 and the recording layer 496, and a second interface layer between the second dielectric layer 498 and the recording layer 496. In FIG. 3, the reflective-layer side interface layer can be shown as the layer denoted as 493 disposed between the layers 491 and 492, the first interface layer can be shown as the layer denoted as 495 disposed between the layers 492 and 494, and the second interface layer can be shown as the layer denoted as 497 disposed between the layers 496 and 498.

The recording layer 496 may be formed from a material similar to that of the recording layer 406 of the first embodiment. A material that contains Sb and S has high transparency, and is therefore suitable as the material to form the recording layer 496. In the case where other information layer has recording layer that contains Sb and S, the recording layer 496 may be formed from a material that contains any one of (Ge—Sn)Te, GeTe—Sb$_2$Te$_3$, (Ge—Sn)Te—Sb$_2$Te$_3$, GeTe—Bi$_2$Te$_3$, (Ge—Sn) Te—Bi$_2$Te$_3$, GeTe—(Sb—Bi)$_2$Te$_3$, (Ge—Sn)Te—(Sb—Bi)$_2$Te$_3$, GeTe—(Bi—In)$_2$Te$_3$, (Ge—Sn) Te—(Bi—In)$_2$Te$_3$, Sb—Te, Sb—Ge, (Gb—Te)—Ge, Sb—In, (Sb—Te)—In, Sb—Ga and (Sb—Te)—Ga. In order to achieve high transmittance of the Nth information layer 49, the thickness of the recording layer 496 is preferably not larger than 10 nm, and more preferably in a range of from 2 nm to 8 nm.

The reflective layer 492 has a function similar to that of the reflective layer 402 of the first embodiment. That is, the reflective layer 492 has an optical function to increase the intensity of light absorbed by the recording layer 496 and a thermal function to dissipate the heat generated in the recording layer 496. Therefore, the reflective layer 492 may be formed from a material similar to that of the reflective layer 402 described in relation to the first embodiment. An Ag alloy, in particular, has high heat conductivity and therefore is preferably used to form the reflective layer 492.

In order to achieve high transmittance of the Nth information layer 49, the thickness of the reflective layer 492 is preferably not larger than 20 nm, and more preferably in a range of from 3 nm to 14 nm. The reflective layer 492 having thickness within this range can fully perform the optical and thermal functions thereof.

The first dielectric layer 494 has a function similar to that of the first dielectric layer 404 of the first embodiment. That is, the first dielectric layer 494 has a thermal function to control the heat dissipation from the recording layer 496 to the reflective layer 492, and an optical function to control the reflectance and absorptance. Therefore, the first dielectric layer 494 may be formed from a material similar to that of the first dielectric layer 404 of the first embodiment.

In order to fully achieve the optical and thermal functions, the thickness of the first dielectric layer 494 is preferably in a range of from 1 nm to 40 nm, and more preferably from 4 nm to 30 nm.

The second dielectric layer 498 has functions similar to those of the second dielectric layer 408 of the first embodiment. That is, the second dielectric layer 498 has the function to prevent the recording layer 496 from being corroded and deforming and the optical function to control the reflectance and absorptance. Therefore, the second dielectric layer 498 may be formed from a material similar to that of the second dielectric layer 408 described in relation to the first embodiment. The thickness of the second dielectric layer 498 can be precisely determined by calculation based on a matrix method, so as to maximize the difference in the intensity of reflected light between the cases when the recording layer 496 is in crystal phase and when it is in amorphous phase.

The transmittance adjustment layer 491 is made of a dielectric material, and has a function of controlling the transmittance of the Nth information layer 49. The transmittance adjustment layer 491 makes it possible to increase both the transmittance Tc (%) of the Nth information layer 49 when the recording layer 496 is in crystal phase and the transmittance Ta (%) of the Nth information layer 49 when the recording layer 496 is in amorphous phase.

The transmittance adjustment layer 491 may be formed from a compound selected from among oxide such as TiO$_2$, ZrO$_2$, HfO$_2$, ZnO, Nb$_2$O$_5$, Ta$_2$O$_5$, Al$_2$O$_3$, SiO$_2$, Cr$_2$O$_3$, CeO$_2$, Ga$_2$O$_3$, and Bi$_2$O$_3$, nitride such as Ti—N, Zr—N, Nb—N, Ge—N, Cr—N or Al—N and sulfide such as ZnS, or a mixture of two or more of these compounds. A refractive index $n_t$ and an extinction coefficient $k_t$ of the transmittance adjustment layer 491 are preferably in ranges of $n_t \geq 2.4$ and $k_t \leq 0.1$, respectively, in order to increase the transmittance Tc and Ta. It is preferable to use TiO$_2$ or a material that contains TiO$_2$, as the material that satisfies these conditions. This is because these materials have a high refractive index ($n_t$=2.6 to 2.8) and a small extinction coefficient ($k_t$=0.0 to 0.1), and therefore the transmittance adjustment layer 491 formed from one of these materials effectively increases the transmittance of the Nth information layer 49.

The transmittance Tc and Ta can be more effectively increased when the thickness of the transmittance adjustment layer 491 is approximately $\lambda/8n_t$ ($\lambda$ is the wavelength of the laser beam 31, and $n_t$ is the refractive index of the material of the transmittance adjustment layer 491). Assuming $\lambda$=405 nm and $n_t$=2.6, the thickness of the transmittance adjustment layer 491 is preferably in a range of from 5 nm to 36 nm, when reflectance and other factors are taken into consideration.

The reflective-layer side interface layer, the first interface layer and the second interface layer have functions similar to those of the reflective-layer side interface layer 403, the first interface layer 405 and the second interface layer 407, respectively, of the first embodiment. Therefore, these layers are made of materials similar to those of the reflective-layer side interface layer 403, the first interface layer 405 and the second interface layer 407 described in relation to the first embodiment, respectively.

The information recording medium 12 can be produced by the following process.

First, N−1 information layers from the first information layer 41 to the (N−1)st information layer 48 are formed successively on the substrate 21 with the separation layers 22, . . . , 28 interposed therebetween. Each information layer comprises multiple films, each of which can be formed successively by sputtering. The separation layers 22, . . . , 28 may be formed by applying an ultraviolet curable resin (such as acrylic resin or epoxy resin) or a delayed thermosetting resin over the information layer, spreading the resin evenly by turning the entire structure (spin coating) and curing the resin. In the case where the separation layers 22, . . . , 28 have guide grooves that guide the laser beam 31, the guide grooves may be formed by pressing a base (die) having the grooves formed therein against the resin that is not yet cured, curing the resin in this state and removing the base.

After forming the N−1 information layers on the substrate 21 with the separation layers 22, . . . , 28 interposed therebetween as described above, the separation layer 29 is formed on the (N−1)st information layer.

Then the Nth information layer 49 is formed on the separation layer 29.

Specifically, the transmittance adjustment layer 491 is formed on the separation layer 29. The transmittance adjustment layer 491 can be formed by sputtering, according to the RF sputtering method or the DC sputtering method, a sputtering target made of a material that constitutes the transmittance adjustment layer 491 in rare gas atmosphere or mixed gas atmosphere of rare gas and reactive gas.

Then the reflective layer 492 is formed on the transmittance adjustment layer 491. The reflective layer 492 can be formed by a method similar to that of forming the reflective layer 402 of the first embodiment.

When it is necessary, a reflective-layer side interface layer is formed on the reflective layer 492. The reflective-layer side interface layer can be formed by a method similar to that of forming the reflective-layer side interface layer 403 of the first embodiment.

Then the first dielectric layer 494 is formed on the reflective-layer side interface layer or on the reflective layer 492. The first dielectric layer 494 can be formed by a method similar to that of forming the first dielectric layer 404 of the first embodiment.

When it is necessary, a first interface layer is formed on the first dielectric layer 494. The first interface layer can be formed by a method similar to that of forming the first interface layer 405 of the first embodiment.

Then the recording layer 496 is formed on the first interface layer or on the first dielectric layer 494. In the case where the recording layer 496 contains Sb and S, it can be formed by a method similar to that of forming the recording layer 406 of the first embodiment. In the case where the recording layer 406 is formed from other material, it can be formed by sputtering a sputtering target that is selected in accordance to the material.

When it is necessary, a second interface layer is formed on the recording layer 496. The second interface layer can be formed by a method similar to that of forming the second interface layer 407 of the first embodiment.

Then the second dielectric layer 498 is formed on the second interface layer or on the recording layer 496. The second dielectric layer 498 can be formed by a method similar to that of forming the second dielectric layer 408 of the first embodiment.

Then the Nth information layer 49 is formed on the separation layer 29, and the transparent layer 23 is formed on the Nth information layer 49. The transparent layer 23 can be formed by the method described in relation to the first embodiment.

The recording layers of the information recording medium 12 are usually in amorphous phase as deposited. Therefore, an initialization process may be carried out as required, in which the recording layer is irradiated with laser beam so as to crystallize.

The information recording medium 12 can be produced as described above. In this embodiment, the sputtering method is employed for forming each of the films that constitute the information layer. The film forming method is not limited to this, and vacuum vapor deposition process, ion plating process, MBE process or the like may also be employed.

Third Embodiment

Figure 4:
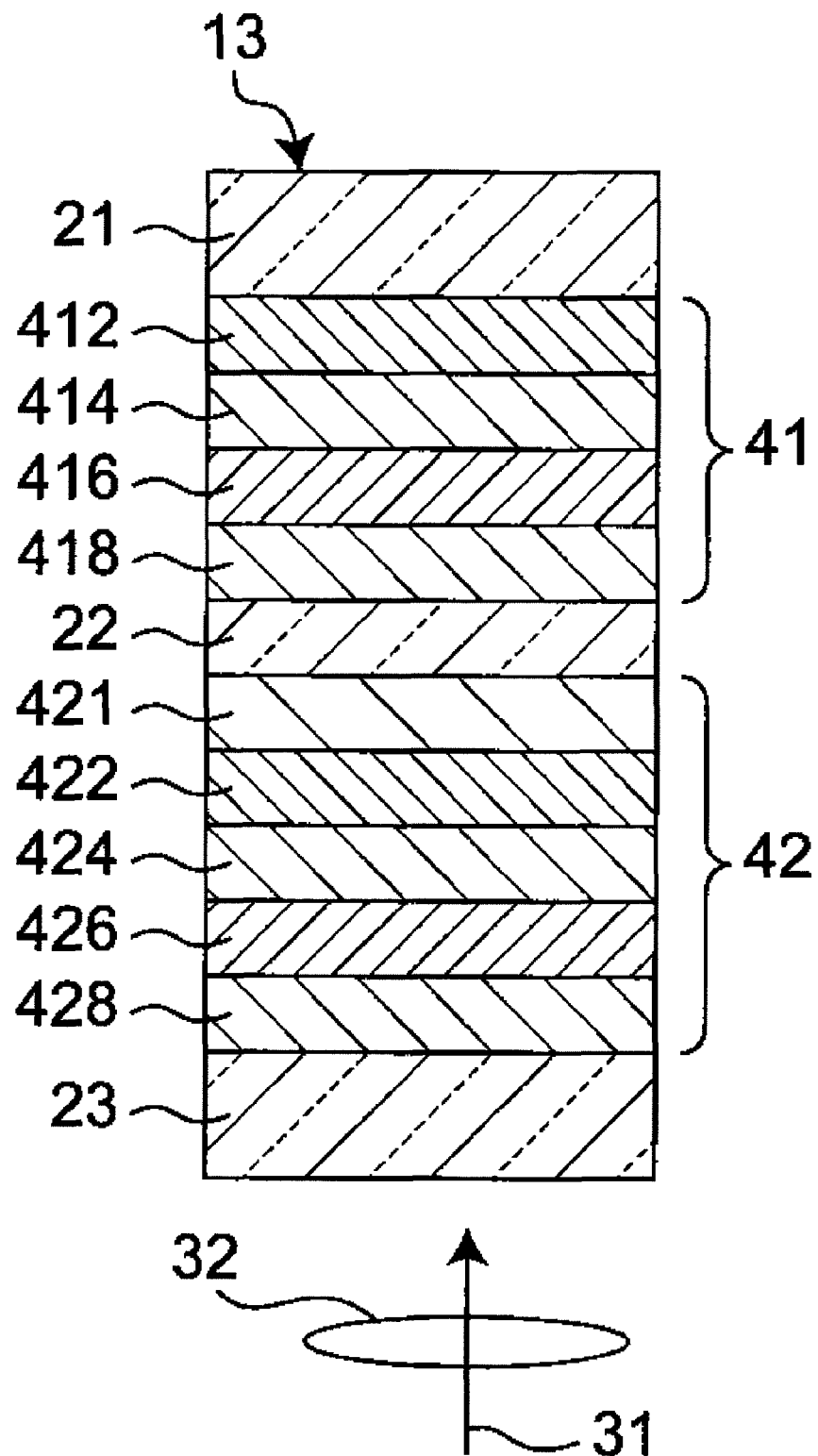
FIG. 4 is a sectional view showing an example of constitution of the information recording medium of the present invention.

A multi-layer recording medium according to the second embodiment of the present invention with n=4, namely an example of an information recording medium comprising two information layers will be described as a third embodiment. FIG. 4 is a partial sectional view of an information recording medium 13 of the third embodiment. The information recording medium 13 is a double-layer optical recording medium, on and from which information is recorded and reproduced by irradiating the medium with the laser beam 31 that is focused by the objective lens 32.

In the information recording medium 13, the first information layer 41, the separation layer 22, the second information layer 42 and the transparent layer 23 are formed in this order on the substrate 21.

Materials, shapes and functions of the substrate 21, the separation layer 22 and the transparent layer 23 are as described in relation to the first and second embodiments.

The second information layer 42 plays a role similar to that of the Nth information layer 49 described in relation to the second embodiment (because N=2 in the third embodiment). Therefore, the layers that constitute the second information layer 42 can be formed from the materials of the layers that constitute the Nth information layer 49 described in relation to the second embodiment. Shapes and functions of the layers that constitute the second information layer 42 are similar to those of the layers that constitute the Nth information layer 49 described in relation to the second embodiment.

The constitution of the first information layer 41 will now be described.

In the first information layer 41, as shown in FIG. 4, a reflective layer 412, a first dielectric layer 414, a recording layer 416 and a second dielectric layer 418 are provided in this order from the side near the substrate 21. As required, additional layers may be provided; a reflective-layer side interface layer between the reflective layer 412 and the first dielectric layer 414, a first interface layer between the first dielectric layer 414 and the recording layer 416, and a second interface layer between the second dielectric layer 418 and the recording layer 416. In FIG. 4, the reflective-layer side interface layer can be shown as the layer denoted as 413 disposed between the layers 412 and 414, the first interface layer can be shown as the layer denoted as 415 disposed between the layers 414 and 416, and the second interface layer can be shown as the layer denoted as 417 disposed between the layers 416 and 418.

The recording layer 416 may be formed from a material similar to that of the recording layer 406 of the first embodiment. In the case where the second information layer 42 has a recording layer that contains Sb and S, the recording layer 416 may be formed from (Ge—Sn)Te, GeTe—$Sb_2Te_3$, (Ge—Sn) Te—$Sb_2Te_3$, GeTe—$Bi_2Te_3$, (Ge—Sn) Te—$Bi_2Te_3$, GeTe—(Sb—Bi)$_2Te_3$, (Ge—Sn)Te—(Sb—Bi)$_2Te_3$, GeTe—(Bi—In)$_2Te_3$, (Ge—Sn)Te—(Bi—In)$_2Te_3$, Sb—Te, Sb—Ge, (Gb—Te)—Ge, Sb—In, (Sb—Te)—In, Sb—Ga or (Sb—Te)—Ga.

The reflective layer 412, the first dielectric layer 414 and the second dielectric layer 418 have functions similar to those of the reflective layer 402, the first dielectric layer 404 and the second dielectric layer 408 of the first embodiment, and can be formed from materials similar to those of these layers.

The reflective-layer side interface layer, the first interface layer and the second interface layer have functions similar to those of the reflective-layer side interface layer 403, the first interface layer 405 and the second interface layer 407 of the first embodiment, and can be formed from materials similar to those of these layers.

The information recording medium 13 can be produced by the following process.

First, the first information layer 41 is formed on the substrate 21 (having a thickness of, for example, 1.1 mm).

Specifically, the reflective layer 412 is firstly formed on the substrate 21. The reflective layer 412 can be formed by a method similar to that of forming the reflective layer 402 of the first embodiment.

When it is necessary, the reflective-layer side interface layer is formed on the reflective layer 412. The reflective-layer side interface layer can be formed by a method similar to that of forming the reflective-layer side interface layer 403 of the first embodiment.

Then the first dielectric layer 414 is formed on the reflective-layer side interface layer or on the reflective layer 412. The first dielectric layer 414 can be formed by a method similar to that of forming the first dielectric layer 404 of the first embodiment.

When it is necessary, a first interface layer is formed on the first dielectric layer 414. The first interface layer can be formed by a method similar to that of forming the first interface layer 405 of the first embodiment.

Then the recording layer 416 is formed on the first interface layer or on the first dielectric layer 414. In the case where the recording layer 416 contains Sb and S, it can be formed by a method similar to that of forming the recording layer 406 of the first embodiment. In the case where the recording layer 416 is formed from other material, it can be formed by a sputtering method wherein a sputtering target is selected in accordance to the material.

When it is necessary, a second interface layer is formed on the recording layer 416. The second interface layer can be formed by a method similar to that of forming the second interface layer 407 of the first embodiment.

Then the second dielectric layer 418 is formed on the second interface layer or on the recording layer 416. The second dielectric layer 418 can be formed by a method similar to that of forming the second dielectric layer 408 of the first embodiment.

The first information layer 41 is formed on the substrate 21, and then the separation layer 22 is formed on the first information layer 41. The separation layer 22 can be formed by the method described in relation to the second embodiment.

After forming the second dielectric layer 418 or the separation layer 22, an initialization process may be carried out as required, by irradiating the recording layer 416 with laser beam so as to crystallize.

Then the second information layer 42 is formed on the separation layer 22.

Specifically, the transmittance adjustment layer 421 is formed on the separation layer 22. The transmittance adjustment layer 421 can be formed by a method similar to that of forming the transmittance adjustment layer 491 of the second embodiment.

Then the reflective layer 422 is formed on the transmittance adjustment layer 421. The reflective layer 422 can be formed by a method similar to that of forming the reflective layer 492 of the second embodiment.

When it is necessary, a reflective-layer side interface layer is formed on the reflective layer 422. The reflective-layer side interface layer can be formed by a method similar to that of forming the reflective-layer side interface layer of the second embodiment.

Then the first dielectric layer 424 is formed on the reflective-layer side interface layer or on the reflective layer 422. The first dielectric layer 424 can be formed by a method similar to that of forming the first dielectric layer 494 of the second embodiment.

When it is necessary, a first interface layer is formed on the first dielectric layer 424. The first interface layer can be formed by a method similar to that of forming the first interface layer of the second embodiment.

Then the recording layer 426 is formed on the first interface layer or on the first dielectric layer 424. The recording layer 426 can be formed by a method similar to that of forming the recording layer 496 of the second embodiment.

When it is necessary, a second interface layer is formed on the recording layer 426. The second interface layer can be formed by a method similar to that of forming the second interface layer of the second embodiment.

Then the second dielectric layer 428 is formed on the second interface layer or on the recording layer 426. The second dielectric layer 428 can be formed by a method similar to that of forming the second dielectric layer 498 of the second embodiment.

Then the second information layer 42 is formed on the separation layer 22, and the transparent layer 23 is formed on the second information layer 42. The transparent layer 23 can be formed by the method described in relation to the first embodiment.

The recording layers of the information recording medium 13 are usually in amorphous phase as deposited. Therefore, an initialization process may be carried out as required, in which the recording layer is irradiated with laser beam so as to crystallize. In the case where the recording layer 416 has been already initialized, only the recording layer 426 may be initialized after forming the second information layer 42.

The information recording medium 13 can be produced as described above. In this embodiment, the sputtering method is employed for forming each of the films that constitute the information layer. The film forming method is not limited to this, and vacuum vapor deposition process, ion plating process or MBE process or the like may also be employed.

In the case where N is 2, bluish violet laser having a wavelength of about 405 nm is used in recording and reproduction, and one information layer has about 25 GB of recording capacity, then an information recording medium having recording capacity of about 50 GB can be made. An information recording medium having recording capacity of about 66 GB can also be made by increasing the recording density so as to form information layers each having about 33 GB of recording capacity.

Fourth Embodiment

Figure 5:
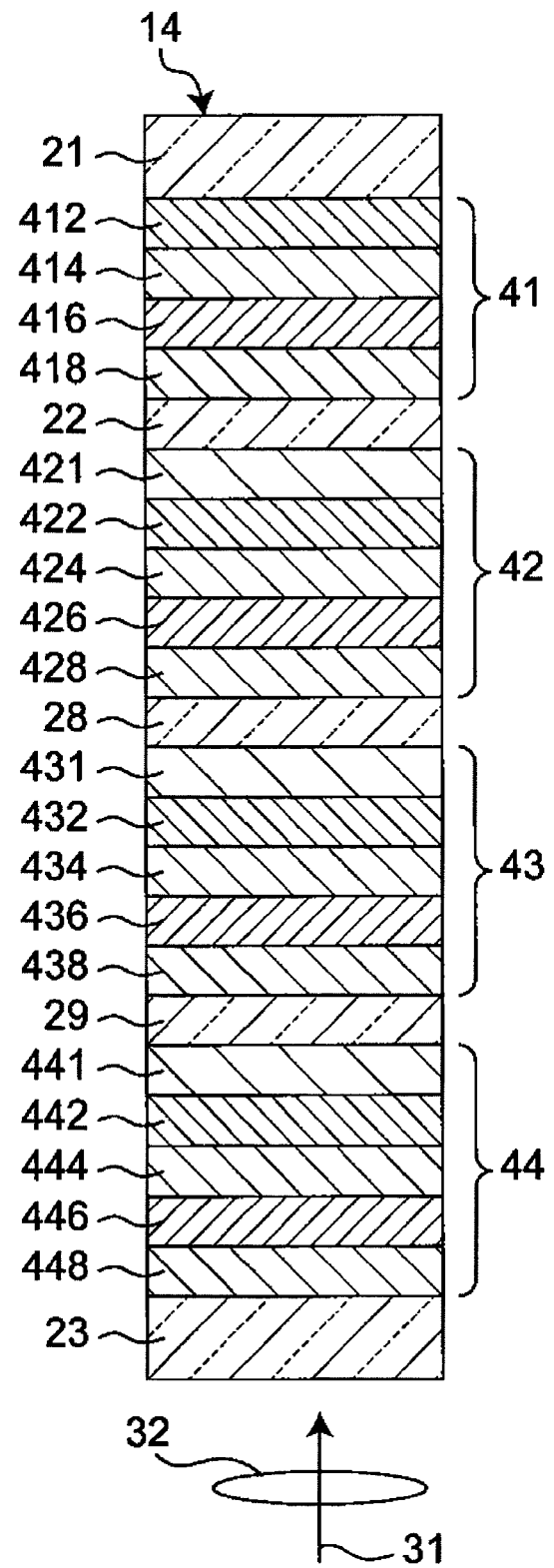
FIG. 5 is a sectional view showing an example of constitution of the information recording medium of the present invention.

A multi-layer information recording medium according to the second embodiment of the present invention with n=4, namely an example of an information recording medium comprising four information layers will be described as a fourth embodiment. FIG. 5 is a partial sectional view of an information recording medium 14 of the fourth embodiment. The information recording medium 14 is a four-layer optical recording medium, on and from which information is recorded and reproduced by irradiating the medium with the laser beam 31 that is focused by the objective lens 32.

In the information recording medium 14, the first information layer 41, the separation layer 22, the second information layer 42, the separation layer 28, the third information layer 43, the separation layer 29, the fourth information layer 44, and the transparent layer 23 are formed in this order on the substrate 21.

In the information recording medium 12, laser beam that reaches the information layer located nearer to the substrate 21 than the fourth information layer 44 and reflection thereof transmit through the information layers located nearer to the side where the laser beam 31 enters than the information layer mentioned above and thereby attenuate. Therefore the first information layer 41, the second information layer 42 and the third information layer 43 are required to have high recording sensitivity and high reflectance, while the second information layer 42, the third information layer 43 and the fourth information layer 44 are required to have high transmittance.

The substrate 21, the separation layers 22, 28, 29, and the transparent layer 23 can be formed from materials similar to those described in relation to the first and second embodiments, while the shapes and functions of the layers are as described in relation to the first and second embodiments.

Materials, shapes and functions of the layers that constitute the first information layer 41 are as described in relation to the third embodiment, and detailed description thereof will be omitted here.

The fourth information layer 44 plays a role similar to that of the Nth information layer 49 described in relation to the second embodiment (because N=4 in the fourth embodiment). Therefore, the layers that constitute the fourth information layer 44 can be formed from the materials of layers that constitute the Nth information layer 49 described in relation to the second embodiment. Shapes and functions of the layers that constitute the fourth information layer 44 are similar to those of the layers that constitute the Nth information layer 49 described in relation to the second embodiment.

The constitutions of the second information layer 42 and the third information layer 43 will now be described.

In the second information layer 42, a transmittance adjustment layer 421, a reflective layer 422, a first dielectric layer 424, a recording layer 426 and a second dielectric layer 428 are provided in this order from the side near the substrate 21. As required, additional layers may be provided; a reflective-layer side interface layer disposed between the reflective layer 422 and the first dielectric layer 424, a first interface layer disposed between the first dielectric layer 424 and the recording layer 426, and a second interface layer disposed between the second dielectric layer 428 and the recording layer 426. In FIG. 5, the reflective-layer side interface layer can be shown as the layer denoted as 423 disposed between the layers 422 and 424, the first interface layer can be shown as the layer denoted as 425 disposed between the layers 424 and 426, and the second interface layer can be shown as the layer denoted as 427 disposed between the layers 426 and 428.

The recording layer 426, the reflective layer 422, the first dielectric layer 424, the second dielectric layer 428 and the transmittance adjustment layer 421 have functions similar to those of the recording layer 496, the reflective layer 492, the first dielectric layer 494, the second dielectric layer 498 and the transmittance adjustment layer 491 of the second embodiment, and can be formed from similar materials.

The reflective-layer side interface layer, the first interface layer and the second interface layer have functions similar to those of the reflective-layer side interface layer, the first interface layer and the second interface layer of the second embodiment, respectively, and can be formed from materials similar to those of these layers.

In the third information layer 43, a transmittance adjustment layer 431, a reflective layer 432, a first dielectric layer 434, a recording layer 436 and a second dielectric layer 438 are provided in this order from the side near the substrate 21. As required, additional layers may be provided; a reflective-layer side interface layer between the reflective layer 432 and the first dielectric layer 434, a first interface layer between the first dielectric layer 434 and the recording layer 436, and a second interface layer between the second dielectric layer 438 and the recording layer 436. In FIG. 5, the reflective-layer side interface layer can be shown as the layer denoted as 433 disposed between the layers 432 and 424, the first interface layer can be shown as the layer denoted as 435 disposed between the layers 434 and 436, and the second interface layer can be shown as the layer denoted as 437 disposed between the layers 436 and 438.

The recording layer 436, the reflective layer 432, the first dielectric layer 434, the second dielectric layer 438 and the transmittance adjustment layer 431 have functions similar to those of the recording layer 496, the reflective layer 492, the first dielectric layer 494, the second dielectric layer 498 and the transmittance adjustment layer 491 of the second embodiment, and can be formed from materials similar to those of these layers.

The reflective-layer side interface layer 433, the first interface layer and the second interface layer have functions similar to those of the reflective-layer side interface layer, the first interface layer and the second interface layer of the second embodiment, respectively, and can be formed from materials similar to those of these layers.

In the medium of this embodiment, it is preferable that recording layer included in one of the three information layers of from the second information layer 42 to the fourth information layer 44, contains one of the materials represented by the formulas (1) to (4) above that include Sb and S, for the reason described in relation to the second embodiment.

The information recording medium 14 can be produced by the following process.

First, the first information layer 41 is formed on the substrate 21 (having a thickness of, for example, 1.1 mm).

Specifically, the reflective layer 412, the first dielectric layer 414, the recording layer 416 and the second dielectric layer 418 are provided in this order on the substrate 21. As required, additional layers may be provided; a reflective-layer side interface layer between the reflective layer 412 and the first dielectric layer 414, a first interface layer between the first dielectric layer 414 and the recording layer 416, and a second interface layer between the second dielectric layer 418 and the recording layer 416. These layers can be formed by the method described in relation to the third embodiment.

Thus, after forming the first information layer 41 on the substrate 21, the separation layer 22 is formed on the first information layer 41. The separation layer 22 can be formed by the method described in relation to the second embodiment.

After forming the second dielectric layer 418 or the separation layer 22, an initialization process may be carried out as required, by irradiating the recording layer 416 with laser beam so as to crystallize.

Then the second information layer 42 is formed on the separation layer 22.

Specifically, the transmittance adjustment layer 421 is formed on the separation layer 22. The transmittance adjustment layer 421 can be formed by a method similar to that of forming the transmittance adjustment layer 491 of the second embodiment.

Then the reflective layer 422 is formed on the transmittance adjustment layer 421. The reflective layer 422 can be formed by a method similar to that of forming the reflective layer 492 of the second embodiment.

When it is necessary, a reflective-layer side interface layer is formed on the reflective layer 422. The reflective-layer side interface layer can be formed by a method similar to that of forming the reflective-layer side interface layer of the second embodiment.

Then the first dielectric layer 424 is formed on the reflective-layer side interface layer or on the reflective layer 422. The first dielectric layer 424 can be formed by a method similar to that of forming the first dielectric layer 494 of the second embodiment.

When it is necessary, a first interface layer is formed on the first dielectric layer 424. The first interface layer can be formed by a method similar to that of forming the first interface layer of the second embodiment.

Then the recording layer 426 is formed on the first interface layer or on the first dielectric layer 424. The recording layer 426 can be formed by a method similar to that of forming the recording layer 496 of the second embodiment.

When it is necessary, a second interface layer is formed on the recording layer 426. The second interface layer can be formed by a method similar to that of forming the second interface layer of the second embodiment.

Then the second dielectric layer 428 is formed on the second interface layer or on the recording layer 426. The second dielectric layer 428 can be formed by a method similar to that of forming the second dielectric layer 498 of the second embodiment.

As described above, the second information layer 42 is formed on the separation layer 22, and the separation layer 28 is formed on the second information layer 42. The separation layer 28 can be formed by the method described in relation to the second embodiment.

After forming the second dielectric layer 428 or the separation layer 28, an initialization process may be carried out as required, by irradiating the recording layer 426 with laser beam so as to crystallize.

Then the third information layer 43 is formed on the separation layer 28.

Specifically, the transmittance adjustment layer 431 is formed on the separation layer 28. The transmittance adjustment layer 431 can be formed by a method similar to that of forming the transmittance adjustment layer 491 of the second embodiment.

Then the reflective layer 432 is formed on the transmittance adjustment layer 431. The reflective layer 432 can be formed by a method similar to that of forming the reflective layer 492 of the second embodiment.

When it is necessary, a reflective-layer side interface layer is formed on the reflective layer 432. The reflective-layer side interface layer can be formed by a method similar to that of forming the reflective-layer side interface layer of the second embodiment.

Then the first dielectric layer 434 is formed on the reflective-layer side interface layer or on the reflective layer 432. The first dielectric layer 434 can be formed by a method similar to that of forming the first dielectric layer 494 of the second embodiment.

When it is necessary, a first interface layer is formed on the first dielectric layer 434. The first interface layer can be formed by a method similar to that of forming the first interface layer of the second embodiment.

Then the recording layer 436 is formed on the first interface layer or on the first dielectric layer 434. The recording layer 436 can be formed by a method similar to that of forming the recording layer 496 of the second embodiment.

When it is necessary, a second interface layer is formed on the recording layer 436. The second interface layer can be formed by a method similar to that of forming the second interface layer of the second embodiment.

Then the second dielectric layer 438 is formed on the second interface layer or on the recording layer 436. The second dielectric layer 438 can be formed by a method similar to that of forming the second dielectric layer 498 of the second embodiment.

As described above, the third information layer 43 is formed on the separation layer 28, and then the separation layer 29 is formed on the third information layer 43. The separation layer 29 can be formed by the method described in relation to the second embodiment.

After forming the second dielectric layer 438 or the separation layer 29, an initialization process may be carried out as required, by irradiating the recording layer 436 with laser beam so as to crystallize.

Then the fourth information layer 44 is formed on the separation layer 29.

Specifically, the transmittance adjustment layer 441, the reflective layer 442, the first dielectric layer 444, the recording layer 446 and the second dielectric layer 448 are formed in this order on the separation layer 29. At this time, additional layers may be provided as required; a reflective-layer side interface layer between the reflective layer 442 and the first dielectric layer 444, a first interface layer between the first dielectric layer 444 and the recording layer 446, and a second interface layer between the second dielectric layer 448 and the recording layer 446. These layers can be formed by the method described in relation to the second embodiment.

As described above, the fourth information layer 44 is formed on the separation layer 29, and the transparent layer 23 is formed on the fourth information layer 44. The transparent layer 23 can be formed by the method described in relation to the first embodiment.

The recording layers of the information recording medium 14 are usually in amorphous phase as deposited. Therefore, an initialization process may be carried out as required, in which the recording layer is irradiated with laser beam so as to crystallize. Or, in the case where the recording layers 416, 426 and 436 have already been initialized, only the recording layer 446 may be initialized after forming the fourth information layer 44.

The information recording medium 14 can be produced as described above. In this embodiment, the sputtering method is employed for forming each of the films that constitute the information layer. The film forming method is not limited to this, and vacuum vapor deposition process, ion plating process or MBE process may also be employed.

In the case where N is 4, bluish violet laser having a wavelength of about 405 nm is used in recording and reproduction, and one information layer has about 25 GB of recording capacity, then an information recording medium having recording capacity of about 100 GB can be made. An information recording medium having recording capacity of about 133 GB can also be made by increasing the recording density so as to form information layers each having about 33 GB of recording capacity.

Media wherein N is 2 and 4 have been described as the third and fourth embodiments, respectively. N may also be 3. A medium wherein N=3 is constituted from the substrate 21, the first information layer 42, the separation layer 22, the second information layer 42, the separation layer 28, the third information layer 43 and the transparent layer 23, among the layers shown in FIG. 4. In the medium wherein N=3, it is preferable that recording layers included in one or both of the second information layer and the third information layer include any one of the materials represented by the formulas (1) to (4) that include Sb and S. The effect of the present invention can be fully achieved also in the case where the recording layer included in the third information layer that is located nearest to the laser beam incident side contains any one of the materials represented by the formulas (1) to (4) that include Sb and S.

In the case where N is 3, bluish violet laser having a wavelength of about 405 nm is used in recording and reproduction, and one information layer has about 25 GB of recording capacity, then an information recording medium having recording capacity of about 75 GB can be made. An information recording medium having recording capacity of about 100 GB can also be made by increasing the recording density so as to form information layers each having about 33 GB of recording capacity.

Fifth Embodiment

Figure 6:
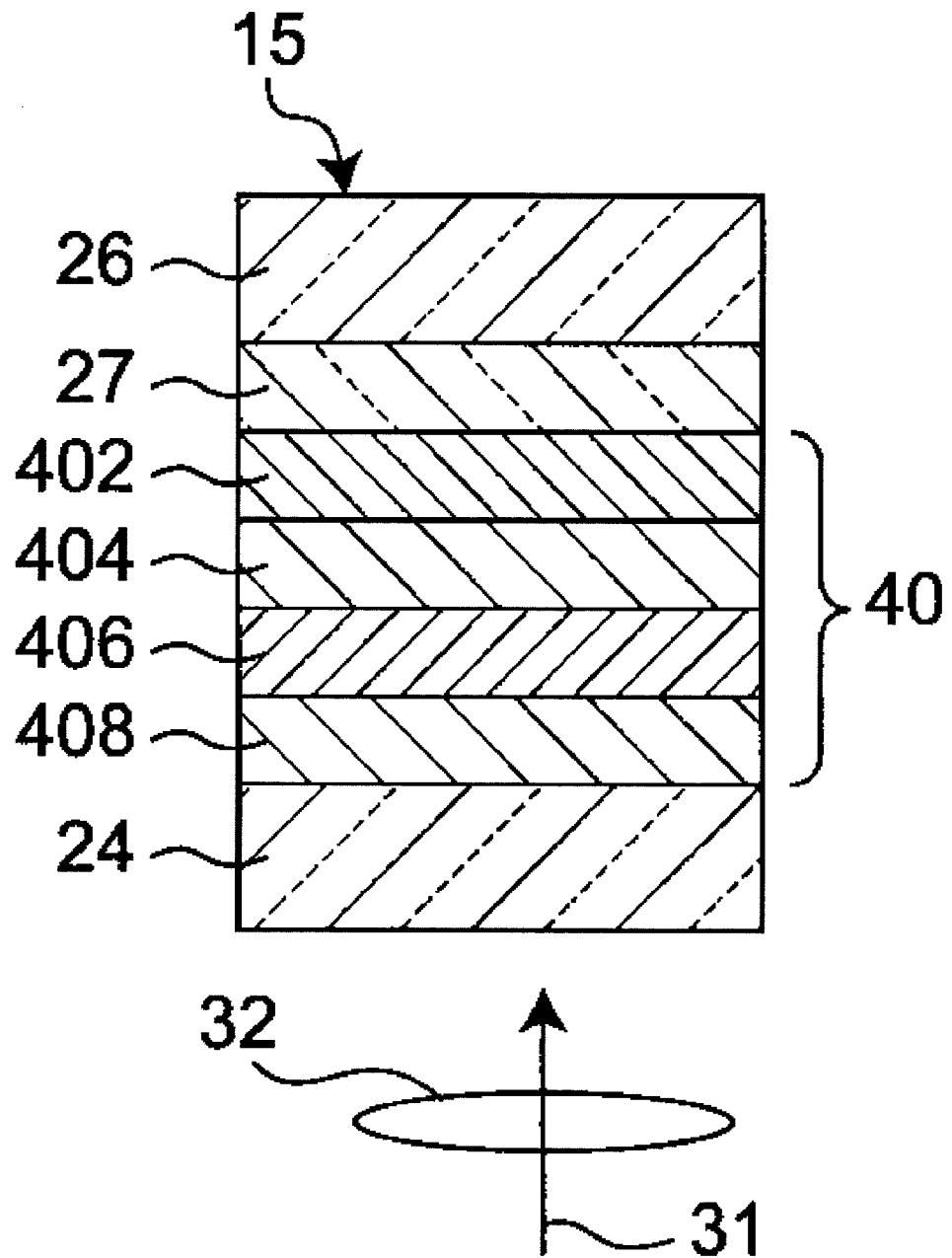
FIG. 6 is a sectional view showing an example of constitution of the information recording medium of the present invention.

Another example of the information recording medium of the present invention will be described as a fifth embodiment. FIG. 6 is a partial sectional view of an information recording medium 15 of the fifth embodiment. The information recording medium 15 is an optical recording medium, on and from which information is recorded and reproduced by irradiating the medium with the laser beam 31 that is focused by the objective lens 32.

The information recording medium 15 has such a constitution as an information layer 40 formed on a substrate 24 and a dummy substrate 26 make contact with each other via an adhesive layer 27.

The substrate 24 and the dummy substrate 26 have the form of transparent disk. The substrate 24 may have, on the surface thereof that contacts the information layer 40, guide grooves formed therein for guiding the laser beam 31. A surface of the substrate 31 which does not contact the information layer 40 and a surface of the dummy substrate which does not contact the adhesive layer 27 are preferably smooth. The substrate 24 and the dummy substrate 26 may be formed from a polycarbonate resin, a polymethyl methacrylate resin, a polyolefin resin, a norbornene resin, glass or a combination thereof. The substrate 24 and the dummy substrate 26 are preferably formed from polycarbonate for the reason of good transfer property, ease of mass production and low cost.

It is preferable that the adhesive layer 27 has low optical absorptance to the laser beam 31. The adhesive layer 27 may be formed from a polycarbonate resin, a polymethyl methacrylate resin, a polyolefin resin, norbornene resin, an ultraviolet curable resin (such as an acrylic resin or an epoxy resin), a delayed thermosetting resin, glass or a combination of these materials.

Materials, shapes and functions of the layers that constitute the information layer 40 are as described in relation to the first embodiment, and detailed description thereof will be omitted here. Description of components identified by the same reference numerals as those used in the first embodiment will be omitted.

The information recording medium 15 can be produced by the following process.

First, the information layer 40 is formed on the substrate 24 (having a thickness of, for example, 0.6 mm). Specifically, the second dielectric layer 408, the recording layer 406, the first dielectric layer 404 and the reflective layer 402 are provided in this order on the substrate 24. At this time, additional layers may be provided as required; a second interface layer disposed between the second dielectric layer 408 and the recording layer 406, a first interface layer disposed between the first dielectric layer 404 and the recording layer 406 and a reflective-layer side interface layer disposed between the first dielectric layer 404 and the reflective layer 402. In FIG. 5, the second interface layer can be shown as the layer denoted as 407 disposed between the layers 408 and 406, the first interface layer can be shown as the layer denoted as 405 disposed between the layers 406 and 404, and the reflective-layer side interface layer can be shown as the layer denoted as 403 disposed between the layers 402 and 404. Each of these layers can be formed by the method described in relation to the first embodiment.

The substrate 24 having the information layer 40 formed thereon and the dummy substrate 26 (having a thickness of, for example, 0.6 mm) are bonded together by means of the adhesive layer 27. Specifically, the bonding may be carried out by a method wherein the substrate 24 having the information layer 40 formed thereon is put into contact with the dummy substrate 26 that has been coated with an ultraviolet curable resin or a delayed thermosetting resin by a spin coating process, and then the resin is cured. As an alternative method, with the dummy substrate 26 being coated uniformly with an adhesive resin in advance, the substrate 24 having the information layer 40 formed thereon may be put into contact with the dummy substrate 26.

The recording layer 406 of the information recording medium 15 is usually in amorphous phase as deposited. Therefore, an initialization process may be carried out as required, in which the recording layer 406 is irradiated with laser beam so as to crystallize.

The information recording medium 15 is produced as described above. In this embodiment, the sputtering method is employed for forming each of the films that constitute the information layer. The film forming method is not limited to this, and vacuum vapor deposition process, ion plating process or MBE process or the like may also be employed.

Sixth Embodiment

Figure 7:
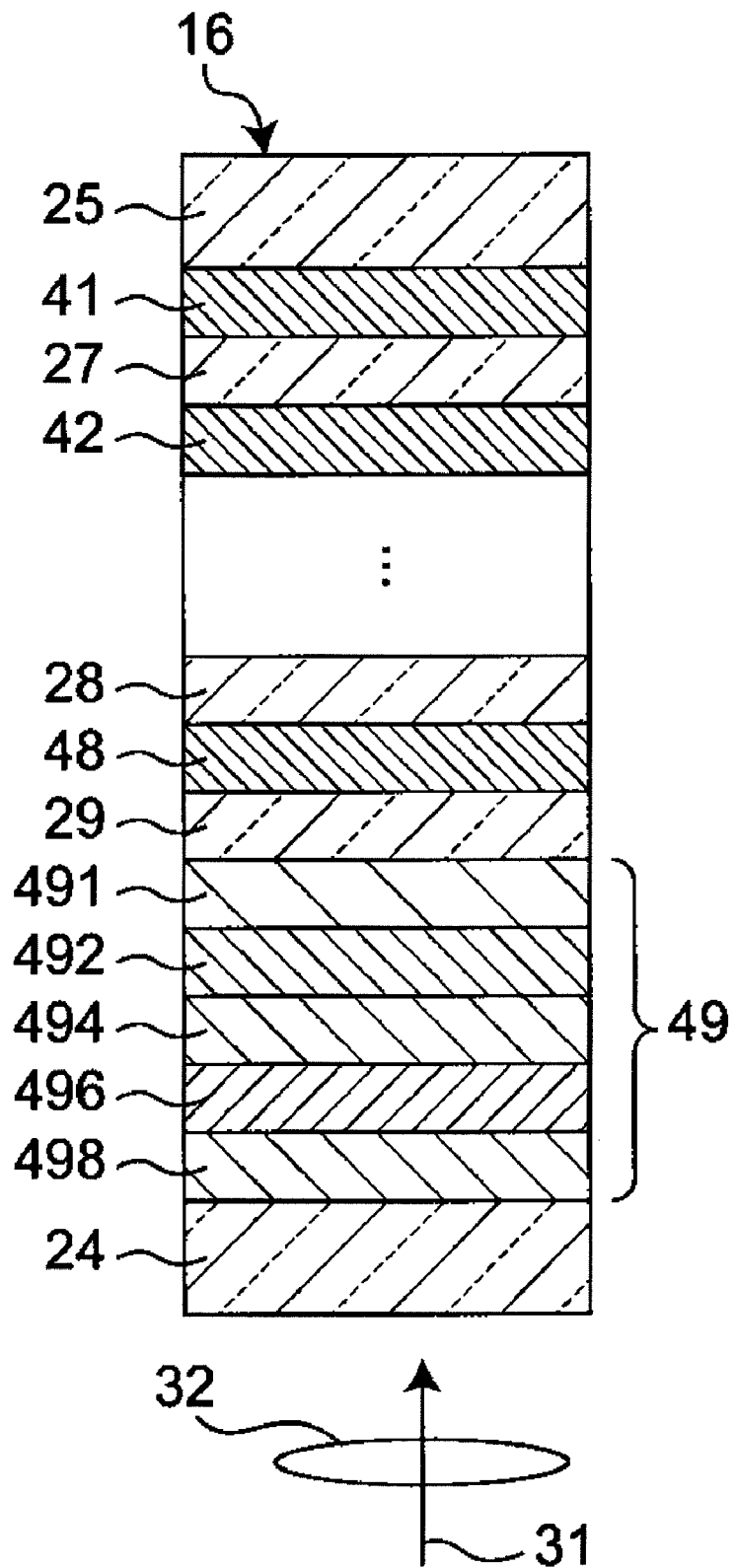
FIG. 7 is a sectional view showing an example of constitution of the information recording medium of the present invention.

Another example of the information recording medium of the present invention will be described as a sixth embodiment. FIG. 7 is a partial sectional view of an information recording medium 16 of the sixth embodiment. The information recording medium 16 is a multi-layer optical recording medium, on and from which information is recorded and reproduced by irradiating the medium with the laser beam 31 that is focused by the objective lens 32.

The information recording medium 16 has such a constitution as N−1 information layers (N is an integer, N≧2) of the Nth information layer 49, the (N−1)st information layer 48, . . . , the second information layer 42 formed successively on the substrate 24 and the first information layer 41 formed on a substrate 25 are put into contact with each other via the adhesive layer 27. Adjacent information layers are separated by the separation layers 29, 28, . . . , that are disposed therebetween.

The substrate 25 has the form of transparent disk. The substrate 25 may have, on the surface thereof that contacts the first information layer 41, guide grooves formed therein for guiding the laser beam 31. A surface of the substrate 25 that does not contact the first information layer 41 is preferably smooth. The substrate 25 may be formed from a polycarbonate resin, a polymethyl methacrylate resin, a polyolefin resin, a norbornene resin, glass or a combination thereof. The substrate 25 is preferably formed from polycarbonate resin for the reason of good transfer property, ease of mass production and low cost.

Description of components identified by the same reference numerals as those used in the second and fifth embodiments will be omitted.

The information recording medium 16 can be manufactured by the following process.

First, the Nth information layer 49 is formed on the substrate 24 (having a thickness of, for example, 0.6 mm). Specifically, the second dielectric layer 498, the recording layer 496, the first dielectric layer 494, the reflective layer 492 and the transmittance adjustment layer 491 are provided in this order on the substrate 24. At this time, additional layers may be provided as required; a second interface layer disposed between the second dielectric layer 498 and the recording layer 496, a first interface layer disposed between the first dielectric layer 494 and the recording layer 496 and a reflective-layer side interface layer disposed between the first dielectric layer 494 and the reflective layer 492. These layers can be formed by the method described in relation to the second embodiment. Then the (N−1)st information layer 48 to the second information layer 42 are formed successively with the separation layers 29, 28, . . . , disposed therebetween.

In the meantime the first information layer 41 is formed on the substrate 25 (having a thickness of, for example, 0.6 mm). The information layer is generally constituted from a multi-layer film. Each of the layers (or films) that constitute the information layer 41 can be formed by successive sputtering operations wherein sputtering targets suitable for forming the respective layers are sputtered successively in a film formation apparatus, similarly to the second embodiment.

Last, the substrate 24 having the information layer formed thereon and the substrate 25 having the information layer formed thereon are bonded together by means of the adhesive layer 27. Specifically, the bonding may be carried out by a method wherein, after coating the first information layer 41, that is formed on the substrate 25, with an ultraviolet curable resin or a delayed thermosetting resin by a spin coating process, the substrate 24 having the second information layer 42 formed thereon is put into contact with the first information layer 41, and then the resin is cured. As an alternative method, with the first information layer 41 being coated uniformly with an adhesive resin in advance, the substrate 24 having the second information layer 42 formed thereon may be put into contact with the first information layer 41.

The recording layers of the information recording medium 16 are usually in amorphous phase as deposited. Therefore, an initialization process may be carried out as required, by irradiating the recording layers with laser beam so as to crystallize.

The information recording medium 16 is produced as described above. In this embodiment, the sputtering method is employed for forming each of the films that constitute the information layer. The film forming method is not limited to this, and vacuum vapor deposition process, ion plating process or MBE process or the like may also be employed.

Seventh Embodiment

Figure 8:
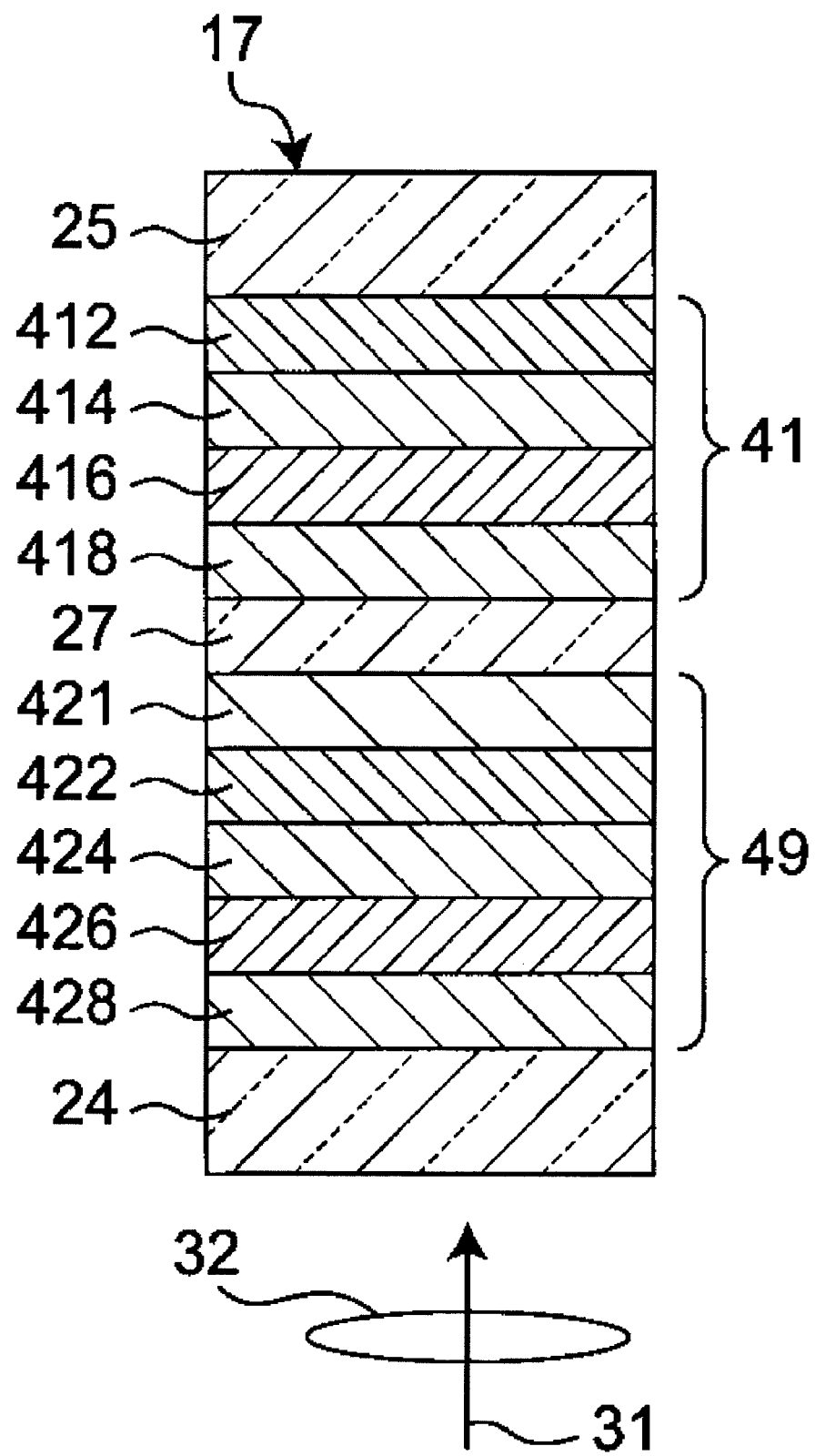
FIG. 8 is a sectional view showing an example of constitution of the information recording medium of the present invention.

A multi-layer information recording medium according to the sixth embodiment with N=2, namely an example of an information recording medium comprising two information layers will be described as a seventh embodiment. FIG. 8 is a partial sectional view of an information recording medium 17 of the seventh embodiment. The information recording medium 17 is a double-layer optical recording medium, in which information is recorded and reproduced by irradiating with the laser beam 31 that is focused by the object lens 32.

The information recording medium 17 has such a constitution as a second information layer 42 formed on the substrate 24 and a first information layer 41 formed on the substrate 25 make contact with each other via the adhesive layer 27.

Materials, shapes and functions of the layers that constitute the first information layer 41 and the second information layer 42 are as described in relation to the third embodiment, and detailed description thereof will be omitted here. Description of components identified by the same reference numerals as those used in the third, fifth and sixth embodiments will be omitted.

The information recording medium 17 can be produced by the following process.

First, the second information layer 42 is formed on the substrate 24 (having a thickness of, for example, 0.6 mm). Specifically, the second dielectric layer 428, the recording layer 426, the first dielectric layer 424, the reflective layer 422 and the transmittance adjustment layer 421 are provided in this order on the substrate 24. At this time, additional layers may be provided as required; a second interface layer disposed between the second dielectric layer 428 and the recording layer 426, a first interface layer disposed between the first dielectric layer 424 and the recording layer 426 and a reflective-layer side interface layer disposed between the reflective layer 422 and the first dielectric layer 424. Each of these layers can be formed by the method described in relation to the third embodiment.

After forming the transmittance adjustment layer 421, an initialization process may be carried out as required, by irradiating the recording layer 426 with laser beam so as to crystallize.

Meanwhile, the first information layer 41 is formed on the substrate 25 (having a thickness of, for example, 0.6 mm). Specifically, the reflective layer 412, the first dielectric layer 414, the recording layer 416 and the second dielectric layer 418 are formed in this order on the substrate 25. At this time, additional layers may be provided as required; a reflective-layer side interface layer disposed between the reflective layer 412 and the first dielectric layer 414, a first interface layer disposed between the first dielectric layer 414 and the recording layer 416, and a second interface layer disposed between the second dielectric layer 418 and the recording layer 416. Each of these layers can be formed by the method described in relation to the third embodiment.

After forming the second dielectric layer 418, an initialization step may be carried out as required, by irradiating the recording layer 416 with laser beam so as to crystallize.

Last, the substrate 24 having the information layer formed thereon and the substrate 25 having the information layer formed thereon are bonded together by means of the adhesive layer 27. Specifically, the bonding may be carried out by a method wherein, after coating the first information layer 41, that is formed on the substrate 25, with an ultraviolet curable resin (such as an acrylic resin or an epoxy resin) or a delayed thermosetting resin by a spin coating process, the substrate 24 having the second information layer 42 formed thereon is put into contact with the first information layer 41, and then the resin is cured. As an alternative method, with the first information layer 41 being coated uniformly with an adhesive resin in advance, the first information layer 41 may be put into contact with the substrate 24 having the second information layer 42 formed thereon.

The recording layers of the information recording medium 17 are usually in amorphous phase as deposited. Therefore, an initialization process may be carried out as required, by irradiating the recording layers with laser beam so as to crystallize. In the case where the recording layers 416 and 426 have been initialized beforehand, it is not necessary to carry out the initialization process after bonding.

The information recording medium 17 can be produced as described above. In this embodiment, the sputtering method is employed for forming each of the films that constitute the information layer. The film forming method is not limited to this, and vacuum vapor deposition process, ion plating process or MBE process or the like may also be employed.

A medium wherein N is 2 can have recording capacity of about 50 GB or about 66 GB, as described in relation to the seventh embodiment.

Eighth Embodiment

Figure 9:
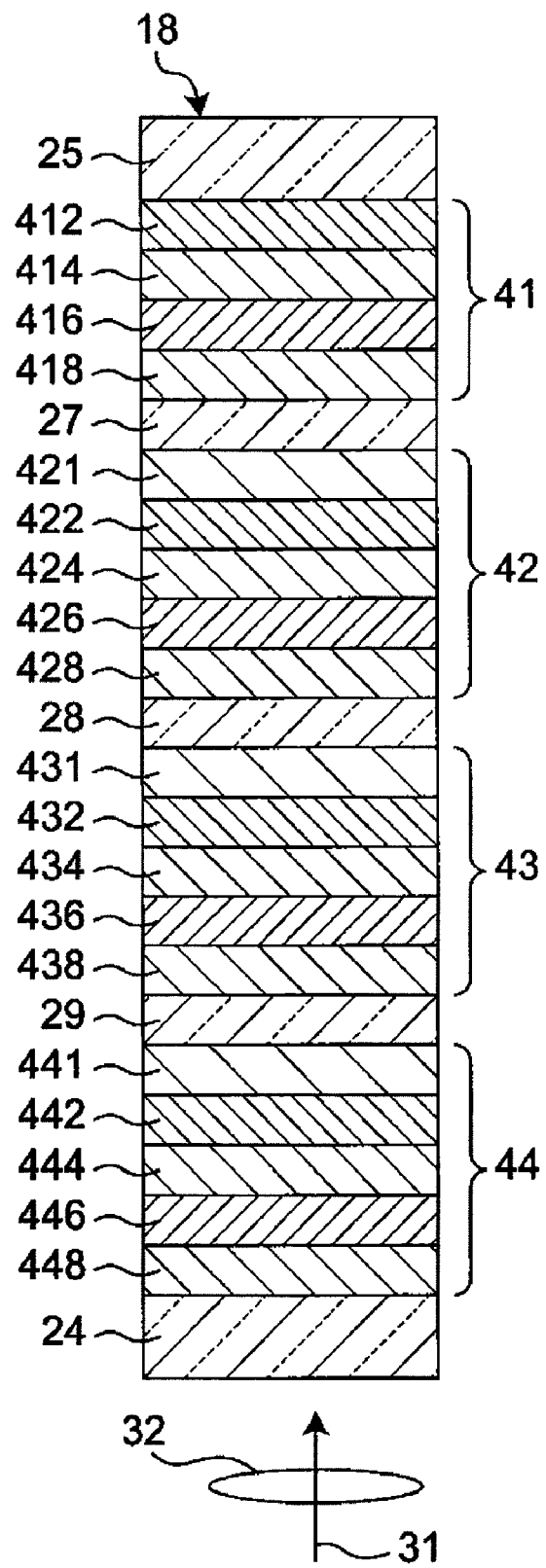
FIG. 9 is a sectional view showing an example of constitution of the information recording medium of the present invention.

A multi-layer information recording medium according to the sixth embodiment of the present invention, namely an example of an information recording medium comprising four information layers will be described as an eighth embodiment. FIG. 9 is a partial sectional view of an information recording medium 18 of the eighth embodiment. The information recording medium 18 is a four-layer optical recording medium, on and from which information is recorded and reproduced by irradiating the medium with the laser beam 31 that is focused by the objective lens 32.

The information recording medium 18 has such a constitution as a stack of the fourth information layer 44, the third information layer 43 and the second information layer 42 formed on the substrate 24 are made into contact with a first information layer 41 formed on the substrate 25 via the adhesive layer 27. The separation layer 29 is provided between the fourth information layer 44 and the third information layer 43, and the separation layer 28 is provided between the third information layer 43 and the second information layer.

Materials, shapes and functions of the layers that constitute the first information layer 41, the second information layer 42, the third information layer 43 and the fourth information layer 44 are as described in relation to the fourth embodiment, and detailed description thereof will be omitted here. Description of components identified by the same reference numerals as those used in the fourth, fifth, sixth and seventh embodiments will be omitted.

The information recording medium 18 can be produced by the following process.

First, the fourth information layer 44 is formed on the substrate 24 (having a thickness of, for example, 0.6 mm). Specifically, the second dielectric layer 448, the recording layer 446, the first dielectric layer 444, the reflective layer 442 and the transmittance adjustment layer 441 are provided in this order on the substrate 24. At this time, additional layers may be provided as required; a second interface layer disposed between the second dielectric layer 448 and the recording layer 446, a first interface layer disposed between the first dielectric layer 444 and the recording layer 446 and a reflective-layer side interface layer disposed between the reflective layer 442 and the first dielectric layer 444. These layers can be formed by the method described in relation to the fourth embodiment.

Then the separation layer 29 is formed on the transmittance adjustment layer 441 by the method described in relation to the fourth embodiment.

After forming the transmittance adjustment layer 441 or the separation layer 29, an initialization process may be carried out as required, by irradiating the recording layer 446 with laser beam so as to crystallize.

Then the third information layer 43 is formed on the separation layer 29. Specifically, the second dielectric layer 438, the recording layer 436, the first dielectric layer 434, the reflective layer 432 and the transmittance adjustment layer 431 are formed in this order on the separation layer 29. At this time, additional layers may be provided as required; a second interface layer disposed between the second dielectric layer 438 and the recording layer 436, a first interface layer disposed between the first dielectric layer 434 and the recording layer 436, and a reflective-layer side interface layer disposed between the first dielectric layer 434 and the reflective layer 432. These layers can be formed by the method described in relation to the fourth embodiment.

Then the separation layer 28 is formed on the transmittance adjustment layer 431 by the method described in relation to the fourth embodiment.

After forming the transmittance adjustment layer 431 or the separation layer 28, an initialization process may be carried out as required, by irradiating the recording layer 436 with laser beam so as to crystallize.

Then the second information layer 42 is formed on the separation layer 28. Specifically, the second dielectric layer 428, the recording layer 426, the first dielectric layer 424, the reflective layer 422 and the transmittance adjustment layer 421 are formed in this order on the substrate 24. At this time, additional layers may be provided as required; a second interface layer disposed between the second dielectric layer 428 and the recording layer 426, a first interface layer disposed between the first dielectric layer 424 and the recording layer 426, and a reflective-layer side interface layer disposed between the first dielectric layer 424 and the reflective layer 422. These layers can be formed by the method described in relation to the fourth embodiment.

After forming the transmittance adjustment layer 421, an initialization process may be carried out as required, by irradiating the recording layer 426 with laser beam so as to crystallize.

In the meantime, the first information layer 41 is formed on the substrate 25 (having a thickness of, for example, 0.6 mm). Specifically, the reflective layer 412, the first dielectric layer 414, the recording layer 416 and the second dielectric layer 418 are formed in this order on the substrate 25. At this time, additional layers may be provided as required; a reflective-layer side interface layer disposed between the reflective layer 412 and the first dielectric layer 414, a first interface layer disposed between the first dielectric layer 414 and the recording layer 416, and a second interface layer disposed between the second dielectric layer 418 and the recording layer 416. These layers can be formed by the method described in relation to the fourth embodiment.

After forming the second dielectric layer 418, an initialization process may be carried out as required, by irradiating the recording layer 416 with laser beam so as to crystallize.

Last, the substrate 24 having the information layer formed thereon and the substrate 25 having the information layer thereon are bonded together by means of the adhesive layer 27. Specifically, the bonding may be carried out by a method wherein, after coating the first information layer 41, that is formed on the substrate 25, with an ultraviolet curable resin (such as an acrylic resin or an epoxy resin) or a delayed thermosetting resin by a spin coating process, the substrate 24 having the second information layer 42 formed thereon is put into contact with the first information layer 41, and then the resin is cured. As an alternative method, with the first information layer 41 being coated uniformly with an adhesive resin in advance, the first information layer 41 may be put into contact with the substrate 24 having the second information layer 42 formed thereon.

The recording layers of the information recording medium 18 are usually in amorphous phase as deposited. Therefore, an initialization process may be carried out as required, by irradiating the recording layers with laser beam so as to crystallize. In the case where the recording layers 416, 426, 436 and 446 have been initialized beforehand, it is not necessary to carry out the initialization process after bonding.

The information recording medium 18 is produced as described above. In this embodiment, the sputtering method is employed for forming each of the films that constitute the information layer. The film forming method is not limited to this, and vacuum vapor deposition process, ion plating process or MBE process or the like may also be employed.

In this embodiment, the substrate 24 and the substrate 25 are bonded together by using the adhesive layer 27 placed between the second information layer 42 and the first information layer 41. Position of the adhesive layer, that is, the position of bonding is not limited to this position.

For example, the substrate 24 and the substrate 25 may be bonded together by using the adhesive layer (located at the position of the separation layer 28 in FIG. 9) disposed between the third information layer 43 and the second information layer 42, after forming, on the substrate 24, the fourth information layer 44 and the third information layer 43 with the separation layer 29 therebetween, and forming, on the substrate 25, the first information layer 41 and the second information layer 42 with the separation layer therebetween (located at the position of the adhesive layer 27 in FIG. 9).

A medium wherein N is 4 can have recording capacity of about 100 GB or about 133 GB, as described in relation to the eighth embodiment.

Media wherein N=2 and 4 have been described as the seventh and eighth embodiments having two substrates and a plurality of information layers, respectively. N may also be 3. In a medium wherein N=3, it is preferable that recording layers included in one or both of the second information layer and the third information layer include any one of the materials represented by the formulas (1) to (4) that contain Sb and S. The effect of the present invention can be fully achieved also in the case where only the recording layer included in the third information layer that is located nearest to the laser beam-entering side contains any one of the materials represented by the formulas (1) to (4) that contain Sb and S.

A medium wherein N is 3 can have recording capacity of about 75 GB or about 100 GB, as described previously.

Ninth Embodiment

An example of method for recording information on the information recording media described as the first to the eighth embodiments and/or method for reproducing information recorded on the media will be described as a ninth embodiment.

Figure 10:
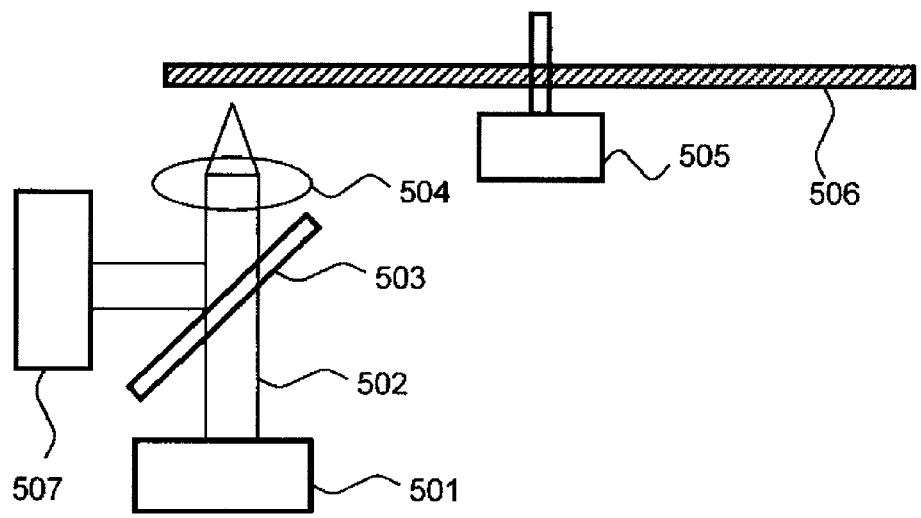
FIG. 10 is a schematic diagram showing an example of recording/reproduction apparatus for the information recording medium of the present invention.

FIG. 10 schematically shows an example of constitution of a recording/reproducing apparatus used in recording information on and reproducing information from the information recording medium of the present invention. A laser beam 502 emitted by a laser diode 501 passes through a half mirror 503 and an objective lens 504, and is focused on an information recording medium 506. The information recording medium 506 is driven by a motor 505 to rotate. Information is reproduced by directing the beam reflected on the information recording medium 506 to a photodetector 507 and detecting the signals.

Figure 11:
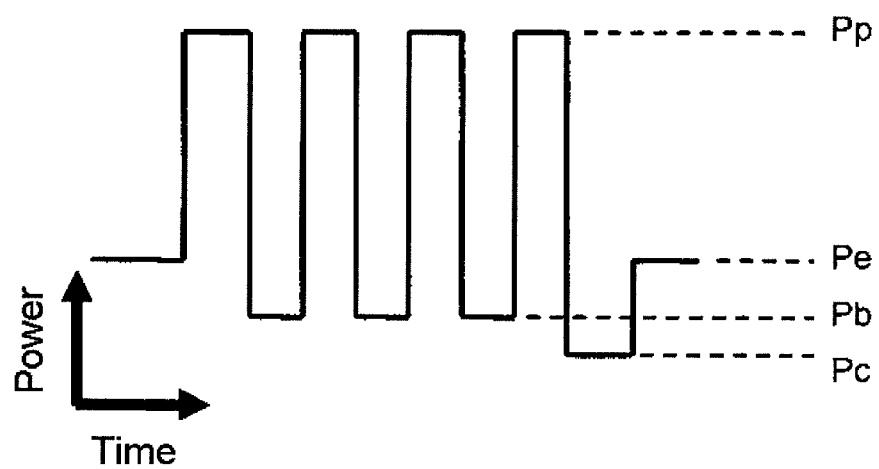
FIG. 11 is a schematic diagram showing an example of recording pulse waveform used in recording and reproduction of the information recording medium of the present invention.

Recording of information is carried out by modulating the intensity of the laser beam 502 between a plurality of power levels. The intensity of the laser beam can be modulated by using current modulating means that modulates the drive current of a semiconductor laser. A position where a recording mark is to be formed may be irradiated with a laser beam of single square pulse having peak power Pp. Alternatively, in the case where a particularly long mark is to be formed, recording pulse train comprising a plurality of pulse trains may be used that are modulated between a peak power Pp and a bottom power Pb (Pp>Pb) as shown in FIG. 11, in order to prevent the recording layer from being heated too much and to make the mark width uniform. A period of cool-down may also be provided after the last pulse so as to decrease the laser output power down to a cooling power Pc (Pc<Pb). A position where no recording mark is to be formed is irradiated with a laser beam of bias power Pe (Pp>Pe).

A numerical aperture NA of the objective lens 504 is preferably in a range of from 0.5 to 1.1 and more preferably from 0.6 to 0.9, so as to keep the spot diameter of the laser beam 502 within a range from 0.4 µm to 0.7 µm. The wavelength of the laser beam 502 is preferably in a range of from 350 nm to 450 nm. A linear velocity of the information recording medium 506 when recording information is preferably in a range of from 4 m/second to 50 m/second, more preferably from 9 m/second to 40 m/second, so as to achieve sufficient erasability without causing recrystallization. It goes without saying that a wavelength, a numerical aperture of the objective lens and a linear velocity other than those described above may be employed in accordance to the type of the information recording medium 502. For example, the wavelength of the laser beam 502 may also be from 650 nm to 670 nm.

Performance of the information recording medium 506 can be evaluated as described below by using the recording/reproduction apparatus described above.

Recording performance can be evaluated by modulating the laser beam 502 between 0 and Pp (mW), recording random signals with mark length of from 0.149 μm (2T) to 0.596 μm (8T) by (1-7) modulation scheme, and measuring the jitters (error of mark position) between the leading edges and between the trailing edges of the recording marks with a time interval analyzer. Smaller value of the jitter means higher recording performance. $P_p$, $P_b$, $P_c$ and $P_e$ are set so as to minimize the mean value of the jitters between the leading edges and between the trailing edges. The value of $P_p$ determined in this step is taken as the recording sensitivity.

Signal intensity is evaluated as follows. The laser beam 502 is power-modulated between 0 and $P_p$ (mW), and signals with mark lengths of 0.149 μm (2T) and 0.671 μm (9T) are recorded alternately in the same track consecutively 10 times, followed by overwriting of 2T signal at the last. The ratio (CNR: carrier to noise ratio) of the signal amplitude (carrier level) at the frequency of 2T signal to the noise amplitude (noise level) is measured with a spectrum analyzer. Higher value of CNR indicates higher signal intensity.

The erasability is evaluated as described below. The laser beam 502 is power-modulated between 0 and $P_p$ (mW), 2T signals and 9T signals are alternately recorded in the same track consecutively ten times. Difference between the amplitude of 2T signal when 2T signal is overwritten in the eleventh recording cycle and the amplitude of 2T signal when 9T signal is overwritten thereafter is measured with a spectrum analyzer as the erase ratio of 2T signal. A higher value of the erase ratio means higher erasability.

Tenth Embodiment

Figure 12:
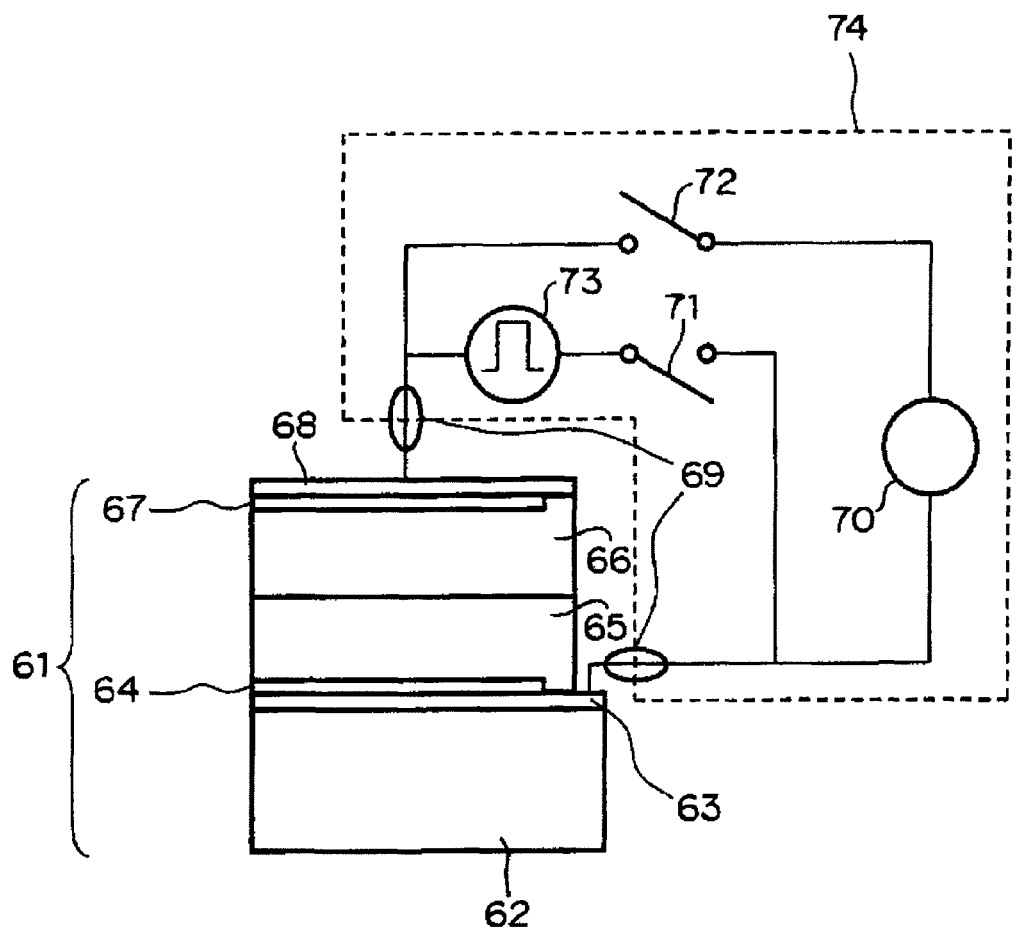
FIG. 12 is a schematic diagram showing a part of the constitution of an information recording medium of the present invention and an electrical information recording/reproduction apparatus.

Another example of the information recording medium of the present invention will be described as the tenth embodiment. An example of the constitution of an information recording medium 61 of the tenth embodiment is shown in FIG. 12. The information recording medium 61 is an electrical information recording medium on and from which information can be recorded and reproduced by applying an electrical energy (particularly electric current) thereon.

A resin (such as polycarbonate) substrate, a glass substrate, a ceramics (such as $Al_2O_3$) substrate, a semiconductor (such as Si) substrate, or a metal (such as Cu) substrate may be used as a substrate 62. An embodiment wherein an Si substrate is used will be described here. The electrical information recording medium 61 is constituted by stacking a lower electrode 63, a first dielectric layer 64, a first recording layer 65, a second recording layer 66, a second dielectric layer 67 and an upper electrode 68 in this order on the substrate 62. The lower electrode 63 and the upper electrode 68 are formed for the purpose of supplying electrical current to the first recording layer 65 and the second recording layer 66. The first dielectric layer 64 is provided for the purpose of regulating the amount of electrical energy supplied to the first recording layer 65, and the second dielectric layer 67 is provided for the purpose of regulating the amount of electrical energy supplied to the second recording layer 66. The first dielectric layer 64 and the second dielectric layer 67 may be formed from a material similar to that of the first dielectric layer 404 of the first embodiment.

The first recording layer 65 and the second recording layer 66 are formed from a material that undergoes reversible phase change between crystal phase and amorphous phase caused by the Joule heat generated when electrical current is caused to flow. This medium utilizes the difference in resistivity between crystal phase and amorphous phase for recording information. At least one of the first recording layer 65 and the second recording layer 66 is formed from a material represented by any one of the formulas (1) to (4) that contains Sb and S. Such materials are as described in relation to the first embodiment. In the case where one of the recording layers does not include Sb and S, the material described in relation to the second embodiment may be used. The first recording layer 65 and the second recording layer 66 can be formed by a method similar to that employed when forming the recording layer 406 of the first embodiment or the recording layer 496 of the second embodiment.

The lower electrode 63 and the upper electrode 68 may be formed from an elemental metal such as Ti, W, Al, Au, Ag, Cu, Pt or the like. Alternatively, the lower electrode 63 and the upper electrode 68 may be formed from an alloy based on one or more of these elements as the main component with one or more of other elements added to improve the humidity resistance or adjust the heat conductivity. The lower electrode 63 and the upper electrode 68 can be formed by sputtering a metal matrix or an alloy matrix that would constitute the electrode, in an Ar gas atmosphere or an atmosphere of mixed gas of rare gas and reaction gas (at least one kind of gas selected from among $O_2$ and $N_2$). The process of forming the layers may be vacuum vapor deposition process, ion plating process, CVD process or MBE process or the like.

The electrical information recording medium 61 is electrically connected via voltage applying sections 69 to an electrical information recording/reproduction apparatus 74. In the electrical information recording/reproduction apparatus 74, a pulsed power source 73 is connected via a switch 71 between the lower electrode 63 and the upper electrode 68 so as to supply pulses of electrical current to the first recording layer 65 and the second recording layer 66. A resistance measuring instrument 70 is connected via a switch 72 between the lower electrode 63 and the upper electrode 67 so as to detect the change in the resistance due to phase change in the first recording layer 65 and the second recording layer 66.

The first recording layer 65 or the second recording layer 66 that is in amorphous phase (the state of high resistance) can be turned into crystal phase (the state of low resistance) by closing the switch 71 (the switch 72 is opened) so as to supply current pulses between the electrodes. The current pulses are supplied in such a manner as the portion supplied with the electrical pulses is kept at a temperature higher than the crystallization temperature of the material and lower than the melting point for the period of crystallization. The material can be turned from the crystal phase back into the amorphous phase by supplying electrical pulses having amplitude higher than that of crystallization for a shorter period of time so as to heat the recording layer to a temperature higher than the melting point and melt it, then cooling down quickly. The pulsed power source 73 of the electrical information recording/reproduction apparatus 74 is a power source that is capable of delivering recording and erasing pulse waveforms shown in FIG. 15.

A resistance when the first recording layer 65 is in amorphous phase, the resistance when the first recording layer 65 is in crystal phase, the resistance when the second recording layer 66 is in amorphous phase and the resistance when the second recording layer 66 is in crystal phase are referred to as "$r_{a1}$", "$r_{c1}$", "$r_{a2}$" and "$r_{c2}$", respectively. When these resistances satisfy relationships $r_{c1} \leq r_{c2} < r_{a1} < r_{a2}$ or $r_{c1} \leq r_{c2} < r_{a2} < r_{a1}$ or $r_{c2} \leq r_{c1} < r_{a1} < r_{a2}$, or $r_{c2} \leq r_{c1} < r_{a2} < r_{a1}$, the sum of the resistances of the first recording layer 65 and the second recording layer 66 can be set to four different values of $r_{a1}+r_{a2}$, $r_{a1}+r_{c2}$, $r_{a2}+r_{c1}$ and $r_{c1}+r_{c2}$. As a result, binary information of four distinct states can be detected simultaneously by measuring the resistance between the electrodes with the resistance measuring instrument 70.

Figure 14:
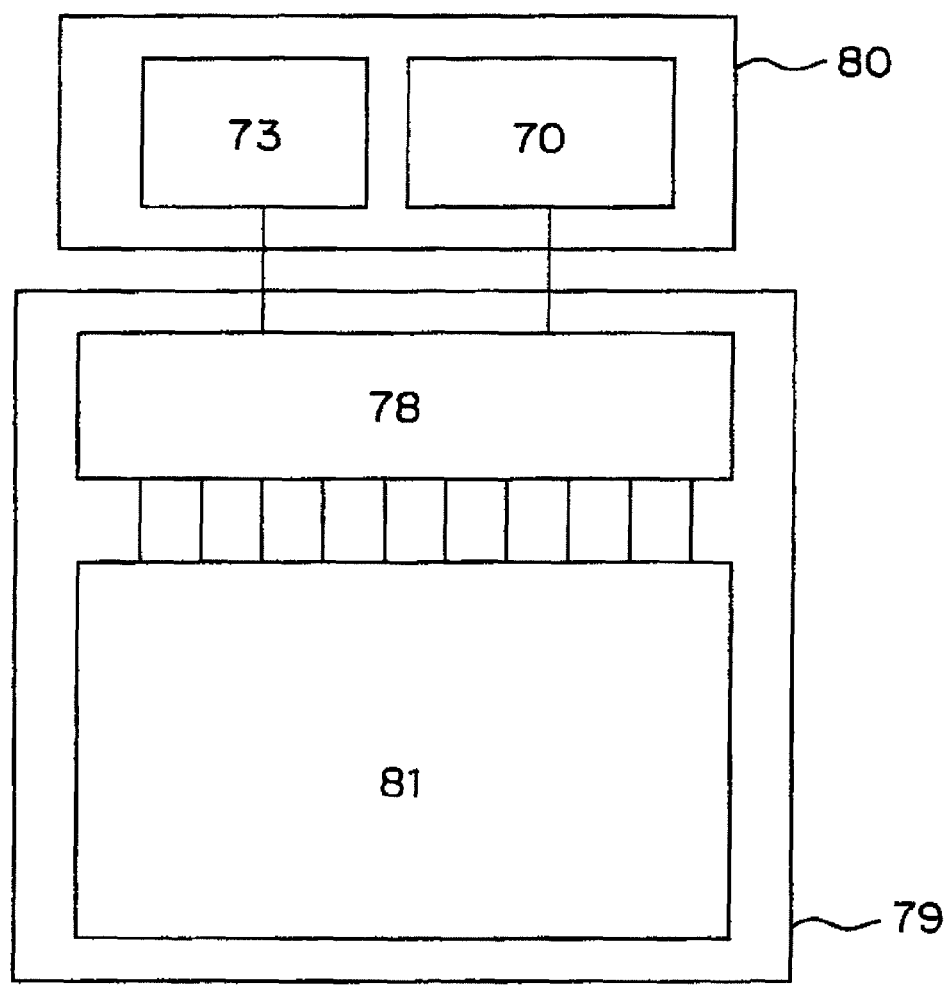
FIG. 14 is a schematic diagram showing a part of the constitution of the electrical information recording medium of the present invention and a recording/reproduction system therefor.

An electrical information recording medium 81 having a large storage capacity such as shown in FIG. 14 can be constituted by disposing multitude of the electrical information recording media 61 in a matrix array. Each memory cell 77 has a tiny region having constitution similar to that of the electrical information recording medium 61. Recording and reproduction of information in each of the memory cell 77 are carried out by designating a word line 75 and a bit line 76.

Figure 13:
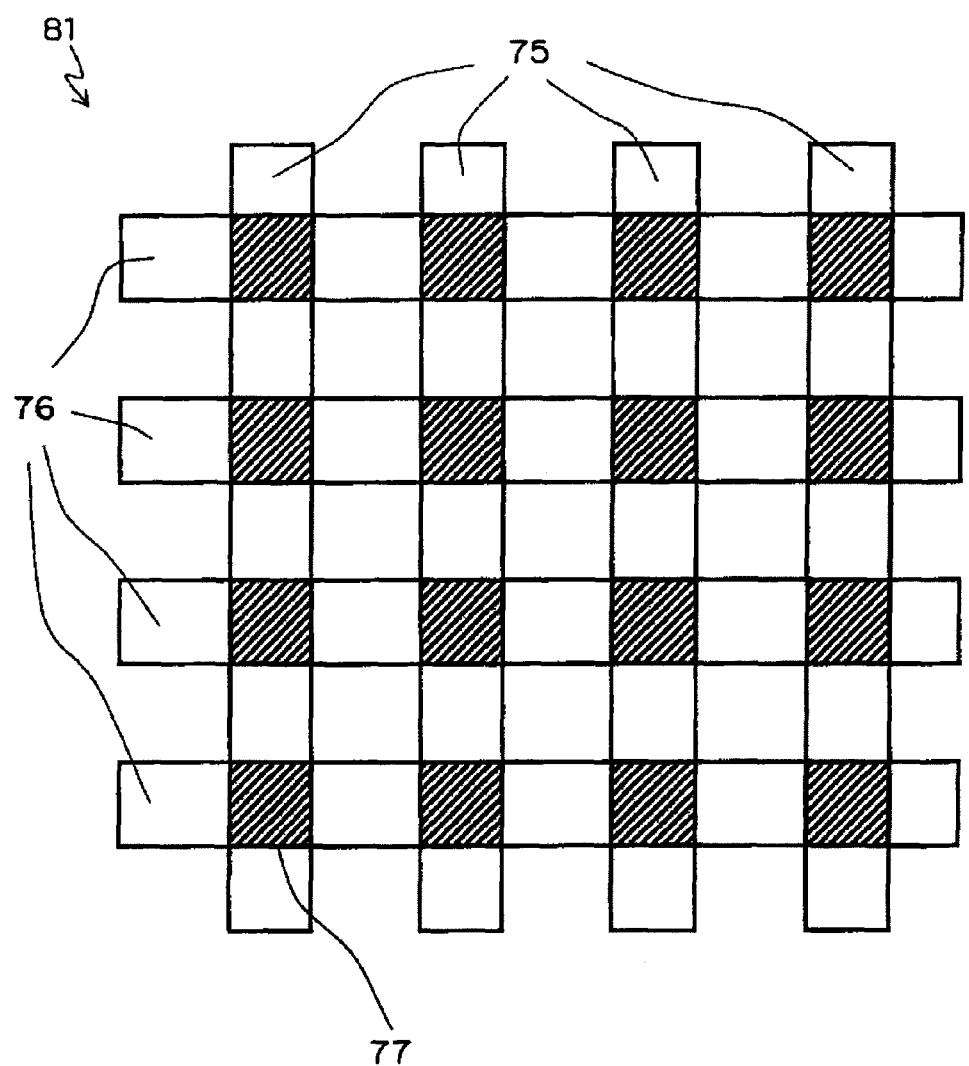
FIG. 13 is a schematic diagram showing a part of the constitution of an electrical information recording medium of the present invention having a large storage capacity.

FIG. 13 shows an example of constitution of an information recording system that uses the electrical information recording medium 81. A memory device 79 is constituted from the electrical information recording medium 81 and an addressing circuit 78. The word line 75 and the bit line 76 of the electrical information recording medium 81 are designated by the addressing circuit 78, so as to record and reproduce information in each of the memory cells 77. With the memory device 79 electrically connected to an external circuit 80 that is constituted from at least the pulsed power source 73 and the resistance measuring instrument 70, information can be recorded on or reproduced from the electrical information recording medium 81.

EXAMPLES

The present invention will be described more specifically by way of Examples.

Example 1

In Example 1, the information recording medium 11 shown in FIG. 1 was made, and the relations of the composition of the recording layer 406 to the erasability and signal reliability of the information layer 40 were investigated. Specifically, eight kinds of samples 1-1 to 1-8 of the information recording medium having the recording layers 406 that contained Sb and S with different proportions of Sb and S were made, and the erasability and signal reliability of the information layer 40 were measured.

Signal reliability is evaluated by degradation of reproduction beam. The degradation of reproduction beam is defined as the decrease in signal intensity (dB) when a track, in which signals have been recorded, is irradiated with the reproduction beam (reproduction power Pr) a predetermined number of times.

Samples were made as follows. First, the substrate 21 made of polycarbonate (120 mm in diameter, 1.1 mm in thickness) was prepared with guide groove (20 nm in depth, 0.32 μm in track pitch) formed therein for guiding the laser beam 31. An Ag—Pd—Cu layer (80 nm in thickness) as the reflective layer 402, a $(ZrO_2)_{50}(In_2O_3)_{50}$ layer (25 nm in thickness) as the first dielectric layer 404, the recording layer 406 containing Sb and S (10 nm in thickness) (Sb and S contained in proportions shown in Table 1), a $(ZrO_2)_{50}(Cr_2O_3)_{50}$ layer (5 nm in thickness) as the second interface layer (not shown), a $(ZnS)_{80}(SiO_2)_{20}$ layer (60 nm in thickness) as the second dielectric layer 408 were formed successively on the polycarbonate substrate by sputtering.

Provided in the film formation apparatus used for sputtering of the layers described above were an Ag—Pd—Cu alloy sputtering target for forming the reflective layer 402, an $(ZrO_2)_{50}(In_2O_3)_{50}$ sputtering target for forming the first dielectric layer 404, a sputtering target that contained Sb and S for forming the recording layer 406, a $(ZrO_2)_{50}(Cr_2O_3)_{50}$ sputtering target for forming the second interface layer and a $(ZnS)_{80}(SiO_2)_{20}$ sputtering target for forming the second dielectric layer 408. All the sputtering targets had a shape of 100 mm in diameter and 6 mm in thickness.

The reflective layer 402 was formed using a DC power source with an input power of 100 W in an Ar gas atmosphere having a pressure of 0.3 Pa. The first dielectric layer 404 was formed using an RF power source with the input power of 200 W in an Ar gas atmosphere having a pressure of 0.1 Pa. The recording layer 406 was formed using a DC power source with the input power of 50 W in an Ar gas atmosphere having a pressure of 0.2 Pa. The second interface layer was formed using an RF power source with the input power of 200 W in an Ar gas atmosphere having a pressure of 0.1 Pa. The second dielectric layer 408 was formed using an RF power source with the input power of 400 W in an atmosphere of Ar gas having a pressure of 0.1 Pa.

Last, the second dielectric layer 408 was coated with an ultraviolet curable resin (an acrylic resin) to form a resin layer. The resin layer was made uniform by rotating, and then the resin was cured by irradiating it with ultraviolet ray, thereby forming the transparent layer 23 having a thickness of 100 μm. Then initialization process was carried out in which the recording layer 406 was crystallized by being irradiated with laser beam. In this way, a plurality of samples having the recording layers 406 of different compositions were made.

The erasability and signal reliability of the information layer 40 of the information recording medium 11 were determined by using the recording/reproduction apparatus shown in FIG. 10, for each of the samples made as described above. The determinations were made with the laser beam 31 having a wavelength of 405 nm, the objective lens 32 having a numerical aperture NA of 0.85, the sample rotating at a linear velocity of 19.7 m/second (this speed corresponds to quadruple speed of Blu-ray disk) during the determination and a minimum mark length (2T) of 0.149 μm.

The composition of the recording layer 406 and the result of evaluating the erasability and signal reliability of the information layer 40 for each of the samples are shown in Table 1. The erasability was evaluated by the value of erase ratio, according to the following criteria.

25 dB or higher: o 20 dB or higher, below 25 dB: Δ

Below 20 dB: x

The signal reliability was evaluated by the degradation of reproduction beam after one million irradiations of the reproduction beam with Pr=0.35 mW, according to the following criteria.

Below 0.3 dB: o 0.3 dB or higher, below 2 dB: Δ

2 dB or higher: x

Evaluation of "o" or "Δ" means that the medium has practically useful performance for the evaluation item, and evaluation of "x" means that the medium does not have practically useful performance for the evaluation item Then comprehensive evaluation of the medium was conducted. A medium that is evaluated as "x" for any one of the evaluation items is given a comprehensive evaluation of "x", a medium that is evaluated as "Δ" for any one of the evaluation items is given a comprehensive evaluation of "o", and a medium that is evaluated as "o" for all of the evaluation items is given a comprehensive evaluation of "⊚".

TABLE 1

| Sample Nos. | Composition of recording layer (atomic %) | Erasability | Signal reliability | Comprehensive evaluation |
|---|---|---|---|---|
| 1-1 | $Sb_{100}$ | ○ | X | X |
| 1-2 | $Sb_{98}S_2$ | ○ | Δ | ○ |
| 1-3 | $Sb_{90}S_{10}$ | ○ | Δ | ○ |
| 1-4 | $Sb_{80}S_{20}$ | ○ | ○ | ⊚ |
| 1-5 | $Sb_{70}S_{30}$ | ○ | ○ | ⊚ |
| 1-6 | $Sb_{60}S_{40}$ | ○ | ○ | ⊚ |
| 1-7 | $Sb_{50}S_{50}$ | Δ | ○ | ○ |
| 1-8 | $Sb_{45}S_{55}$ | X | ○ | X |

The results show that Sample 1-1 of which recording layer 406 was formed solely from Sb had low signal reliability because the crystallization rate of the recording layer was too high, and that Sample 1-8 of which recording layer 406 had a composition of $Sb_{45}S_{55}$ included excessively high content of S that led to lower crystallization rate and lower erasability.

Samples 1-2 to 1-7 wherein the recording layer 406 contained Sb and S, with composition represented by the formula (1): $Sb_xS_{100-x}$ (atomic %) (50≦x≦98) were satisfactory in both erasability and signal reliability. These results show that, when the recording layer 406 having composition represented by the formula (1), the medium that has the recording layer shows good characteristics. It was also found that the recording layer has further better characteristics when the value of x is not less than 60 and not larger than 80.

Example 2

In Example 2, the information recording medium 11 shown in FIG. 1 was manufactured in the same manner as in Example 1, and the relations of the composition of the recording layer 406 to the erasability and signal reliability of the information layer 40 were investigated. Specifically, 25 kinds of Samples 2-1 to 2-25 of the information recording medium 11 having the recording layers 406 that contained Sb, S and M (M represents at least one element selected from among Sn, Bi, In, Ge and Mn) with different proportions of Sb/S/M were made, and the erasability and the signal reliability of the information layer 40 were determined.

The method of manufacturing the samples was similar to that of Example 1, except that the recording layer 406 was formed by sputtering a sputtering target made of an alloy that contained Sb, S and M (M represents at least one element selected from among Sn, Bi, In, Ge and Mn) in an Ar gas atmosphere having a pressure of 0.2 Pa using a DC power source with an input power of 50 W.

The erasability and signal reliability were determined for each of the samples made as described above, in the same manner as in Example 1. The composition of the recording layer 406 and the result of evaluating the erasability and signal reliability of the information layer 40 for each of the samples are shown in Table 2. The erasability was evaluated by the value of erase ratio, according to the following criteria.
25 dB or higher: o
20 dB or higher, below 25 dB: Δ
Below 20 dB: x The signal reliability was evaluated by the degradation of reproduction beam after one million irradiations of the reproduction beam with Pr=0.35 mW, according to the following criteria.
Below 0.3 dB: o
0.3 dB or higher, below 2 dB: Δ
2 dB or higher: x Evaluation of "o" or "Δ" means that the medium has practically useful performance for the evaluation item, and evaluation of "x" means that the medium does not have practically useful performance for the evaluation item Then comprehensive evaluation of the medium was conducted. A medium that is evaluated as "x" for any one of the evaluation items is given a comprehensive evaluation of "x", a medium that is evaluated as "Δ" for any one of the evaluation items is given a comprehensive evaluation of "o", and a medium that is evaluated as "o" for all of the evaluation items is given a comprehensive evaluation of "⊚".

TABLE 2

| Sample Nos. | Composition of recording layer (atomic %) (atomic ratio in brackets) | Erasability | Signal reliability | Comprehensive evaluation |
|---|---|---|---|---|
| 2-1 | $(Sb_{0.98}S_{0.02})_{98}Ge_2$ | ○ | ○ | ⊚ |
| 2-2 | $(Sb_{0.98}S_{0.02})_{95}Ge_5$ | ○ | ○ | ⊚ |
| 2-3 | $(Sb_{0.98}S_{0.02})_{90}Ge_{10}$ | ○ | ○ | ⊚ |
| 2-4 | $(Sb_{0.98}S_{0.02})_{80}Ge_{20}$ | ○ | ○ | ⊚ |
| 2-5 | $(Sb_{0.98}S_{0.02})_{70}Ge_{30}$ | Δ | ○ | ○ |
| 2-6 | $(Sb_{0.98}S_{0.02})_{65}Ge_{35}$ | X | ○ | X |
| 2-7 | $(Sb_{0.5}S_{0.5})_{98}Sn_2$ | ○ | ○ | ⊚ |
| 2-8 | $(Sb_{0.5}S_{0.5})_{95}Sn_5$ | ○ | ○ | ⊚ |
| 2-9 | $(Sb_{0.5}S_{0.5})_{90}Sn_{10}$ | ○ | ○ | ⊚ |
| 2-10 | $(Sb_{0.5}S_{0.5})_{80}Sn_{20}$ | ○ | ○ | ⊚ |
| 2-11 | $(Sb_{0.5}S_{0.5})_{70}Sn_{30}$ | ○ | Δ | ○ |
| 2-12 | $(Sb_{0.5}S_{0.5})_{65}Sn_{35}$ | ○ | X | X |
| 2-13 | $(Sb_{0.7}S_{0.3})_{98}In_2$ | ○ | ○ | ⊚ |
| 2-14 | $(Sb_{0.7}S_{0.3})_{90}In_{10}$ | ○ | ○ | ⊚ |
| 2-15 | $(Sb_{0.7}S_{0.3})_{80}In_{20}$ | ○ | ○ | ⊚ |
| 2-16 | $(Sb_{0.7}S_{0.3})_{70}In_{30}$ | Δ | ○ | ○ |
| 2-17 | $(Sb_{0.7}S_{0.3})_{65}In_{35}$ | X | ○ | X |
| 2-18 | $(Sb_{0.7}S_{0.3})_{98}Mn_2$ | ○ | ○ | ⊚ |
| 2-19 | $(Sb_{0.7}S_{0.3})_{90}Mn_{10}$ | ○ | ○ | ⊚ |
| 2-20 | $(Sb_{0.7}S_{0.3})_{80}Mn_{20}$ | Δ | ○ | ○ |
| 2-21 | $(Sb_{0.7}S_{0.3})_{70}Mn_{30}$ | X | ○ | X |
| 2-22 | $(Sb_{0.7}S_{0.3})_{98}Bi_2$ | ○ | ○ | ⊚ |
| 2-23 | $(Sb_{0.7}S_{0.3})_{90}Bi_{10}$ | ○ | ○ | ⊚ |
| 2-24 | $(Sb_{0.7}S_{0.3})_{80}Bi_{20}$ | ○ | Δ | ○ |
| 2-25 | $(Sb_{0.7}S_{0.3})_{70}Bi_{30}$ | ○ | X | X |
| 2-26 | $(Sb_{0.7}S_{0.3})_{90}Ge_5Sn_5$ | ○ | ○ | ⊚ |
| 2-27 | $(Sb_{0.7}S_{0.3})_{90}Mn_5Sn_5$ | ○ | ○ | ⊚ |
| 2-28 | $(Sb_{0.7}S_{0.3})_{90}Ge_5Bi_5$ | ○ | ○ | ⊚ |
| 2-29 | $(Sb_{0.7}S_{0.3})_{90}In_5Sn_5$ | ○ | ○ | ⊚ |
| 2-30 | $(Sb_{0.7}S_{0.3})_{90}Ge_3Mn_2Sn_5$ | ○ | ○ | ⊚ |
| 2-31 | $(Sb_{0.7}S_{0.3})_{90}Ge_5Sn_3Bi_2$ | ○ | ○ | ⊚ |

The results show that Sample 2-6 of which recording layer 406 had composition of $(Sb_{0.98}S_{0.02})_{65}Ge_{35}$ had low erasability because the crystallization rate of the recording layer decreased, and that Sample 2-12 of which recording layer 406 had composition of $(Sb_{0.98}S_{0.02})_{65}Sn_{35}$ had low signal reliability because too much Sn was added that led to higher crystallization rate. Sample 2-17 of which recording layer 406 had composition of $(Sb_{0.7}S_{0.3})_{65}In_{35}$ had low signal reliability because too much In was added that led to lower crystallization rate, thus failing to show practically useful erasability.

Samples 2-1 to 2-5, 2-7 to 2-11 and 2-13 to 2-16 wherein the recording layer 406 contained Sb, S and M1 (M represents at least one element selected from among Ge, Sn and In), and the composition of the recording layer 406 was represented by the formula (2):

$$(Sb_zS_{1-z})_{100-y}M1_y (\text{atomic \%}) \quad (2)$$

(wherein suffix z represents the proportion of each atom to the sum of the number of Sb atoms and the number of S atoms which sum is set to 1 and satisfies a relationship of 0.5≦z≦0.98, while suffix y represents the proportion in atomic %, and satisfies a relationship of 0<y≦30) showed satisfactory performance in erasability and signal reliability.

These results show that the recording layer 406 that contains Sb, S and M1 preferably has the composition represented by the formula (2). Results of Samples 2-1 to 2-4, 2-7 to 2-10 and 2-13 to 2-15 also show that more favorable characteristics can be obtained when y satisfies a relationship of $2 \leq y \leq 20$ in formula (2) shown above.

It was found that Sample 2-21 of which recording layer 406 had composition of $(Sb_{0.7}S_{0.3})_{70}Mn_{30}$ failed to show practically useful erasability because too much Mn was added and therefore the crystallization rate was decreased.

Further, it was found that Sample 2-25 of which recording layer 406 had composition of $(Sb_{0.7}S_{0.3})_{70}Bi_{30}$ had low signal reliability because too much Bi was added that led to higher crystallization rate.

Samples 2-18 to 2-20, and 2-22 to 2-24 wherein the recording layer 406 contained Sb, S and M2 (M2 represents at least one element selected from among Bi and Mn), and composition of the recording layer 406 was represented by the formula (3):

$$(Sb_aS_{1-a})_{100-b}M2_b (\text{atomic \%}) \tag{3}$$

(wherein suffix a represents the proportion of each atom to the sum of the number of Sb atoms and the number of S atoms which sum is set to 1 and satisfies a relationship of $0.5 \leq a \leq 0.98$, while suffix b represents the proportion in atomic %, and satisfies a relationship of $0 < b \leq 20$) showed satisfactory performance in erasability and signal reliability. These results show that the recording layer 406 that contains Sb, S and M2 preferably has the composition represented by the formula (3). Results of Samples 2-18 and 2-19 also show that more favorable characteristics can be obtained when b satisfies a relationship of $2 \leq b \leq 10$ in formula (3) shown above.

Moreover, the recording media (samples 2-26 and 2-29) containing two kinds of element as M1 and the recording media (samples 2-27, 2-28, 2-30 and 2-31) containing both M1 and M2 showed satisfactory performance in erasability and signal reliability.

Example 3

In Example 3, the information recording medium 11 shown in FIG. 1 was made, and the relations of the thickness of the recording layer 406 to the erasability and signal reliability of the information layer 40 were investigated. Specifically, six kinds of Samples 3-1 to 3-6 of the information recording medium 11 having the information layers 40 wherein the recording layers 406 had different thicknesses were manufactured and the erasability and the signal reliability were determined.

The method of manufacturing the samples was similar to that of Example 1, except for the thickness of the recording layer 406. The recording layers 406 were formed by sputtering operation wherein sputtering targets made of materials containing Sb and S were sputtered in an Ar gas atmosphere having a pressure of 0.2 Pa using a DC power source with an input power of 50 W from. The composition of the recording layer was $Sb_{60}S_{40}$.

The thickness of the recording layer 406 and the evaluation results of the erasability and signal reliability of the information layer 40 for each of the samples manufactured as described above are shown in Table 3. Evaluation was conducted in the same manner as in Example 1. The erasability was evaluated by the value of erase ratio, according to the following criteria.

25 dB or higher: ○
20 dB or higher, below 25 dB: Δ
Below 20 dB: x

The signal reliability was evaluated by the degradation of reproduction beam after one million irradiations of the reproduction beam with Pr=0.35 mW, according to the following criteria.
Below 0.3 dB: ○
0.3 dB or higher, below 2 dB: Δ
2 dB or higher: x Evaluation of "○" or "Δ" means that the medium has practically useful performance for the evaluation item, and evaluation of "x" means that the medium does not have practically useful performance for the evaluation item Then comprehensive evaluation of the medium was conducted. A medium that is evaluated as "x" for any one of the evaluation items is given a comprehensive evaluation of "x", a medium that is evaluated as "Δ" for any one of the evaluation items is given a comprehensive evaluation of "○", and a medium that is evaluated as "○" for all of the evaluation items is given a comprehensive evaluation of "◎".

TABLE 3

| Sample Nos. | Thickness of recording layer (nm) | Erasability | Signal reliability | Comprehensive evaluation |
|---|---|---|---|---|
| 3-1 | 7 | Δ | ○ | ○ |
| 3-2 | 9 | ○ | ○ | ◎ |
| 3-3 | 11 | ○ | ○ | ◎ |
| 3-4 | 13 | ○ | ○ | ◎ |
| 3-5 | 15 | ○ | Δ | ○ |
| 3-6 | 16 | ○ | X | X |

Sample 3-6 wherein the recording layer 406 had a thickness of 16 nm showed low signal reliability because the recording layer 406 was too thick. Thus it was found that the medium shows good erasability and good signal reliability when the recording layer 406 has a thickness in a range of from 7 to 15 nm. These results show that the thickness of the recording layer 406 that contains Sb and S is preferably not larger than 15 nm. Very good characteristics were obtained when the thickness of the recording layer 406 is in a range of from 9 nm to 13 nm.

Example 4

In Example 4, the information recording medium 13 shown in FIG. 4 was manufactured, and the relations of the thickness of the recording layer 426 included in the second information layer 42 to the erase ratio and signal reliability of the second information layer 42 and signal intensity of the first information layer 41 were investigated. Specifically, Samples 4-1 to 4-6 of the information recording medium 13 having the information layers 42 wherein the recording layers 426 had different thicknesses were manufactured, and the erasability and signal reliability of the second information layer 42 and signal intensity of the first information layer 41 were determined. Signal intensity was evaluated by the level of CNR. The information recording medium 13 has two information layers, namely the number N of the information layers (N is an integer, $N \geq 2$) is 2.

Samples were made as follows. First, the substrate 21 made of polycarbonate (120 mm in diameter, 1.1 mm in thickness) was prepared with guide groove (20 nm in depth, 0.32 μm in track pitch) formed thereon for guiding the laser beam 31. An Ag—Pd—Cu layer (80 nm in thickness) as the reflective layer 412, a $(ZrO_2)_{50}(In_2O_3)_{50}$ layer (25 nm in thickness) as the first dielectric layer 414, an $Sb_{60}S_{40}$ layer (10 nm in thickness) as the recording layer 416, a $(ZrO_2)_{50}(Cr_2O_3)_{50}$ layer (5 nm in thickness) as the second interface layer (not shown), and a $(ZnS)_{80}(SiO_2)_{20}$ layer (60 nm in thickness) as the second dielectric layer 418 were formed successively on the polycarbonate substrate by the sputtering method.

Provided in the film formation apparatus used for sputtering of the layers described above were an Ag—Pd—Cu alloy sputtering target for forming the reflective layer 412, a $(ZrO_2)_{50}(In_2O_3)_{50}$ sputtering target for forming the first dielectric layer 414, a sputtering target that contained Sb and S for forming the recording layer 416 (with composition adjusted so as to form a film of $Sb_{60}S_{40}$), a $(ZrO_2)_{50}(Cr_2O_3)_{50}$ sputtering target for forming the second interface layer and a $(ZnS)_{80}(SiO_2)_{20}$ sputtering target for forming the second dielectric layer 418. All the sputtering targets had a shape of 100 mm in diameter and 6 mm in thickness.

The reflective layer 412 was formed using a DC power source with an input power of 100 W in an Ar gas atmosphere having a pressure of 0.3 Pa. The first dielectric layer 414 was formed using an RF power source with the input power of 200 W in an Ar gas atmosphere having a pressure of 0.1 Pa. The recording layer 416 was formed using a DC power source with the input power of 50 W in an Ar gas atmosphere having a pressure of 0.2 Pa. The second interface layer was formed using an RF power source with the input power of 200 W in an Ar gas atmosphere having a pressure of 0.1 Pa. The second dielectric layer 418 was formed using an RF power source with the input power of 400 W in an Ar gas atmosphere having a pressure of 0.1 Pa.

Then the second dielectric layer 418 was coated with an ultraviolet curable resin (an acrylic resin) to form a uniform resin layer. A substrate having guide groove (20 nm in depth, 0.32 μm in track pitch) formed thereon was pressed against the resin layer followed by curing the resin, and the substrate was removed after curing the resin. Thus the separation layer 22 having a thickness of 25 μm was formed, wherein the guide groove for guiding the laser beam 31 was formed on the second information layer 42 side.

Then a $TiO_2$ layer (20 nm in thickness) as the transmittance adjustment layer 421, an Ag—Pd—Cu layer (10 nm in thickness) as the reflective layer 422, a $(ZrO_2)_{50}(In_2O_3)_{50}$ layer (15 nm in thickness) as the first dielectric layer 424, an $Sb_{70}S_{30}$ layer as the recording layer 426, a $(ZrO_2)_{50}(Cr_2O_3)_{50}$ layer (5 nm in thickness) as the second interface layer (not shown), and a $(ZnS)_{80}(SiO_2)_{20}$ layer (40 nm in thickness) as the second dielectric layer 428 were formed successively on the separation layer 22 by the sputtering method.

Provided in the film formation apparatus used for sputtering of the layers described above were a $TiO_2$ sputtering target for forming the transmittance adjustment layer 421, an Ag—Pd—Cu alloy sputtering target for forming the reflective layer 422, a $(ZrO_2)_{50}(In_2O_3)_{50}$ sputtering target for forming the first dielectric layer 424, a sputtering target that contained Sb and S for forming the recording layer 426 (with composition adjusted so as to form a film of $Sb_{70}S_{30}$), a $(ZrO_2)_{50}(Cr_2O_3)_{50}$ sputtering target for forming the second interface layer and a $(ZnS)_{80}(SiO_2)_{20}$ sputtering target for forming the second dielectric layer 428. All the sputtering targets had shapes of 100 mm in diameter and 6 mm in thickness.

The transmittance adjustment layer 421 was formed using an RF power source with an input power of 400 W in a mixed-gas atmosphere of Ar and oxygen (oxygen gas in 3% in volume to the whole) having a pressure of 0.3 Pa. The reflective layer 422 was formed using a DC power source with an input power of 100 W in an Ar gas atmosphere having a pressure of 0.3 Pa. The first dielectric layer 424 was formed using an RF power source with an input power of 200 W in an Ar gas atmosphere having a pressure of 0.1 Pa. The recording layer 426 was formed using a DC power source with an input power of 50 W in an Ar gas atmosphere having a pressure of 0.2 Pa. The second interface layer was formed using an RF power source with an input power of 200 W in an Ar gas atmosphere having a pressure of 0.1 Pa. The second dielectric layer 428 was formed using an RF power source with an input power of 400 W in an Ar gas atmosphere having a pressure of 0.1 Pa.

Last, the second dielectric layer 428 was coated with an ultraviolet curable resin (an acrylic resin) to form a uniform resin layer by spin coating. The resin layer was cured by irradiating it with ultraviolet ray, thereby forming the transparent layer 23 having a thickness of 75 μm. Then an initialization process was carried out in which the recording layer 416 and the recording layer 426 were crystallized by being irradiated with laser beam. In this way, a plurality of samples having the recording layers 426 of different thicknesses were made.

The erasability and signal reliability of the information layer 42 and the signal intensity of the first information layer 41 of the information recording medium 13 were determined by using the recording/reproduction apparatus shown in FIG. 10, for each of the samples made as described above. The determinations were made with the laser beam 31 having a wavelength of 405 nm, the objective lens 32 having a numerical aperture NA of 0.85, the sample rotating at a linear velocity of 19.7 m/second during the determination and a minimum mark length (2T) of 0.149 μm.

The thickness of the recording layer 426, the results of evaluating the erasability and the signal reliability of the information layer 42 and the signal intensity of the first information layer 41 for each of the samples are shown in Table 4. The erasability was evaluated by the value of erase ratio, according to the following criteria.
25 dB or higher: o
20 dB or higher, below 25 dB: Δ
Below 20 dB: x The signal reliability was evaluated by the degradation of reproduction beam after one million irradiations of the reproduction beam with Pr=0.7 mW, according to the following criteria.
Below 0.3 dB: o
0.3 dB or higher, below 2 dB: Δ
2 dB or higher: x The signal intensity of the first information layer 41 was evaluated by the CNR value, according to the following criteria.
40 dB or higher: o
34 dB or higher, below 40 dB: Δ
34 dB or lower: x Evaluation of "o" or "Δ" means that the medium has practically useful performance for the evaluation item, and evaluation of "x" means that the medium does not have practically useful performance for the evaluation item Then comprehensive evaluation of the medium was conducted. A medium that is evaluated as "x" for at least one of the evaluation items is given a comprehensive evaluation of "x", a medium that is evaluated as "Δ" for at least one of the evaluation items is given a comprehensive evaluation of "Δ", and a medium that is evaluated as "o" for all of the evaluation items is given a comprehensive evaluation of "⊙".

TABLE 4

| Sample Nos. | Second information layer | | | Signal | |
| --- | --- | --- | --- | --- | --- |
| | Thickness of recording layer (nm) | Erasability | Signal reliability | intensity of the first information layer | Comprehensive evaluation |
| 4-1 | 4 | Δ | ○ | ○ | ○ |
| 4-2 | 5 | ○ | ○ | ○ | ◎ |
| 4-3 | 6 | ○ | ○ | ○ | ◎ |
| 4-4 | 7 | ○ | ○ | ○ | ◎ |
| 4-5 | 8 | ○ | ○ | ○ | ◎ |
| 4-6 | 9 | ○ | Δ | Δ | ○ |

The results show that a medium having the recording layer 426 of which thickness is in a range of 4 nm to 9 nm has good characteristics in all of the erasability and signal reliability of the second information layer 42 and the signal intensity of the first information layer 41. When the thickness of the recording layer 426 was in a range of from 5 nm to 8 nm, more favorable characteristics were obtained.

Example 5

In Example 5, the information recording medium 14 shown in FIG. 5 was manufactured, and the relations of the thickness of the recording layer 446 included in the fourth information layer 44 to the erase ratio and the signal reliability of the fourth information layer 44, the signal intensity of the third information layer 43, the signal intensity of the second information layer 42 and the signal intensity of the first information layer 41, were investigated. Specifically, six kinds of Samples 5-1 to 5-6 of the information recording medium 14 having the information layers 44 wherein the recording layers 446 had different thicknesses were manufactured, and the erase ratio and the signal reliability of the fourth information layer 44, the signal intensity of the third information layer 43, the signal intensity of the second information layer 42 and the signal intensity of the first information layer 41 were determined. The signal intensity was evaluated by the level of CNR. The information recording medium 14 has four information layers, namely the number N of the information layers (N is an integer, N≧2) is 4.

The samples were manufactured as follows. First, the substrate 21 made of polycarbonate (120 mm in diameter, 1.1 mm in thickness) was prepared with guide groove (20 nm in depth, 0.32 μm in track pitch) formed thereon for guiding the laser beam 31. An Ag—Pd—Cu layer (80 nm in thickness) as the reflective layer 412, a $(ZrO_2)_{50}(In_2O_3)_{50}$ layer (25 nm in thickness) as the first dielectric layer 414, an $Sb_{60}S_{40}$ layer (10 nm in thickness) as the recording layer 416, a $(ZrO_2)_{50}(Cr_2O_3)_{50}$ layer (5 nm in thickness) as the second interface layer (not shown), and a $(ZnS)_{80}(SiO_2)_{20}$ layer (60 nm in thickness) as the second dielectric layer 418 were formed successively on the polycarbonate substrate by the sputtering method.

Provided in the film formation apparatus used for sputtering of the layers described above were an Ag—Pd—Cu alloy sputtering target for forming the reflective layer 412, a $(ZrO_2)_{50}(In_2O_3)_{50}$ sputtering target for forming the first dielectric layer 414, a sputtering target that contained Sb and S for forming the recording layer 416 (with composition adjusted so as to form a film of $Sb_{60}S_{40}$), a $(ZrO_2)_{50}(Cr_2O_3)_{50}$ sputtering target for forming the second interface layer and a $(ZnS)_{80}(SiO_2)_{20}$ sputtering target for forming the second dielectric layer 418. All the sputtering targets had shapes of 100 mm in diameter and 6 mm in thickness.

The reflective layer 412 was formed using a DC power source with an input power of 100 W from in an Ar gas atmosphere having a pressure of 0.3 Pa. The first dielectric layer 414 was formed using an RF power source with the input power of 200 W in an Ar gas atmosphere having a pressure of 0.1 Pa. The recording layer 416 was formed using a DC power source with the input power of 50 W in an Ar gas atmosphere having a pressure of 0.2 Pa. The second interface layer was formed using an RF power source with the input power of 200 W from in an Ar gas atmosphere having a pressure of 0.1 Pa. The second dielectric layer 418 was formed using an RF power source with the input power of power of 400 W in an atmosphere of Ar having a pressure of 0.1 Pa.

Then the second dielectric layer 418 was coated with an ultraviolet curable resin (an acrylic resin) to form a uniform resin layer by spin coating. A substrate having guide groove (20 nm in depth, 0.32 μm in track pitch) formed thereon was pressed against the resin layer followed by curing the resin, and the substrate was removed after curing the resin. Thus the separation layer 22 having a thickness of 10 μm was formed, wherein the guide groove for guiding the laser beam 31 was formed on the second information layer 42 side.

Then a $TiO_2$ layer (30 nm in thickness) as the transmittance adjustment layer 421, an Ag—Pd—Cu layer (8 nm in thickness) as the reflective layer 422, a $(ZrO_2)_{50}(In_2O_3)_{50}$ layer (10 nm in thickness) as the second dielectric layer 424, a $Sb_{80}S_{20}$ layer (4 nm in thickness) as the recording layer 426, a $(ZrO_2)_{50}(Cr_2O_3)_{50}$ layer (5 nm in thickness) as the second interface layer (not shown), and a $(ZnS)_{80}(SiO_2)_{20}$ layer (40 nm in thickness) as the second dielectric layer 428 were formed successively on the separation layer 22 by the sputtering method.

Provided in the film growing apparatus used for sputtering of the layers described above were a $TiO_2$ sputtering target for forming the transmittance adjustment layer 421, an Ag—Pd—Cu alloy sputtering target for forming the reflective layer 422, a $(ZrO_2)_{50}(In_2O_3)_{50}$ sputtering target for forming the first dielectric layer 424, a sputtering target that contained Sb and S for forming the recording layer 426 (with composition adjusted so as to form a film of $Sb_{80}S_{20}$), a $(ZrO_2)_{50}(Cr_2O_3)_{50}$ sputtering target for forming the second interface layer and a $(ZnS)_{80}(SiO_2)_{20}$ sputtering target for forming the second dielectric layer 428. All the sputtering targets had shapes of 100 mm in diameter and 6 mm in thickness.

The transmittance adjustment layer 421 was formed using an RF power source with an input power of 400 W in a mixed-gas atmosphere of Ar and oxygen (oxygen gas in 3% in volume to the whole) having a pressure of 0.3 Pa. The reflective layer 422 was formed using a DC power source with the input power of 100 W in an Ar gas atmosphere having a pressure of 0.3 Pa. The first dielectric layer 424 was formed using an RF power source with the input power of 200 W in an Ar gas atmosphere having a pressure of 0.1 Pa. The recording layer 426 was formed using a DC power source with the input power of 50 W in an Ar gas atmosphere having a pressure of 0.2 Pa. The second interface layer was formed using an RF power source with the input power of 200 W in an Ar gas atmosphere having a pressure of 0.1 Pa. The second dielectric layer 428 was formed using an RF power source with the input power of 400 W in an Ar gas atmosphere having a pressure of 0.1 Pa.

Then the second dielectric layer 428 was coated with an ultraviolet curable resin (an acrylic resin) to form a uniform resin layer by spin coating. A substrate having guide groove (20 nm in depth, 0.32 μm in track pitch) formed thereon was pressed against the resin layer followed by curing the resin, and the substrate was removed after curing the resin. Thus the separation layer 28 having a thickness of 15 μm was formed, wherein the guide groove for guiding the laser beam 31 was formed on the third information layer 43 side.

Then a $TiO_2$ layer (30 nm in thickness) as the transmittance adjustment layer 431, an Ag—Pd—Cu layer (8 nm in thickness) as the reflective layer 432, a $(ZrO_2)_{50}(In_2O_3)_{50}$ layer (10 nm in thickness) as the second dielectric layer 434, an $Sb_{80}S_{20}$ layer (4 nm in thickness) as the recording layer 436, a $(ZrO_2)_{50}(Cr_2O_3)_{50}$ layer (5 nm in thickness) as the second interface layer (not shown), and a $(ZnS)_{80}(SiO_2)_{20}$ layer (38 nm in thickness) as the second dielectric layer 438 were formed successively on the separation layer 28 by the sputtering method.

Provided in the film formation apparatus used for sputtering of the layers described above were a $TiO_2$ sputtering target for forming the transmittance adjustment layer 431, an Ag—Pd—Cu alloy sputtering target for forming the reflective layer 432, a $(ZrO_2)_{50}(In_2O_3)_{50}$ sputtering target for forming the first dielectric layer 434, a sputtering target that contained Sb and S for forming the recording layer 436 (with composition adjusted so as to form a film of $Sb_{80}S_{20}$), a $(ZrO_2)_{50}(Cr_2O_3)_{50}$ sputtering target for forming the second interface layer and a $(ZnS)_{80}(SiO_2)_{20}$ sputtering target for forming the second dielectric layer 438. All the sputtering targets had shapes of 100 mm in diameter and 6 mm in thickness.

The transmittance adjustment layer 431 was formed using an RF power source with an input power of 400 W in a mixed-gas atmosphere of Ar and oxygen (oxygen gas in 3% in volume to the whole) having a pressure of 0.3 Pa. The reflective layer 432 was formed using a DC power source with the input power of 100 W in an Ar gas atmosphere having a pressure of 0.3 Pa. The first dielectric layer 434 was formed using an RF power source with the input power of 200 W in an Ar gas atmosphere having a pressure of 0.1 Pa. The recording layer 436 was formed using a DC power source with the input power of 50 W in an Ar gas atmosphere having a pressure of 0.2 Pa. The second interface layer was formed using an RF power source with the input power of 200 W in an Ar gas atmosphere having a pressure of 0.1 Pa. The second dielectric layer 438 was formed using an RF power source with the input power of 400 W in an Ar gas atmosphere having a pressure of 0.1 Pa.

Then the second dielectric layer 438 was coated with an ultraviolet curable resin (an acrylic resin) to form a uniform resin layer by spin coating. A substrate having guide groove (20 nm in depth, 0.32 μm in track pitch) formed thereon was pressed against the resin layer followed by curing the resin, and the substrate was removed after curing the resin. Thus the separation layer 29 having a thickness of 10 μm was formed with guide groove for guiding the laser beam 31 formed on the fourth information layer 44 side.

Then a $TiO_2$ layer (25 nm in thickness) as the transmittance adjustment layer 441, an Ag—Pd—Cu layer (7 nm in thickness) as the reflective layer 442, a $(ZrO_2)_{50}(In_2O_3)_{50}$ layer (10 nm in thickness) as the second dielectric layer 444, an $(Sb_{0.85}S_{0.15})_{95}Ge_5$ layer as the recording layer 446, a $(ZrO_2)_{50}(Cr_2O_3)_{50}$ layer (5 nm in thickness) as the second interface layer (not shown), and a $(ZnS)_{80}(SiO_2)_{20}$ layer (35 nm in thickness) as the second dielectric layer 448 were formed successively on the separation layer 29 by the sputtering method.

Provided in the film formation apparatus used for sputtering of the layers described above were a $TiO_2$ sputtering target for forming the transmittance adjustment layer 441, an Ag—Pd—Cu alloy sputtering target for forming the reflective layer 442, a $(ZrO_2)_{50}(In_2O_3)_{50}$ sputtering target for forming the first dielectric layer 444, a sputtering target that contained Sb and S for forming the recording layer 446 (with composition adjusted so as to form a film of $(Sb_{0.95}S_{0.15})_{95}Ge_5$), a $(ZrO_2)_{50}(Cr_2O_3)_{50}$ sputtering target for forming the second interface layer and a $(ZnS)_{80}(SiO_2)_{20}$ sputtering target for forming the second dielectric layer 448. All the sputtering targets had shapes of 100 mm in diameter and 6 mm in thickness.

The transmittance adjustment layer 441 was formed using an RF power source with an input power of 400 W in a mixed-gas atmosphere of Ar and oxygen (oxygen gas in 3% in volume to the whole) having a pressure of 0.3 Pa. The reflective layer 442 was formed using a DC power source with the input power of 100 W in an Ar gas atmosphere having a pressure of 0.3 Pa. The first dielectric layer 444 was formed using an RF power source with the input power of 200 W in an Ar gas atmosphere having a pressure of 0.1 Pa. The recording layer 446 was formed using a DC power source with the input power of 50 W in an Ar gas atmosphere having a pressure of 0.2 Pa. The second interface layer was formed using an RF power source with the input power of 200 W in an Ar gas atmosphere having a pressure of 0.1 Pa. The second dielectric layer 448 was formed using an RF power source with the input power of 400 W in an Ar gas atmosphere having a pressure of 0.1 Pa.

Last, the second dielectric layer 448 was coated with an ultraviolet curable resin (an acrylic resin) to form a uniform resin layer by spin coating. The resin layer was cured by irradiating it with ultraviolet ray, thereby forming the transparent layer 23 having a thickness of 65 μm. Then initialization process was carried out in which the recording layer 416, the recording layer 426, the recording layer 436 and the recording layer 446 were crystallized by being irradiated with laser beam. In this way, a plurality of samples having the recording layers 446 of different thicknesses were manufactured.

The erasability and signal reliability of the information layer 42, the signal intensity of the third information layer 43, the signal intensity of the second information layer 42 and the signal intensity of the first information layer 41 of the information recording medium 13 were determined by using the recording/reproduction apparatus shown in FIG. 10, for each of the samples made as described above. The determinations were made with the laser beam 31 having a wavelength of 405 nm, the objective lens 32 having a numerical aperture NA of 0.85, the sample rotating at a linear velocity of 19.7 m/second during the determination and a minimum mark length (2T) of 0.149 μm.

Thickness of the recording layer 446, the result of evaluating the erasability and the signal reliability of the second information layer 42, the signal intensity of the third information layer 43, the signal intensity of the second information layer 42 and the signal intensity of the first information layer 41 for each of the samples are shown in Table 5. The erasability was evaluated by the value of erase ratio, according to the following criteria.

25 dB or higher: ○
20 dB or higher, below 25 dB: Δ
Below 20 dB: x

The signal reliability was evaluated by the degradation of reproduction beam after one million irradiations of the reproduction beam with Pr=1.4 mW, according to the following criteria.

Below 0.3 dB: ○
0.3 dB or higher, below 2 dB: Δ
2 dB or higher: x

The signal intensity of each of the information layers was evaluated by the CNR value, according to the following criteria.
40 dB or higher: ○
34 dB or higher, below 40 dB: Δ
34 dB or lower: x Evaluation of "○" or "Δ" means that the medium has practically useful performance for the evaluation item, and evaluation of "x" means that the medium does not have practically useful performance for the evaluation item

TABLE 5

| Sample Nos. | Fourth information layer | | | Signal intensity of the third information layer | Signal intensity of the second information layer | Signal intensity of the first information layer | Comprehensive evaluation |
| | Thickness of recording layer (nm) | Erasability | Signal reliability | | | | |
| --- | --- | --- | --- | --- | --- | --- | --- |
| 5-1 | 1 | X | ○ | ○ | ○ | ○ | X |
| 5-2 | 2 | Δ | ○ | ○ | ○ | ○ | ○ |
| 5-3 | 3 | ○ | ○ | ○ | ○ | ○ | ◎ |
| 5-4 | 4 | ○ | ○ | ○ | ○ | ○ | ◎ |
| 5-5 | 5 | ○ | ○ | ○ | ○ | ○ | ◎ |
| 5-6 | 6 | ○ | Δ | Δ | Δ | Δ | ○ |

The results show that sample 5-1 having the recording layer 446 of which thickness is 1 nm has low erasability due to low crystallization rate because the recording layer 446 is too thin. It was also found that the recording layer 446 having thickness in a range of from 2 to 6 nm shows satisfactory characteristics in the erasability and the signal reliability of the fourth information layer 44, the signal intensity of the third information layer 43, the signal intensity of the second information layer 42 and the signal intensity of the first information layer 41.

Example 6

In Example 6, the information recording medium 15 shown in FIG. 6 was manufactured, and the performance was evaluated in the same manner as in Examples 1 and 2. Samples were manufactured as follows. First, a substrate made of polycarbonate (120 mm in diameter, 0.6 mm in thickness) was prepared as the substrate 24 with guide groove (40 nm in depth, 0.68 μm in track pitch) formed thereon for guiding the laser beam 31. A $(ZnS)_{80}(SiO_2)_{20}$ layer (60 nm in thickness) as the second dielectric layer 408, a $(ZrO_2)_{50}(Cr_2O_3)_{50}$ layer (5 nm in thickness) as the second interface layer (not shown), the recording layer 406 (10 nm in thickness) containing Sb and S or Sb, S and M with different compositions thereof, a $(ZrO_2)_{50}(In_2O_3)_{50}$ layer (25 nm in thickness) as the first dielectric layer 404 and an Ag—Pd—Cu layer (80 nm in thickness) as the reflective layer 402 were formed successively on the polycarbonate substrate by the sputtering method. The film formation apparatus, the sputtering targets, the film formation conditions (kind of gas, pressure and input power) that were employed were similar to those employed in Example 1.

After forming the information layer, a dummy substrate 26 was coated with an ultraviolet curable resin (an acrylic resin) to form a uniform resin layer (20 μm in thickness) by spin coating. The reflective layer 402 provided on the substrate 24 was put into contact with the dummy substrate 26, and the resin layer was cured by applying ultraviolet ray on the dummy substrate 26 side. Thus the substrate 24 and the dummy substrate 26 were bonded together via the adhesive layer 27. Then initialization step was carried out in which the recording layer 406 was irradiated with laser beam over the entire surface thereof so as to crystallize.

The erasability and signal reliability of the information layer 40 of the information recording medium 15 were determined in the same manner as in Examples 1 and 2, for the sample manufactured as described above. The determinations were made with the laser beam 11 having a wavelength of 405 nm, the objective lens 41 having a numerical aperture NA of 0.65, the sample rotating at a linear velocity of 22.4 m/second during the determination and a minimum mark length of 0.173 μm.

It was found, similarly to Example 1, that sample wherein the recording layer 406 contains Sb and S, and the recording layer 406 has composition represented by the formula (1): $Sb_xS_{100-x}$ (atomic %) (x satisfies a relationship of $50 \leq x \leq 98$) shows good erasability and good signal reliability.

It was also found, similarly to Example 2, that good erasability and good signal reliability can be obtained when the recording layer 406 contains Sb, S and M1 (M1 represents at least one element selected from among Ge, Sn and In), and the composition of the recording layer 406 is represented by the formula (2): $(Sb_zS_{1-z})_{100-y}M1_y$ (atomic %) (suffix z represents the proportion of each atom to the sum of the number of Sb atoms and the number of S atoms which sum is set to 1 and satisfies a relationship of $0.5 \leq z \leq 0.98$, while suffix y represents the proportion in atomic %, and satisfies a relationship of $0 < y \leq 30$).

Moreover, it was also found, similarly to Example 2, that good erasability and good signal reliability can be obtained when the recording layer 406 contains Sb, S and M2 (M1 represents at least one element selected from among Bi and Mn), and the composition of the recording layer 406 is represented by the formula (3): $(Sb_aS_{1-a})_{100-b}M2_b$ (atomic %) (suffix a represents the proportion of each atom to the sum of the number of Sb atoms and the number of S atoms which sum is set to 1 and satisfies a relationship of $0.5 \leq a \leq 0.98$, while suffix b represents the proportion in atomic %, and satisfies a relationship of $0 < b \leq 20$).

Example 7

In Example 7, the information recording medium 15 shown in FIG. 6 was manufactured, and the performance was in the same manner as in Example 3.

The method for manufacturing samples was similar to that employed in Example 6, except for the thickness of the recording layer 406. The recording layer 406 was formed by the sputtering operation wherein a sputtering target that contained Sb and S was sputtered using a DC power source with an input power of 50 W from a in an Ar gas atmosphere having a pressure of 0.2 Pa. The composition of the recording layer 406 was $Sb_{60}S_{40}$.

The erasability and signal reliability were evaluated in the same manner as in Example 1, for the sample manufactured as described above. It was found, similarly to Example 3, that good erasability and good signal reliability can be obtained when the recording layer 406 has a thickness in a range of from 7 nm to 15 nm.

Example 8

In Example 8, the information recording medium 17 shown in FIG. 8 was manufactured, and the performance was evaluated in the same manner as in Example 4.

Samples were made as follows. First, a substrate made of polycarbonate (120 mm in diameter, 0.6 mm in thickness) was prepared as the substrate 24 with guide groove (40 nm in depth, 0.68 μm in track pitch) formed thereon for guiding the laser beam 31. A $(ZnS)_{80}(SiO_2)_{20}$ layer (40 nm in thickness) as the second dielectric layer 428, a $(ZrO_2)_{50}(Cr_2O_3)_{50}$ layer (5 nm in thickness) as the second interface layer (not shown), an $Sb_{70}S_{30}$ layer as the recording layer 426, a $(ZrO_2)_{50}(In_2O_3)_{50}$ layer (15 nm in thickness) as the first dielectric layer 424, an Ag—Pd—Cu layer (10 nm in thickness) as the reflective layer 422 and a $TiO_2$ layer (20 nm in thickness) as the transmittance adjustment layer 421 were formed successively on the polycarbonate substrate by sputtering. The film formation apparatus, the sputtering targets, the film formation conditions (kind of gas, pressure and input power) that were employed were similar to those used in forming the second information layer 42 of Example 4.

A substrate made of polycarbonate (120 mm in diameter, 0.58 mm in thickness) was prepared as the substrate 25 with guide groove (40 nm in depth, 0.68 μm in track pitch) formed thereon for guiding the laser beam 31. An Ag—Pd—Cu layer (80 nm in thickness) as the reflective layer 412, a $(ZrO_2)_{50}(In_2O_3)_{50}$ layer (25 nm in thickness) as the first dielectric layer 414, an $Sb_{60}S_{40}$ layer (10 nm in thickness) as the recording layer 416, a $(ZrO_2)_{50}(Cr_2O_3)_{50}$ layer (5 nm in thickness) as the second interface layer (not shown) and a $(ZnS)_{80}(SiO_2)_{20}$ layer (60 nm in thickness) as the second dielectric material layer 418 were formed successively on the polycarbonate substrate by the sputtering method. The film formation apparatus, the sputtering targets, the film formation conditions (kind of gas, pressure and input power) that were employed were similar to those used in forming the first information layer 41 of Example 4.

Then the second dielectric layer 418 formed on the substrate 25 was coated with an ultraviolet curable resin (an acrylic resin) to form a uniform resin layer (20 μm in thickness) by spin coating. The transmittance adjustment layer 421 formed on the substrate 24 was put into contact with the substrate 25, and the resin was cured by applying ultraviolet ray on the substrate 24 side. Thus the substrate 24 and the substrate 25 were bonded together by an adhesive layer 27. Last, an initialization process was carried out in which the recording layer 416 and the recording layer 426 were crystallized overall by laser beam.

The erasability and signal reliability of the second information layer 42 and signal intensity of the first information layer 41 of the information recording medium 17 were determined by a method similar to that used in Example 4, for the samples made as described above. The determinations were made with the laser beam 31 having a wavelength of 405 nm, the objective lens 41 having a numerical aperture NA of 0.65, the sample rotating at a linear velocity of 22.4 m/second during the determination and a minimum mark length of 0.173 μm.

It was found, similarly to Example 4, that good erasability and good signal reliability of the second information layer 42 and satisfactory signal intensity of the first information layer 41 can be obtained when the recording layer 426 has a thickness in a range of from 4 nm to 9 nm.

Example 9

In Example 9, the information recording medium 18 shown in FIG. 9 was manufactured, and the performance was evaluated in the same manner as in Example 5.

Samples were manufactured as follows. First, the substrate 24 made of polycarbonate (120 mm in diameter, 0.6 mm in thickness) was prepared with guide groove (40 nm in depth, 0.68 μm in track pitch) formed thereon for guiding the laser beam 31. A $(ZnS)_{80}(SiO_2)_{20}$ layer (35 nm in thickness) as the second dielectric layer 448, a $(ZrO_2)_{50}(Cr_2O_3)_{50}$ layer (5 nm in thickness) as the second interface layer (not shown), an $(Sb_{0.85}S_{0.15})_{95}Ge_5$ layer as the recording layer 446, a $(ZrO_2)_{50}(In_2O_3)_{50}$ layer (10 nm in thickness) as the second dielectric layer 444, an Ag—Pd—Cu layer (7 nm in thickness) as the reflective layer 442, and a $TiO_2$ layer (25 nm in thickness) as the transmittance adjustment layer 441 were formed successively on the polycarbonate substrate by the sputtering method. The film formation apparatus, the sputtering targets, the film formation conditions (kind of gas, pressure and input power) were similar to those employed when forming the fourth information layer 44 in Example 5.

The transmittance adjustment layer 441 was coated with an ultraviolet curable resin (an acrylic resin) to form a uniform resin layer by spin coating. With the substrate having the guide groove (40 nm in depth, 0.68 μm in track pitch) formed therein being put into contact with the resin layer, the resin was cured. After curing the resin, the substrate was removed, and the separation layer 29 having a thickness of 15 μm was formed, wherein the guide groove layer for guiding the laser beam 31 was formed on the third information layer 43 side.

Then on the separation layer 29, a $(ZnS)_{80}(SiO_2)_{20}$ layer (38 nm in thickness) as the second dielectric layer 438, a $(ZrO_2)_{50}(Cr_2O_3)_{50}$ layer (5 nm in thickness) as the second interface layer (not shown), an $Sb_{80}S_{20}$ layer (4 nm in thickness) as the recording layer 436, a $(ZrO_2)_{50}(In_2O_3)_{50}$ layer (10 nm in thickness) as the second dielectric layer 434, an Ag—Pd—Cu layer (8 nm in thickness) as the reflective layer 432, and a $TiO_2$ layer (30 nm in thickness) as the transmittance adjustment layer 431 were formed successively by the sputtering method. The film formation apparatus, the sputtering targets and the film formation conditions (kind of gas, pressure and input power) were similar to those employed when forming the third information layer 43 of Example 5.

Then the transmittance adjustment layer 431 was coated with an ultraviolet curable resin (an acrylic resin) to form a uniform resin layer by spin coating. With the substrate having the guide groove (40 nm in depth, 0.68 μm in track pitch) formed therein being put into contact with the resin layer followed by curing the resin, and the substrate was removed after curing the resin. Thus the separation layer 28 having a thickness of 10 μm was formed, wherein the guide groove for guiding the laser beam 31 was formed on the second information layer 42 side.

Then on the separation layer 28, a $(ZnS)_{80}(SiO_2)_{20}$ layer (40 nm in thickness) as the second dielectric layer 428, a $(ZrO_2)_{50}(Cr_2O_3)_{50}$ layer (5 nm in thickness) as the second interface layer (not shown), an $Sb_{80}S_{20}$ layer (4 nm in thickness) as the recording layer 426, a $(ZrO_2)_{50}(In_2O_3)_{50}$ layer (10 nm in thickness) as the second dielectric layer 424, an Ag—Pd—Cu layer (8 nm in thickness) as the reflective layer 422, and a $TiO_2$ layer (30 nm in thickness) as the transmittance adjustment layer 421 were formed successively by the sputtering method. The film formation apparatus, the sputtering targets and the film formation conditions (kind of gas, pressure and input power) were similar to those employed when forming the second information layer 42 in Example 5.

A substrate made of polycarbonate (120 mm in diameter, 0.56 mm in thickness) was prepared as the substrate 25 with guide groove (40 nm in depth, 0.68 µm in track pitch) formed thereon for guiding the laser beam 31. An Ag—Pd—Cu layer (80 nm in thickness) as the reflective layer 412, a $(ZrO_2)_{50}(In_2O_3)_{50}$ layer (25 nm in thickness) as the first dielectric layer 414, an $Sb_{60}S_{40}$ layer (10 nm in thickness) as the recording layer 416, a $(ZrO_2)_{50}(Cr_2O_3)_{50}$ layer (5 nm in thickness) as the second interface layer (not shown) and a $(ZnS)_{80}(SiO_2)_{20}$ layer (60 nm in thickness) as the second dielectric material layer 418 were formed successively on the polycarbonate substrate by the sputtering method. The film formation apparatus, the sputtering targets, the film formation conditions (kind of gas, pressure and input power) that were employed were similar to those used in forming the first information layer 41 in Example 5.

Then the second dielectric layer 428 formed on the substrate 25 was coated with an ultraviolet curable resin to form a uniform resin layer (15 µm in thickness) by spin coating. The transmittance adjustment layer 431 formed on the substrate 24 was put into contact with the resin layer, and the resin was cured by applying ultraviolet ray on the substrate 24 side. Thus the substrate 24 and the substrate 25 were bonded together by an adhesive layer 27. Last, an initialization process was carried out in which the recording layers 416, 426, 436 and 446 were crystallized overall by laser beam.

The erasability and signal reliability of the fourth information layer 44, signal intensity of the third information layer 43, signal intensity of the second information layer 42 and signal intensity of the first information layer 41 of the information recording medium 18 were determined by a method similar to that used in Example 5, for the samples manufactured as described above. The determinations were made with the laser beam 11 having a wavelength of 405 nm, the objective lens 41 having a numerical aperture NA of 0.65, the sample rotating at a linear velocity of 22.4 m/second during the determination and a minimum mark length of 0.173 µm.

It was found, similarly to Example 5, that good erasability and good signal reliability of the fourth information layer 44, satisfactory signal intensity of the third information layer 43, satisfactory signal intensity of the second information layer 42 and satisfactory signal intensity of the first information layer 41 can be obtained when the recording layer 446 has a thickness in a range from 2 to 6 nm.

The results of Examples 3, 4, 5, 7, 8 and 9 show that the thickness of the recording layer of each of the information recording mediums 11 to 18 is preferably in a range of from 2 nm to 15 nm. That is, a medium having satisfactory performance can be made when the recording layer that contains Sb and S has a thickness in a range from 2 nm to 15 nm.

Example 10

Media having the same constitution as that of the information recording medium made in Example 4 were manufactured while varying the composition of the recording layer 426 included in the second information layer 42. The composition of the recording layer 426 was $Sb_{70}Sn_{30}$ in Sample 10-1 and $Sb_{70}Ge_{30}$ in Sample 10-2. The recording layers of sample 10-1 and sample 10-2 were formed by using an SbSn alloy target (sample 10-1) and an SbGe alloy target (sample 10-2), respectively, supplying input power of 50 W from a DC power source in an Ar gas atmosphere having a pressure of 0.2 Pa. Materials and conditions for forming the other layers were the same as those of samples manufactured in Example 4.

Sample 4-5 manufactured in Example 4 was prepared for the purpose of comparing with Sample 10-1 and Sample 10-2. To determine the transmittance of the second information layer of these samples, a sample for determining transmittance was made wherein only the second information layer 42 and the transparent layer 23 were formed on the substrate 21 without providing the first information layer 41 and the separation layer 22 of the information recording medium 13 shown in FIG. 4, and the relation was investigated between the composition of the recording layer 426 and the transmittance of the second information layer 42.

The sample for determining transmittance was made as follows. First, the substrate 21 made of polycarbonate (120 mm in diameter, 1.1 mm in thickness) was prepared with guide groove (20 nm in depth, 0.32 µm in track pitch) formed thereon for guiding the laser beam 31. Then a $TiO_2$ layer (20 nm in thickness) as the transmittance adjustment layer 421, an Ag—Pd—Cu layer (10 nm in thickness) as the reflective layer 422, a $(ZrO_2)_{50}(In_2O_3)_{50}$ layer (15 nm in thickness) as the first dielectric layer 424, the recording layer 426 (8 nm in thickness), a $(ZrO_2)_{50}(Cr_2O_3)_{50}$ layer (5 nm in thickness) as the second interface layer (not shown), and a $(ZnS)_{80}(SiO_2)_{20}$ layer (40 nm in thickness) as the second dielectric layer 428 were formed successively on the substrate 21 by the sputtering method. Conditions of forming the layers were the same as those of the sample manufactured in Example 4.

Last, the second dielectric layer 428 was coated with an ultraviolet curable resin to form a uniform resin layer by spin coating. The resin layer was cured by irradiating it with ultraviolet ray, thereby forming the transparent layer 23 having a thickness of 75 µm. Then initialization process was carried out in which the recording layer 426 was crystallized by being irradiated with laser beam. In this way, the samples for determining transmittance having the recording layers 426 of different compositions were manufactured.

Transmittance at wavelength 405 nm was determined with a spectroscope on these samples for determining transmittance. Measured value was taken as the transmittance of the second information layer. Sample showing transmittance of 49% or higher was rated as "o", one below 49% was rated "x". Results of evaluation are shown in Table 6.

TABLE 6

| | Second information layer | | | |
|---|---|---|---|---|
| Sample Nos. | Composition of recording layer (atomic %) | Thickness of recording layer (nm) | Transmittance (%) | Transmittance evaluation |
| 10-1 | $Sb_{70}Sn_{30}$ | 8 | 46 | X |
| 10-2 | $Sb_{70}Ge_{30}$ | 8 | 46 | X |
| 4-5 | $Sb_{70}S_{30}$ | 8 | 50 | ◯ |

Sample 4-5 that embodied the present invention showed high transmittance of the second information layer, and therefore sufficient level of signal intensity in the first information layer. Samples 10-1 and 10-2 wherein the recording layer did not include S showed low transmittance, and therefore signal intensity in the first information layer was lower than that of Sample 4-5.

Example 11

Media having the same constitution as that of the information recording medium manufactured in Example 5 were made while varying the composition of the recording layer 446 included in the fourth information layer 44. The composition of the recording layer 446 was $Sb_{80}Sn_{20}$ in Sample 11-1 and $Sb_{80}Ge_{20}$ in Sample 11-2. The recording layers of Sample 11-1 and Sample 11-2 were formed by using an SbSn alloy target (sample 11-1) and an SbGe alloy target (sample 11-2), respectively, supplying input power of 50 W from a DC power source in an Ar gas atmosphere having a pressure of 0.2 Pa. Materials and conditions of forming the other layers were the same as those of samples manufactured in Example 5.

Sample 5-5 manufactured in Example 5 was prepared for the purpose of comparing with the samples. To determine the transmittance of the fourth information layer of these samples, samples for determining transmittance were manufactured wherein only the fourth information layer 44 and the transparent layer 23 were formed on the substrate 21 without providing the first, second and third information layers 41, 42, 43 and the separation layers 22, 28, 29 of the information recording medium 14 shown in FIG. 5, and the relation was investigated between the composition of the recording layer 446 and the transmittance of the fourth information layer 44.

Samples for determining transmittance were made as follows. First, the substrate 21 made of polycarbonate (120 mm in diameter, 1.1 mm in thickness) was prepared with guide groove (20 nm in depth, 0.32 µm in track pitch) formed thereon for guiding the laser beam 31. Then a $TiO_2$ layer (25 nm in thickness) as the transmittance adjustment layer 441, an Ag—Pd—Cu layer (7 nm in thickness) as the reflective layer 442, a $(ZrO_2)_{50}(In_2O_3)_{50}$ layer (10 nm in thickness) as the second dielectric layer 444, the recording layer 446 (5 nm in thickness), a $(ZrO_2)_{50}(Cr_2O_3)_{50}$ layer (5 nm in thickness) as the second interface layer (not shown), and a $(ZnS)_{80}(SiO_2)_{20}$ layer (35 nm in thickness) as the second dielectric layer 448 were formed successively on the substrate 21 by the sputtering method. Conditions of forming the layers were the same as those of the sample manufactured in Example 5.

Last, the second dielectric layer 448 was coated with an ultraviolet curable resin to form a uniform resin layer by spin coating. The resin layer was cured by irradiating it with ultraviolet ray, thereby forming the transparent layer 23 having a thickness of 65 µm. Then initialization process was carried out in which the recording layer 446 was crystallized by being irradiated with laser beam. In this way, the samples for determining transmittance having the recording layers 446 of different compositions were manufactured.

Transmittance at wavelength 405 nm was determined with a spectroscope on these samples for determining transmittance. Measured value was taken as the transmittance of the fourth information layer. Sample showing transmittance of 68% or higher was rated as "o", one below 68% was rated "x". Results of evaluation are shown in Table 7.

TABLE 7

| | Fourth information layer | | | |
|---|---|---|---|---|
| Sample Nos. | Composition of recording layer (atomic %) (atomic ratio in brackets) | Thickness of recording layer (nm) | Transmittance (%) | Transmittance evaluation |
| 11-1 | $Sb_{80}Sn_{20}$ | 5 | 65 | X |
| 11-2 | $Sb_{80}Ge_{20}$ | 5 | 65 | X |
| 5-5 | $(Sb_{0.85}S_{0.15})_{95}Ge_5$ | 5 | 70 | ○ |

Sample 5-5 that embodied the present invention showed high transmittance of the fourth information layer, and therefore the first to third information layers showed sufficient levels of signal intensity. Samples 11-1 and 11-2 wherein the recording layer did not include S showed low transmittance, and therefore the first to third information layers showed signal intensities lower than that of sample 5-5.

Example 12

In Example 12, an electrical information recording medium 61 having a constitution of the electrical information recording medium 61 shown in FIG. 12 without the second recording layer 66, and phase change was confirmed when electrical current was supplied.

A substrate 62 formed from Si with the surface treated by nitrization was prepared, and a lower electrode 63 was formed thereon from Pt in a layer having a surface area of 6 µm by 6 µm and a thickness of 0.1 µm, and a first dielectric layer 64 was formed thereon from $(SiO_2)_{50}(ZrO_2)_{50}$ in a layer having a surface area of 4.5 µm by 5 µm and 0.01 µm in thickness. In addition, as a first recording layer 65, a layer of $Sb_{80}S_{20}$ having a surface area of 5 µm by 5 µm and a thickness of 0.05 µm was formed. As a second dielectric material layer 67, a layer of $(SiO_2)_{50}(ZrO_2)_{50}$ having a surface area of 4.5 µm by 5 µm and a thickness of 0.01 µm was formed. As an upper electrode 68, a layer of Pt having a surface area of 5 µm by 5 µm and a thickness of 0.1 µm was formed. All of these layers were formed by the sputtering method.

The first dielectric layer 64 and the second dielectric layer 67 were formed from an insulating material. Thus the first dielectric layer 64 and the second dielectric layer 67 were formed to have areas smaller than that of the first recording layer 65, so that the lower electrode 63 and the upper electrode 68 partially contact the first recording layer 65 and electrical current flow into the first recording layer 65.

Then Au lead wires were bonded onto the lower electrode 63 and the upper electrode 68 so as to connect the electrical information recording/reproduction apparatus 74 to the electrical information recording medium 61 via the voltage applying section 69. With the electrical information recording/reproduction apparatus 74, a pulsed power source 73 was connected via a switch 71 between the lower electrode 63 and the upper electrode 68. A change in resistance due to phase change of the first recording layer 65 was detected by the resistance measuring instrument 70 that was connected via a switch 72 between the lower electrode 63 and the upper electrode 68.

Figure 15:
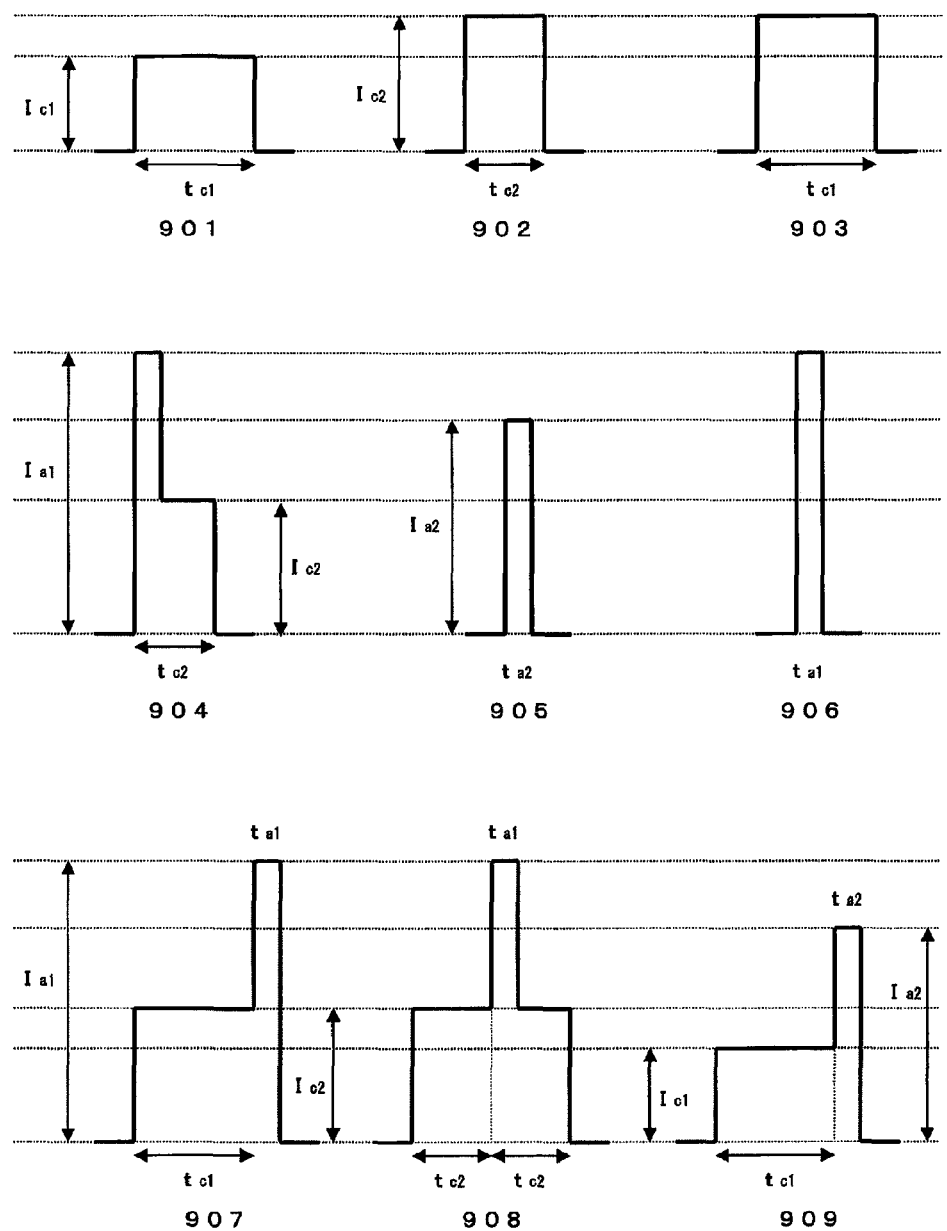
FIG. 15 shows an example of recording and erasing pulse waveforms applied to the electrical information recording medium of the present invention.

When the first recording layer 65 was in amorphous phase, current pulse of $I_{c1}=5$ mA and $t_{c1}=50$ ns having recording waveform 901 shown in FIG. 15 was supplied between the lower electrode 63 and the upper electrode 68. This caused phase change of the first recording layer 65 from amorphous phase to crystal phase. When the first recording layer 65 was in crystal phase, current pulse of $I_{a1}=10$ mA and $t_{a1}=10$ ns having erasing waveform 906 shown in FIG. 15 was supplied between the lower electrode 63 and the upper electrode 68. This caused phase change of the first recording layer 65 from crystal phase to amorphous phase.

The number of overwrite cycles of the electrical phase-change information recording medium 61 was determined. The results showed that the number of overwrite cycles of the medium having the first dielectric layer 64 and the second dielectric layer 67 was 10 times or more that of the medium where the first dielectric layer 64 and the second dielectric layer 67 were not provided. This is because the first dielectric layer 64 and the second dielectric layer 67 suppress the material transfer from the lower electrode 63 and the upper electrode 68 into the first recording layer 65.

Similar results were obtained when the first recording layer 48 was formed from an Sb—Sn-based material or an Sb—S-M-based material other than $Sb_{80}S_{20}$ (M represents at least one element selected from among Sn, Bi, In, Ge and Mn).

INDUSTRIAL APPLICABILITY

The information recording medium of the present invention has the capability to retain the recorded information over a long period of time (involatility) and is useful as a high-density optical disk of rewritable type (such as Blu-ray Disk Rewritable (BD-RE), DVD-RAM, DVD-RW, DVD+RW, etc.), and electrical memory.

The invention claimed is:

1. An information recording medium comprising N information layers, wherein N is an integer of 2 or larger, and the N information layers are disposed in the order of the Nth information layer, the (N−1)st information layer, the (N−2)nd information layer, . . . , the second information layer and the first information layer from the side where the laser beam is incident, and at least one of the second information layer to the Nth information layer comprises a recording layer capable of undergoing phase change, and the recording layer comprises a material that contains Sb and S and is represented by a formula (1) shown below:

$$Sb_xS_{100-x}(\text{atomic \%}) \quad (1)$$

wherein suffix x represents the proportion in atomic % and satisfies a relationship of $50 \leq x \leq 98$, wherein the recording layer has a thickness in a range of 2 nm to 9 nm, wherein the recording layer undergoes phase change when irradiated with a laser beam, and wherein the information layer that comprises the recording layer comprises at least a second dielectric layer, the recording layer, a first dielectric layer and a reflective layer disposed in this order from the side whereon the laser beam is incident.

2. The information recording medium according to claim 1, wherein x in the formula (1) satisfies a relationship of $50 \leq x \leq 80$.

3. The information recording medium according to claim 1, wherein Sb atoms and S atoms constitute 90 atomic % or more of all atoms that make up the recording layer.

4. The information recording medium according to claim 1, wherein Sb atoms and S atoms constitute 99 atomic % or more of all atoms that make up the recording layer.

5. The information recording medium according to claim 1, wherein the material of the recording layer further contains M1, wherein M1 represents at least one element selected from among Ge, In and Sn, and the material is represented by a formula (2) shown below:

$$(Sb_zS_{1-z})_{100-y}M1_y(\text{atomic \%}) \quad (2)$$

wherein suffix z represents the proportion of each atom to the sum of the number of Sb atoms and the number of S atoms which sum is set to 1, and satisfies a relationship of $0.5 \leq z \leq 0.98$, and wherein suffix y represents the proportion in atomic %, and satisfies a relationship of $0 < y \leq 30$.

6. The information recording medium according to claim 5, wherein Sb atoms, S atoms and M1 atoms constitute 99 atomic % or more of all atoms that make up the recording layer.

7. The information recording medium according to claim 1, wherein the material of the recording layer further contains M2, wherein M2 represents at least one element selected from among Bi and Mn, and the material is represented by a formula (3) shown below:

$$(Sb_aS_{1-a})_{100-b}(\text{atomic \%}) \quad (3)$$

wherein suffix a represents the proportion of each atom to the sum of the number of Sb atoms and the number of S atoms which sum is set to 1, and satisfies a relationship of $0.5 \leq a \leq 0.98$, and wherein suffix b represents the proportion in atomic %, and satisfies a relationship of $0 < b \leq 20$.

8. The information recording medium according to claim 7, wherein Sb atoms, S atoms and M2 atoms constitute 99 atomic % or more of all atoms that make up the recording layer.

9. The information recording medium according to claim 1, wherein the material of the recording layer further contains M1 and M2, wherein M1 represents at least one element selected from among Ge, In and Sn, and M2 represents at least one element selected from among Bi and Mn, and the material is represented by a formula (4) shown below:

$$(Sb_cS_{1-c})_{100-d-e}M1_dM2_e(\text{atomic \%}) \quad (4)$$

where suffix c represents the proportion of each atom to the sum of the number of Sb atoms and the number of S atoms which sum is set to 1, and satisfies a relationship of $0.5 \leq c \leq 0.98$, and wherein suffixes d and e represent the proportion in atomic %, and satisfy relationships of $0 < d < 30$, $0 < e \leq 20$ and $0 < d+e \leq 30$.

10. The information recording medium according to claim 9, wherein Sb atoms, S atoms, M1 atoms and M2 atoms constitute 99 atomic % or more of all atoms that make up the recording layer.

11. The information recording medium according to claim 1, wherein N is 2.

12. The information recording medium according to claim 1, wherein N is 4.

13. The information recording medium according to claim 11, wherein the Nth information layer comprises the recording layer.

14. The information recording medium according to claim 1, further comprising a transmittance adjustment layer, wherein the second dielectric layer, the recording layer, the first dielectric layer, the reflective layer and the transmittance adjustment layer are disposed in this order from the side whereon the laser beam is incident.

15. A method for producing an information recording medium comprising N information layers, wherein N is an integer of 2 or larger and the N information layers are disposed in the order of the Nth information layer, the (N−1)st information layer, the (N−2)nd information layer, . . . , the second information layer and the first information layer from the side where the laser beam is incident, and at least one of the second information layer to the Nth information layer comprises a recording layer capable of undergoing phase change, and the recording layer comprises a material that contains Sb and S, wherein the method comprises:

forming an information layer including forming the recording layer by a sputtering method, wherein a sputtering target that contains Sb and S is used in the operation of forming the recording layer, and a film that is formed by using the sputtering target comprises a material represented by a formula (1) shown below:

$$Sb_xS_{100-x}(\text{atomic \%}) \qquad (1)$$

wherein suffix x represents the proportion in atomic % that satisfies a relationship of $50 \leq x \leq 98$, wherein the recording layer has a thickness in a range of 2 nm to 9 nm, and wherein said forming the information layer operation includes forming a reflective layer, forming a first dielectric layer, forming the recording layer and forming a second dielectric layer in this order.

16. The method for producing the information recording medium according to claim 15, wherein the sputtering target further contains M1, wherein M1 represents at least one element selected from among Ge, In and Sn, and the material of the film formed by using the sputtering target is represented by a formula (2) shown below:

$$(Sb_zS_{1-z})_{100-y}M1_y(\text{atomic \%}) \qquad (2)$$

wherein suffix z represents the proportion of each atom to the sum of the number of Sb atoms and the number of S atoms which sum is set to 1, and satisfies a relationship of $0.5 \leq z \leq 0.98$, and wherein suffix y represents the proportion in atomic %, and satisfies a relationship of $0 < y \leq 30$.

17. The method for producing the information recording medium according to claim 15, wherein the sputtering target further contains M2, wherein M2 represents at least one element selected from among Bi and Mn, and the material of the film formed by using the sputtering target is represented by a formula (3) shown below:

$$(Sb_aS_{1-a})_{100-b}M2_b(\text{atomic \%}) \qquad (3)$$

wherein suffix a represents the proportion of each atom to the sum of the number of Sb atoms and the number of S atoms which sum is set to 1, and satisfies a relationship of $0.5 \leq a \leq 0.98$, and wherein suffix b represents the proportion in atomic %, and satisfies a relationship of $0 < b \leq 20$.

18. The method for manufacturing the information recording medium according to claim 15, wherein the sputtering target further contains M1 and M2, wherein M1 represents at least one element selected from among Ge, In and Sn, and M2 represents at least one element selected from among Bi and Mn, and the material of the film formed by using the sputtering target is represented by a formula (4) shown below:

$$(Sb_cS_{1-c})_{100-d-e}M1_dM2_e(\text{atomic \%}) \qquad (4)$$

wherein suffix c represents the proportion of each atom to the sum of the number of Sb atoms and the number of S atoms which sum is set to 1, and satisfies a relationship of $0.5 \leq c \leq 0.98$, and wherein suffixes d and e represent the proportions in atomic %, and satisfy relationships of $0 < d < 30$, $0 < e \leq 20$ and $0 < d+e \leq 30$.

19. The method for producing the information recording medium according to claim 15, wherein N is 2.

20. The method for producing the information recording medium according to claim 15, wherein N is 4.

21. A method for producing an information recording medium comprising N information layers, wherein N is an integer of 2 or larger and the N information layers are disposed in the order of the Nth information layer, the (N−1)st information layer, the (N−2)nd information layer, . . . , the second information layer and the first information layer from the side where the laser beam is incident, and at least one of the second information layer to the Nth information layer comprises a recording layer capable of undergoing phase change, and the recording layer comprises a material the contains Sb and S, wherein the method comprises:

forming an information layer including forming the recording layer by a sputtering method, wherein a sputtering target that contains Sb and S is used in the operation of forming the recording layer, and a film that is formed by using the sputtering target comprises a material represented by a formula (1) shown below:

$$Sb_xS_{100-x}(\text{atomic \%}) \qquad (1)$$

wherein suffix x represents the proportion in atomic % that satisfies a relationship of $50 \leq x \leq 98$, wherein the recording layer has a thickness in a range of 2 nm to 9 nm, wherein said forming the information layer operation includes forming the second dielectric layer, forming the recording layer, forming the first dielectric layer, and forming the reflective layer in this order.

22. The method for producing the information recording medium according to claim 15, further comprising:

forming a transmittance adjustment layer before or after the operation of forming the reflective layer.

23. The information recording medium according to claim 12, wherein the Nth information layer comprises the recording layer.

24. The method for producing the information recording medium according to claim 21, further comprising:

forming a transmittance adjustment layer before or after the operation of forming the reflective layer.

* * * * *